(12) United States Patent
Kubota et al.

(10) Patent No.: US 12,552,392 B2
(45) Date of Patent: Feb. 17, 2026

(54) VEHICLE CONTROL DEVICE AND VEHICLE

(71) Applicant: SEMICONDUCTOR ENERGY LABORATORY CO., LTD., Atsugi (JP)

(72) Inventors: Daisuke Kubota, Kanagawa (JP); Ryo Hatsumi, Kanagawa (JP); Daiki Nakamura, Kanagawa (JP); Kensuke Yoshizumi, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 194 days.

(21) Appl. No.: 18/554,430

(22) PCT Filed: Mar. 28, 2022

(86) PCT No.: PCT/IB2022/052790
§ 371 (c)(1),
(2) Date: Oct. 6, 2023

(87) PCT Pub. No.: WO2022/214906
PCT Pub. Date: Oct. 13, 2022

(65) Prior Publication Data
US 2024/0190441 A1    Jun. 13, 2024

(30) Foreign Application Priority Data
Apr. 8, 2021 (JP) .................................. 2021-065854

(51) Int. Cl.
*B60W 40/08* (2012.01)
*A61B 5/021* (2006.01)
(Continued)

(52) U.S. Cl.
CPC ......... *B60W 40/08* (2013.01); *A61B 5/02108* (2013.01); *A61B 5/024* (2013.01);
(Continued)

(58) Field of Classification Search
CPC ................. B60W 40/08; B60W 50/14; B60W 2040/0809; B60W 2040/0872;
(Continued)

(56) References Cited

U.S. PATENT DOCUMENTS

| 6,885,439 B2 | 4/2005 | Fujieda |
| 7,248,997 B2 | 7/2007 | Nagai et al. |

(Continued)

FOREIGN PATENT DOCUMENTS

| CN | 001417751 A | 5/2003 |
| CN | 108236460 A | 7/2018 |

(Continued)

OTHER PUBLICATIONS

International Search Report (Application No. PCT/IB2022/052790) Dated Jun. 28, 2022.
(Continued)

*Primary Examiner* — Thomas S McCormack
(74) *Attorney, Agent, or Firm* — Fish & Richardson P.C.

(57) ABSTRACT

A vehicle control device with a high security level is provided. The vehicle control device has a structure including an operation portion, a first light-emitting and light-receiving portion, and a control portion. The operation portion includes a steering wheel including a rim, a hub, and a spoke. The rim is connected to the hub through the spoke. The first light-emitting and light-receiving portion is provided along a surface of the hub. The first light-emitting and light-receiving portion includes a first light-emitting element and a first light-receiving element. The first light-emitting element has a function of emitting light in a first wavelength range. The first light-receiving element has a function of receiving the light in the first wavelength range and converting the light in the first wavelength range into an electric signal. The first light-emitting element and the first light- (Continued)

receiving element are arranged side by side on the same plane. The first light-emitting and light-receiving portion has a function of outputting first received-light data to the control portion. The control portion has a function of obtaining first biological information of a driver from the first received-light data and executing first processing in accordance with the first biological information.

22 Claims, 29 Drawing Sheets

(51) Int. Cl.
  *A61B 5/024*    (2006.01)
  *A61B 5/1455*    (2006.01)
  *B60W 50/14*    (2020.01)
  *G06F 3/041*    (2006.01)
  *G06F 21/32*    (2013.01)

(52) U.S. Cl.
  CPC ......... *A61B 5/14551* (2013.01); *B60W 50/14* (2013.01); *G06F 3/0412* (2013.01); *G06F 21/32* (2013.01); *B60W 2040/0809* (2013.01)

(58) Field of Classification Search
  CPC ......... B60W 2540/221; A61B 5/02108; A61B 5/024; A61B 5/14551; A61B 5/02055; A61B 5/02416; A61B 2562/046; A61B 5/6893; A61B 5/18; A61B 5/1172; A61B 5/02; A61B 5/1171; A61B 5/746; A61B 2503/22; G06F 3/0412; G06F 21/32; B62D 1/046; B62D 1/16; B60R 25/25
  See application file for complete search history.

(56) References Cited

U.S. PATENT DOCUMENTS

| | | | |
|---|---|---|---|
| 7,358,516 B2 | 4/2008 | Holler et al. | |
| 8,456,382 B2 | 6/2013 | Yamazaki et al. | |
| 8,469,134 B2 | 6/2013 | Osaki et al. | |
| 8,643,482 B2 | 2/2014 | Yamazaki | |
| 10,434,847 B2 | 10/2019 | Yoshizumi et al. | |
| 10,589,660 B2 | 3/2020 | Kimura et al. | |
| 10,813,561 B2 | 10/2020 | Kwon et al. | |
| 11,205,356 B2 | 12/2021 | Yoshizumi et al. | |
| 11,394,014 B2 | 7/2022 | Kubota et al. | |
| 11,487,373 B2 | 11/2022 | Kubota. et al. | |
| 2003/0090650 A1 | 5/2003 | Fujieda | |
| 2008/0238695 A1 | 10/2008 | Yanai et al. | |
| 2009/0079345 A1 | 3/2009 | Inuiya | |
| 2010/0036592 A1 | 2/2010 | Osaki et al. | |
| 2010/0084642 A1 | 4/2010 | Hanari | |
| 2010/0134735 A1 | 6/2010 | Nakamura. et al. | |
| 2013/0250108 A1* | 9/2013 | Du ........................ | G06F 18/251 348/148 |
| 2014/0310739 A1* | 10/2014 | Ricci .................. | G06Q 30/0633 725/75 |
| 2015/0228704 A1 | 8/2015 | Miyake et al. | |
| 2016/0044751 A1 | 2/2016 | Ikeda et al. | |
| 2017/0288001 A1 | 10/2017 | Ito | |
| 2018/0062098 A1 | 3/2018 | Li et al. | |
| 2018/0076256 A1 | 3/2018 | Jiang et al. | |
| 2018/0107301 A1 | 4/2018 | Kimura et al. | |
| 2018/0177413 A1 | 6/2018 | Kwon et al. | |
| 2018/0329415 A1* | 11/2018 | Aoi ..................... | B60W 30/182 |
| 2019/0209100 A1* | 7/2019 | Strahinja ................ | A61B 5/015 |
| 2020/0052231 A1 | 2/2020 | Nakamura et al. | |
| 2022/0229488 A1 | 7/2022 | Akimoto et al. | |
| 2022/0327187 A1 | 10/2022 | Yoshimoto. et al. | |
| 2022/0335747 A1 | 10/2022 | Kubota et al. | |
| 2022/0344443 A1 | 10/2022 | Yamazaki et al. | |
| 2022/0350150 A1 | 11/2022 | Ikeda et al. | |
| 2023/0200670 A1 | 6/2023 | Kubota et al. | |

FOREIGN PATENT DOCUMENTS

| | | |
|---|---|---|
| EP | 3342336 A | 7/2018 |
| EP | 3943001 A | 1/2022 |
| JP | 2003-014420 A | 1/2003 |
| JP | 2003-144420 A | 5/2003 |
| JP | 2005-312653 A | 11/2005 |
| JP | 2009-081296 A | 4/2009 |
| JP | 2009-143373 A | 7/2009 |
| JP | 2009-231577 A | 10/2009 |
| JP | 2010-036799 A | 2/2010 |
| JP | 2010-126090 A | 6/2010 |
| JP | 2010-252875 A | 11/2010 |
| JP | 4585553 | 11/2010 |
| JP | 2018-102906 A | 7/2018 |
| KR | 2018-0076050 A | 7/2018 |

OTHER PUBLICATIONS

Written Opinion (Application No. PCT/IB2022/052790) Dated Jun. 28, 2022.

* cited by examiner

FIG. 18A
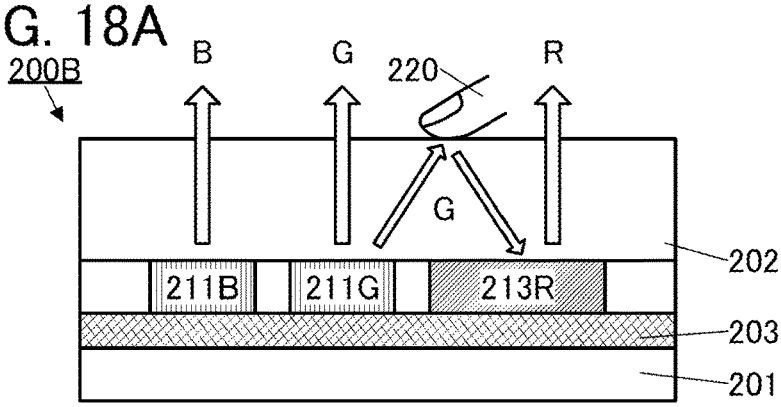
FIG. 18B   FIG. 18C   FIG. 18D   FIG. 18E
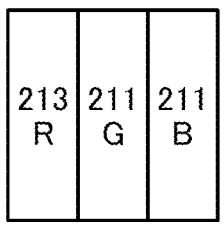 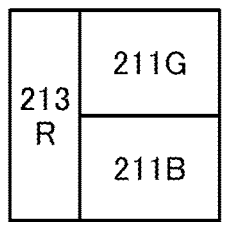 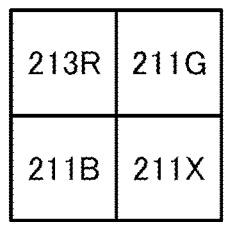 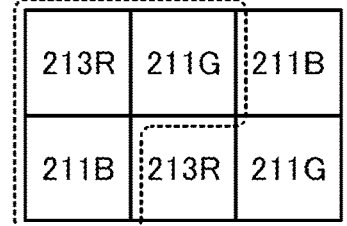
FIG. 18F   FIG. 18H
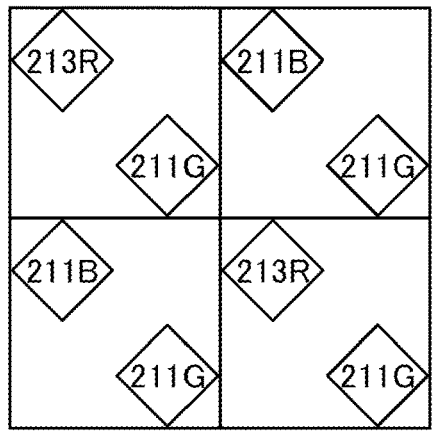 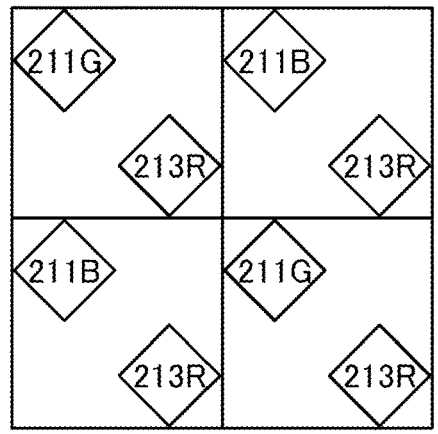
FIG. 18G   FIG. 18I
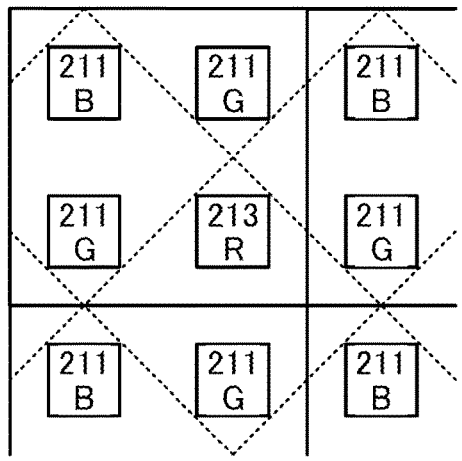 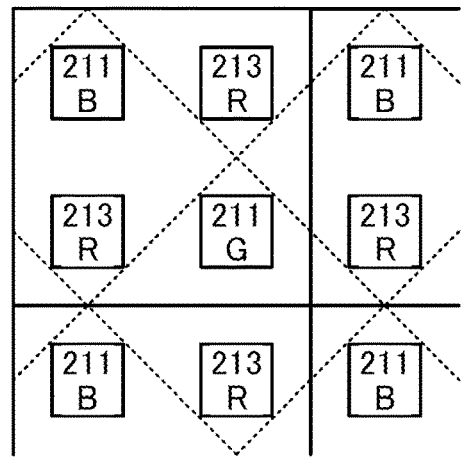

VEHICLE CONTROL DEVICE AND VEHICLE

CROSS REFERENCE TO RELATED APPLICATIONS

This application is a U.S. National Phase Application under 35 U.S.C. § 371 of International Application PCT/IB2022/052790, filed on Mar. 28, 2022, which is incorporated by reference and claims the benefit of a foreign priority application filed in Japan on Apr. 8, 2021, as Application No. 2021-065854.

TECHNICAL FIELD

One embodiment of the present invention relates to a control device for a moving object such as a vehicle. One embodiment of the present invention relates to a light-emitting and light-receiving apparatus. One embodiment of the present invention relates to a biosensor. One embodiment of the present invention relates to a display apparatus.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a memory device, an electronic device, a lighting device, an input device, an input/output device, a driving method thereof, and a manufacturing method thereof. A semiconductor device refers to any device that can function by utilizing semiconductor characteristics.

BACKGROUND ART

There has been a spate of thefts of vehicles such as automobiles, and the security level against theft is desired to be increased.

Drowsiness is one of the most common factor of accidents for a driver during driving a vehicle; thus, a variety of methods for monitoring the driver's wakefulness have been studied. For example, Patent Document 1 discloses a technique of determining the degree of the driver's activity from the acceleration of a vehicle and the heart rate of the driver.

REFERENCE

Patent Document

[Patent Document 1] Japanese Published Patent Application No. 2005-312653

SUMMARY OF THE INVENTION

Problems to be Solved by the Invention

An object of one embodiment of the present invention is to provide a vehicle control device with a high security level. An object of one embodiment of the present invention is to provide a highly safe vehicle control device. An object of one embodiment of the present invention is to provide a highly convenient vehicle control device. An object of one embodiment of the present invention is to monitor the driver's state without the driver being aware of it. An object of one embodiment of the present invention is to provide a vehicle control device, vehicle control method, or the like that has a novel structure.

An object of one embodiment of the present invention is to provide a novel electronic device, moving object, vehicle, apparatus, system, program, or method that uses biological information. An object of one embodiment of the present invention is to provide an electronic device, moving object, vehicle, apparatus, system, program, or method that has a novel structure. Another object of one embodiment of the present invention is to at least reduce at least one of problems of the conventional technique.

Note that the description of these objects does not preclude the existence of other objects. Note that one embodiment of the present invention does not have to achieve all of these objects. Note that objects other than these can be derived from the descriptions of the specification, the drawings, the claims, and the like.

Means for Solving the Problems

One embodiment of the present invention is a vehicle control device including an operation portion, a first light-emitting and light-receiving portion, and a control portion. The operation portion includes a steering wheel including a rim, a hub, and a spoke. The rim is connected to the hub through the spoke. The first light-emitting and light-receiving portion is provided along a surface of the hub. The first light-emitting and light-receiving portion includes a first light-emitting element and a first light-receiving element. The first light-emitting element has a function of emitting light in a first wavelength range. The first light-receiving element has a function of receiving the light in the first wavelength range and converting the light in the first wavelength range into an electric signal. The first light-emitting element and the first light-receiving element are arranged side by side on the same plane. The first light-emitting and light-receiving portion has a function of outputting first received-light data to the control portion. The control portion has a function of obtaining first biological information of a driver from the first received-light data and executing first processing in accordance with the first biological information.

In the above, the first biological information is preferably information on a fingerprint, a vein, or a palm print. Furthermore, the first processing is preferably authentication processing for the driver.

In the above, the first light-emitting and light-receiving portion preferably has a function of displaying an image and a function of a touch sensor.

In any of the above embodiments, it is preferable to further include a second light-emitting and light-receiving portion. The second light-emitting and light-receiving portion is provided along a surface of the rim. The second light-emitting and light-receiving portion includes a second light-emitting element and a second light-receiving element, and the second light-emitting element has a function of emitting light in a second wavelength range. Furthermore, the second light-receiving element preferably has a function of receiving the light in the second wavelength range and converting the light in the second wavelength range into an electric signal.

In the above, the second light-emitting and light-receiving portion preferably has a function of sequentially outputting second received-light data to the control portion. In this case, it is preferable that the control portion have a function of obtaining second biological information of the driver from the plurality of pieces of second received-light data and executing second processing in accordance with the second biological information.

In the above, the second biological information is preferably one or more of a pulse wave, a heart rate, a pulse, and artery blood oxygen saturation. In this case, the second processing is preferably warning processing to the driver.

In any of the above embodiments, the light in the second wavelength range preferably includes infrared light.

In any of the above embodiments, the light in the first wavelength range preferably includes visible light or infrared light.

In any of the above embodiments, the first light-emitting element preferably has a stacked-layer structure in which a first electrode, a first organic layer, and a common electrode are stacked. Furthermore, the first light-receiving element preferably has a stacked-layer structure in which a second electrode, a second organic layer, and the common electrode are stacked. In this case, the first organic layer preferably includes a light-emitting layer, the second organic layer preferably includes a photoelectric conversion layer, and the light-emitting layer and the photoelectric conversion layer preferably contain different organic compounds from each other. Furthermore, the first electrode and the second electrode are preferably provided apart from each other on the same plane, and the common electrode is preferably provided to cover the first organic layer and the second organic layer.

In the above, an angle formed between a bottom surface and a side surface of each of the first organic layer and the second organic layer is preferably greater than or equal to 60 degrees and less than or equal to 120 degrees, and the side surface of the first organic layer and the side surface of the second organic layer are preferably provided to face each other.

Another embodiment of the present invention is a vehicle including any of the above-described vehicle control devices and a display apparatus. In this case, the display apparatus preferably includes a display portion having a curved surface, and the display portion is preferably provided along a dashboard or a pillar.

Effect of the Invention

With one embodiment of the present invention, a vehicle control device with a high security level can be provided. A highly safe vehicle control device can be provided. A highly convenient vehicle control device can be provided. The driver's state can be monitored without the driver being aware of it. A vehicle control device, vehicle control method, or the like that has a novel structure can be provided.

With one embodiment of the present invention, a novel electronic device, moving object, vehicle, apparatus, system, program, or method that uses biological information can be provided. One embodiment of the present invention can provide an electronic device, moving object, vehicle, apparatus, system, program, or method that has a novel structure. One embodiment of the present invention can at least reduce at least one of problems of the conventional technique.

Note that the description of these effects does not preclude the existence of other effects. Note that one embodiment of the present invention does not need to have all of these effects. Note that effects other than these can be derived from the descriptions of the specification, the drawings, the claims, and the like.

BRIEF DESCRIPTION OF THE DRAWINGS

FIG. 18A is a cross-sectional view illustrating a structure example of a display apparatus. FIG. 18B to FIG. 18I are top views illustrating examples of a pixel.

MODE FOR CARRYING OUT THE INVENTION

Figure 1:
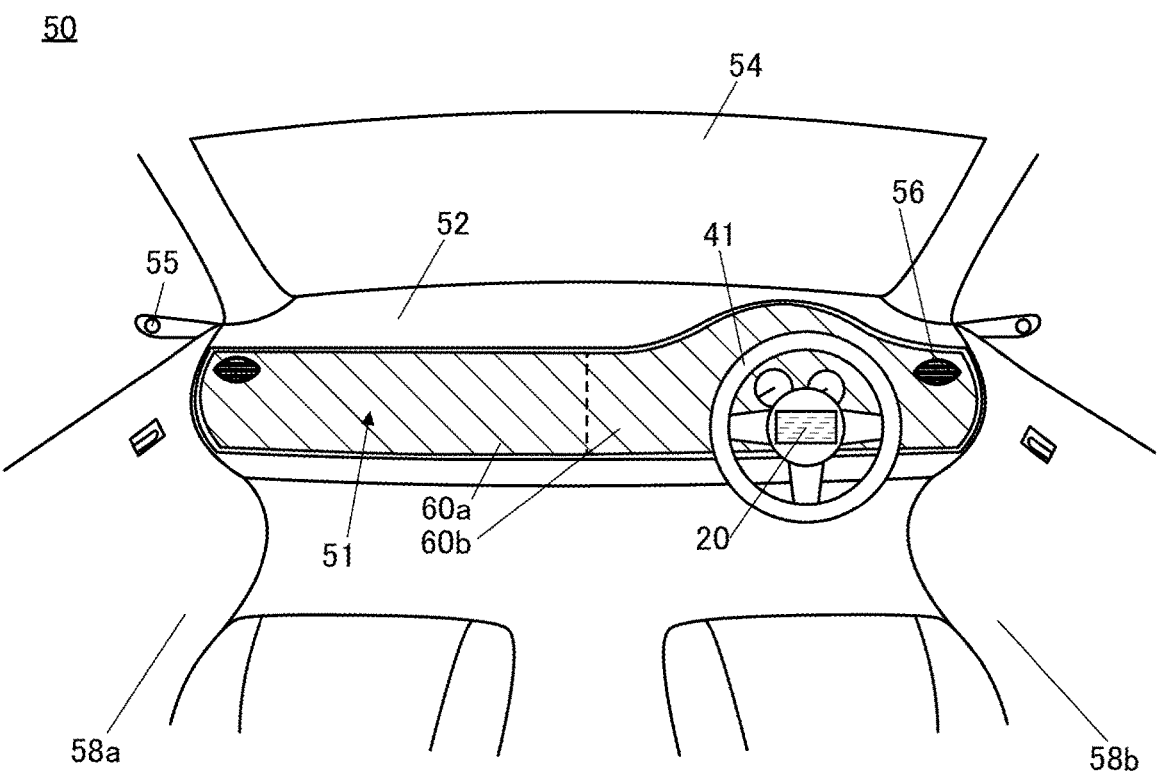
FIG. 1 is a diagram illustrating a structure example of a vehicle.

Hereinafter, embodiments will be described with reference to the drawings. Note that the embodiments can be implemented in many different modes, and it will be readily understood by those skilled in the art that modes and details thereof can be changed in various ways without departing from the spirit and scope thereof. Thus, the present invention should not be interpreted as being limited to the following description of the embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, ordinal numbers such as "first," "second," and the like are used in order to avoid confusion among components and do not limit the number.

Embodiment 1

In this embodiment, a vehicle of one embodiment of the present invention and a vehicle control device that can be used in the vehicle are described.

[Structure Example of Vehicle]

FIG. 1 illustrates a structure example of a vehicle 50 provided with a display portion 51 and a steering wheel 41. Although FIG. 1 illustrates an example of a right-hand drive vehicle, one embodiment of the present invention is not limited thereto. In the case of a left-hand drive vehicle, the structure illustrated in FIG. 1 is reversed left and right, for example.

FIG. 1 illustrates a dashboard 52, the steering wheel 41, a windshield 54, cameras 55, a wind outlet 56, a front-passenger-side door 58a, a driver-side door 58b, and the like arranged around the driver's seat and the front passenger's seat. The display portion 51 is provided horizontally across the dashboard 52.

FIG. 1 illustrates an example in which one display portion 51 formed using two display panels (a display panel 60a and a display panel 60b) is provided along the dashboard 52. The display panel 60a and the display panel 60b are arranged on the dashboard 52 so that a seam therebetween is not recognized or the width of the seam is less than or equal to 2 cm, preferably less than or equal to 1 cm. In FIG. 1, a boundary between the display panel 60a and the display panel 60b is indicated by a dashed line.

The display portion 51 is preferably provided with a touch sensor or a non-contact proximity sensor. Alternatively, the display portion 51 is preferably capable of gesture operation with use of a camera or the like that is separately provided.

The steering wheel 41 includes a light-emitting and light-receiving portion 20. The light-emitting and light-receiving portion 20 has a function of emitting light and a function of capturing an image. With the light-emitting and light-receiving portion 20, driver's biological information such as a fingerprint, a palm print, or a vein can be obtained; driver authentication based on the biological information is possible. This avoids start of the vehicle by persons except for the pre-registered driver, enabling an extremely high security level of vehicle.

Note that the display panel 60a and the display panel 60b may be flexible. The display panel 60a and the display panel 60b can be processed into complex shapes, and a structure in which the display portion 51 is provided along a curved surface of the dashboard 52 or the like, a structure in which a display region of the display portion 51 is not provided on a connection portion of the steering wheel 41, a measuring instrument such as a meter, the wind outlet 56, and the like, and a like structure can be easily achieved.

In addition, a plurality of cameras 55 that take images of the situations on the rear side may be provided outside the vehicle. Although the cameras 55 are provided instead of side mirrors in the example in FIG. 1, both the side mirrors and the cameras may be provided. As the cameras 55, CCD cameras, CMOS cameras, or the like can be used. In addition, an infrared camera may be used in combination with such a camera. The infrared camera, which has a higher output level with a higher temperature of an object, can detect or extract a living body such as a human or an animal.

The image captured with the camera 55 can be output to either one or both of the display portion 51 and the light-emitting and light-receiving portion 20. The vehicle 50 can assist the driver to drive the vehicle using the display portion 51 or the light-emitting and light-receiving portion 20. For example, an image of the situation on the rear side is taken at a wide angle of view by the camera 55, and the image is displayed on the display portion 51 or the light-emitting and light-receiving portion 20, so that the driver can see a blind spot and the occurrence of an accident can be prevented.

Image discontinuity at the seam between the display panel 60a and the display panel 60b may be compensated for by image processing or the like. This makes it possible to display a near seamless image, so that the visibility of the display portion 51 during driving can be improved.

Furthermore, a distance image sensor may be provided on a roof of the vehicle, for example, and an image obtained by the distance image sensor may be displayed on the display portion 51. As the distance image sensor, an image sensor, LIDAR (Light Detection and Ranging), or the like can be used. An image obtained by the image sensor and the image obtained by the distance image sensor are displayed on the display portion 51, whereby more information can be provided to the driver to assist driving.

The display portion 51 may also have a function of displaying map information, traffic information, television images, DVD images, and the like. For example, using the display panel 60a and the display panel 60b as one display screen, map information can be displayed in large size. Note that the number of display panels can be increased in accordance with the displayed image.

Figure 2:
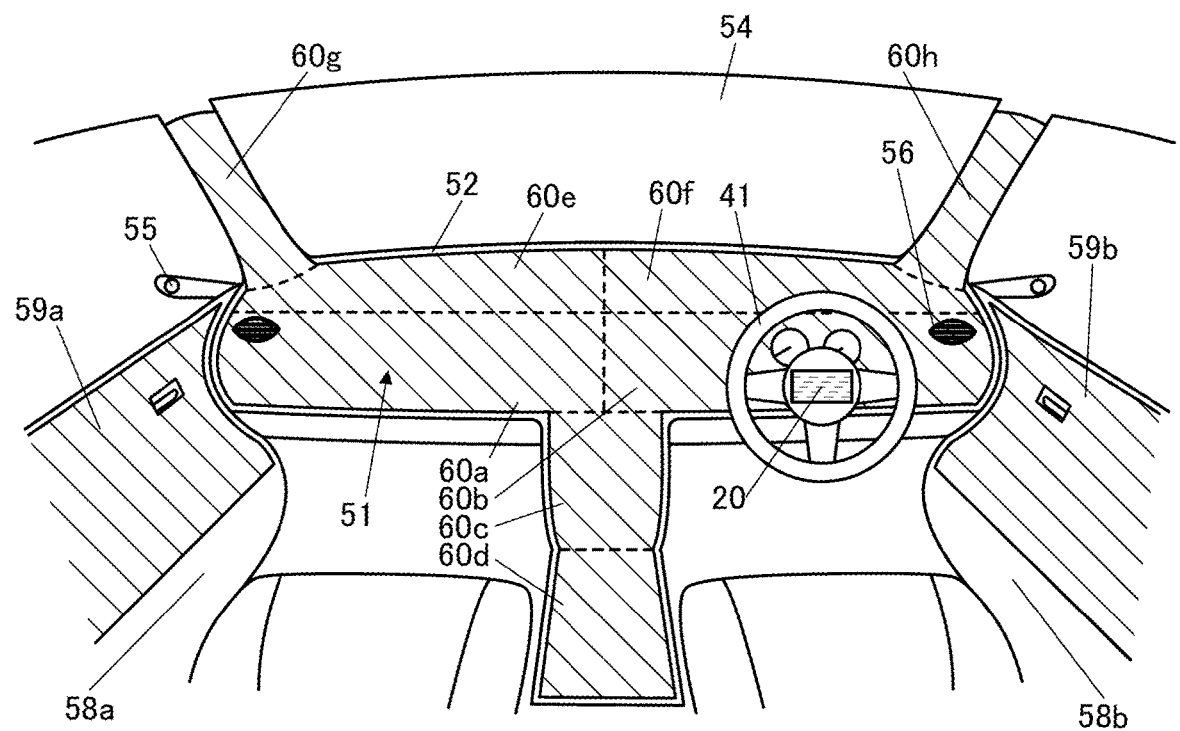
FIG. 2 is a diagram illustrating a structure example of a vehicle.

FIG. 2 illustrates an example in which the number of display panels is increased. In FIG. 2, the display portion 51 is provided over the dashboard, a front console, and left and right pillars. Although the display portion 51 is formed of eight display panels (the display panel 60a to a display panel 60h) in the example illustrated in FIG. 2, the number of display panels is not limited thereto and may be less than or equal to seven or greater than or equal to nine. A display panel 60c and a display panel 60d are provided in a position corresponding to the center console. A display panel 60e and a display panel 60f are provided on the far side of the dashboard from the driver. A display panel 60g and the display panel 60*h* are provided along the pillars. One or more of the display panels 60*a* to 60*h* are provided along a curved surface.

An image displayed on the display panel 60*a* to the display panel 60*h* can be set freely in accordance with the driver's preference. For example, television images, DVD images, online videos, or the like can be displayed on the display panel 60*a*, the display panel 60*e*, and the like on the left side; map information can be displayed on the display panel 60*c* and the like at the center; meters such as a speed meter and a tachometer can be displayed on the display panel 60*b*, the display panel 60*f*, and the like on the driver side; and audio information can be displayed on the display panel 60*d* and the like between the driver's seat and the front passenger's seat. On the display panel 60*g* and the display panel 60*h* provided on the pillars, an external view in the direction of the driver's line of vision can be displayed in real time, whereby a pseudo-pillarless vehicle can be provided. Since blind spots can be reduced, a highly safe vehicle can be achieved.

Furthermore, in FIG. 2, a display portion 59*a* and a display portion 59*b* are provided along surfaces of the front-passenger-side door 58*a* and the driver-side door 58*b*, respectively. Each of the display portion 59*a* and the display portion 59*b* can be formed using one or a plurality of display panels.

The display portion 59*a* and the display portion 59*b* are placed to face each other, and the display portion 51 is provided on the dashboard 52 so as to connect an end portion of the display portion 59*a* and an end portion of the display portion 59*b*. Accordingly, the driver and the fellow passenger in the front passenger's seat are surrounded on the front and both sides by the display portion 51, the display portion 59*a*, and the display portion 59*b*. For example, displaying one continuous image across the display portion 59*a*, the display portion 51, and the display portion 59*b* can provide an enhanced sense of immersion to the driver and the fellow passenger.

Also images displayed on the display portion 59*a* and the display portion 59*b* can be set freely in accordance with the driver's or fellow passenger's preference. For example, for a child sitting in the front passenger's seat, the display portion 59*a* can display contents for children, such as animation.

In addition, the display portion 59*a* and the display portion 59*b* can display an image synchronized with the view from the window, which is obtained by synthesizing images obtained by the cameras 55 and the like. That is, an image which the driver and the fellow passenger can see through the door 58*a* and the door 58*b* can be displayed on the display portion 59*a* and the display portion 59*b*. Therefore, the driver and the fellow passenger can experience a feeling as if they are floating.

A display panel having an image capturing function is preferably used as at least one of the display panels 60*a* to 60*h*. Furthermore, a display panel having an image capturing function can also be used as one or more of the display panels provided in the display portion 59*a* and the display portion 59*b*.

For example, when the driver touches the display panel, the vehicle can perform biometric authentication such as fingerprint authentication or palm print authentication. The vehicle may have a function of setting an environment to meet the driver's preference when the driver is authenticated by biometric authentication. For example, one or more of adjustment of the position of the seat, adjustment of the position of the handle, adjustment of the direction of the camera 55, setting of brightness of lighting, setting of an air conditioner, setting of the speed (frequency) of wipers, volume setting of audio, reading of the playlist of the audio, and the like are preferably performed after authentication.

An automobile can be brought into a state where the automobile can be driven, e.g., a state where an engine is started or a state where an electric automobile can be started after the driver is authenticated by biometric authentication. This is preferable because a key, which is conventionally necessary, is unnecessary.

Although the display apparatus that surrounds the driver's seat and the front passenger's seat is described here, a display portion can be provided to surround also a fellow passenger in a rear seat. For example, a display portion can be provided along the back of the driver's seat or the front passenger's seat, a side surface of a rear door, or the like.

Figure 3A:
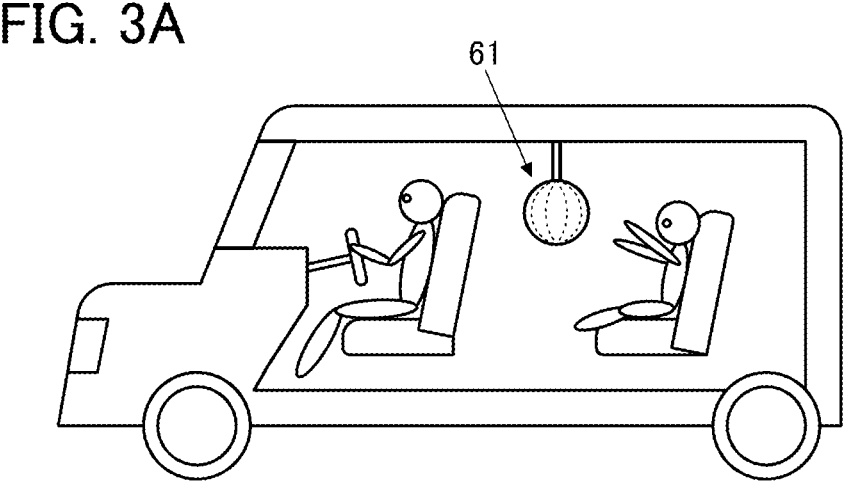
FIG. 3A is a diagram illustrating a structure example of a vehicle.

As illustrated in FIG. 3A, a spherical display portion 61 may be provided between front seats and rear seats. An image on the spherical display portion 61 can be seen from any direction. Therefore, even when some people are sitting in the rear seats, display apparatuses for all of them need not be prepared and everyone in the rear seats can see the same display portion 61. Furthermore, the fellow passenger in the front passenger's seat can also see the display portion 61 by rotating the front passenger's seat back. When applied to an autonomous car, the display portion 61 can be seen by the driver also by rotating the driver's seat back.

Figure 3B:
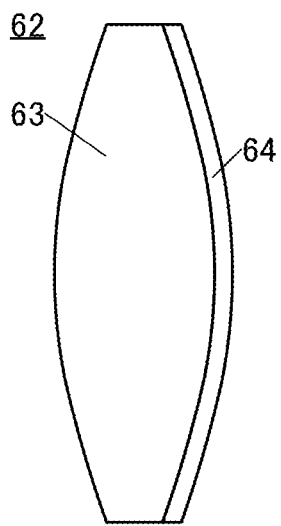
FIG. 3B to FIG. 3D are diagrams illustrating a structure example of a display portion.

The display portion 61 can be formed of a plurality of display panels 62 attached to each other. FIG. 3B is a schematic diagram of one display panel, and FIG. 3C is a schematic diagram of the display portion 61 in which the plurality of display panels 62 are attached to each other.

As illustrated in FIG. 3B, the display portion 61 includes a display region 63 and a non-display region 64. The display region 63 is provided with a plurality of pixels arranged in a matrix. The non-display region 64 is provided with one or more of a wiring, a terminal, an electrode, and a driver circuit (a gate driver or a source driver). An IC chip or an FPC (Flexible Printed Circuit) may be mounted on the non-display region.

Figure 3C:
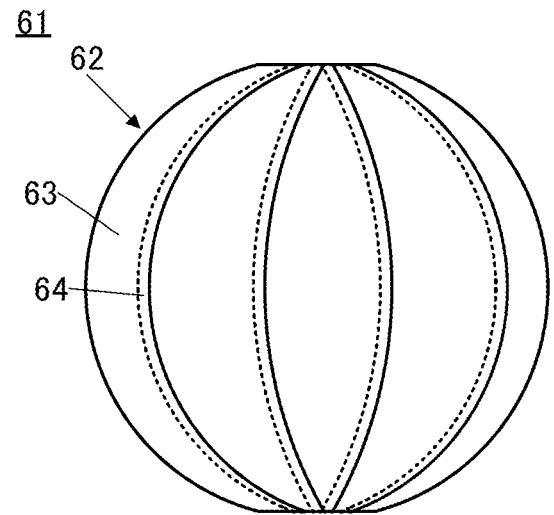

As illustrated in FIG. 3C, the plurality of display panels 62 are attached to each other so that the non-display region 64 of one display panel 62 and the display region 63 of another display panel 62 overlap with each other, whereby the width of the seam can be small and the seam can be hard to recognize.

Although the display portion 61 is formed of the plurality of display panels 62 in the example illustrated in FIG. 3B and FIG. 3C, the spherical display portion 61 may also be formed by changing the shape of one large display panel 62.

Figure 3D:
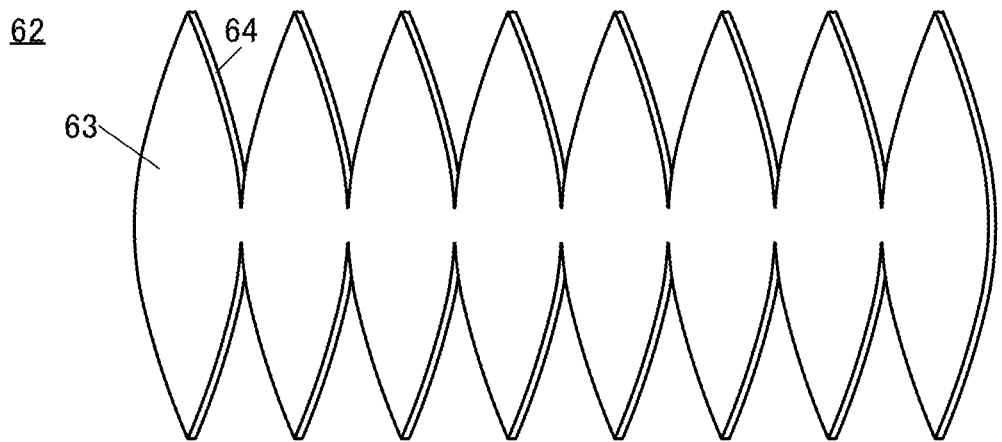

FIG. 3D is a development view of the display panel 62 used for the spherical display portion 61. The display panel 62 illustrated in FIG. 3D has a shape in which a plurality of the structures illustrated in FIG. 3B are laterally connected.

Since the display panel can be provided along various curved surfaces, the shape of the display portion formed with the display panel is not limited to the spherical shape.

Figure 4A:
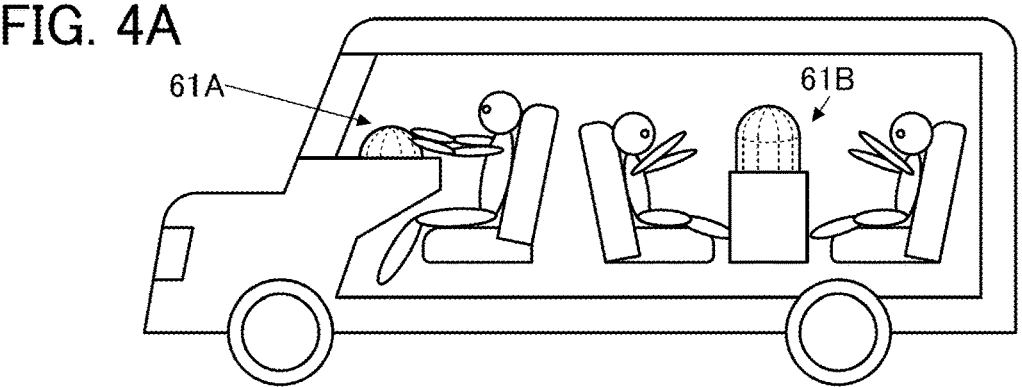
FIG. 4A is a diagram illustrating a structure example of a vehicle.

FIG. 4A illustrates an example of an autonomous car including, inside the car, a hemispherical display portion 61A and a display portion 61B in a combined shape of a hemisphere and a circular cylinder. The hemispherical display portion 61A is provided with a touch sensor or a proximity sensor on its surface. When the driver handles the hemispherical display portion 61A, various operations such as setting of the destination or setting of the route can be performed. Furthermore, when the driver handles the display portion 61A, driving of the vehicle can be performed.

Figure 4B:
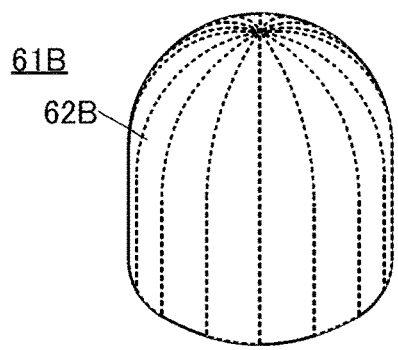
FIG. 4B to FIG. 4E are diagrams illustrating structure examples of a display portion.
Figure 4C:
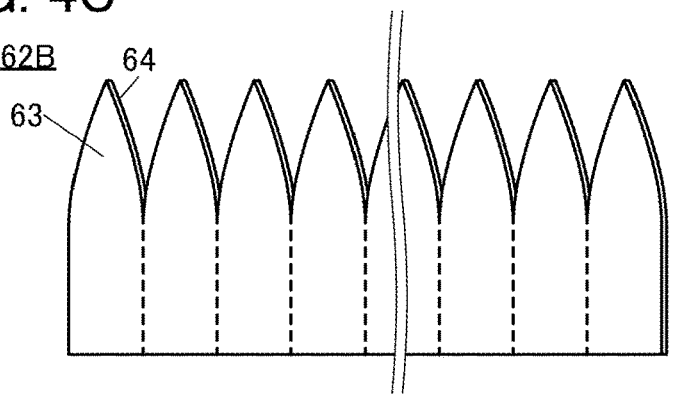

FIG. 4B is a schematic diagram of the display portion 61B in a shape of a circular cylinder on one plane of which a hemisphere with the same diameter is attached. FIG. 4C is a development view of a display panel 62B used for the display portion 61B. The display panel 62B includes the display region 63 and the non-display region 64.

Figure 4D:
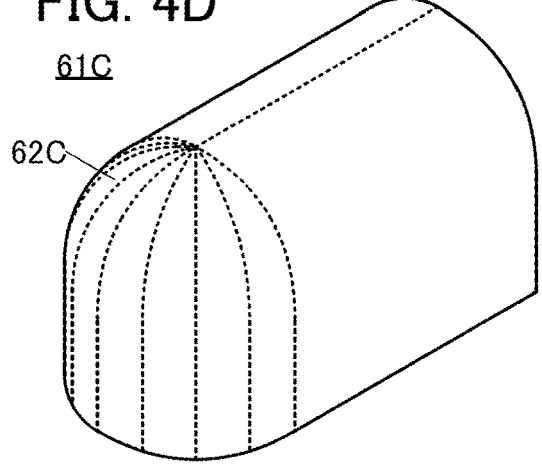
Figure 4E:
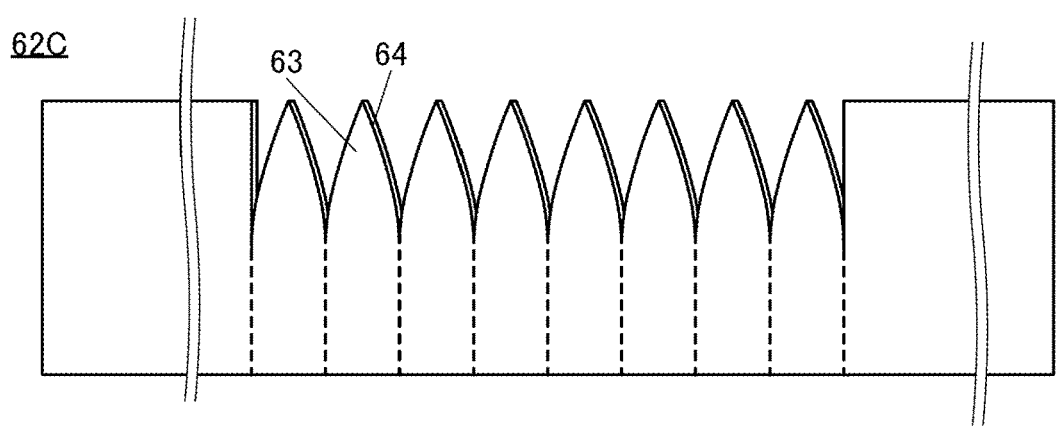

FIG. 4D illustrates a display portion 61C in a shape that is obtained in the following manner: a shape of a circular cylinder on one plane of which a hemisphere with the same diameter is attached is cut in half lengthwise and the cut surface is extended in the normal direction. Furthermore, FIG. 4E is a development view of a display panel 62C used for the display portion 61C.

[Vehicle Control Device]

A vehicle control device that can be incorporated in the vehicle of one embodiment of the present invention is described below with reference to drawings.

Figure 5A:
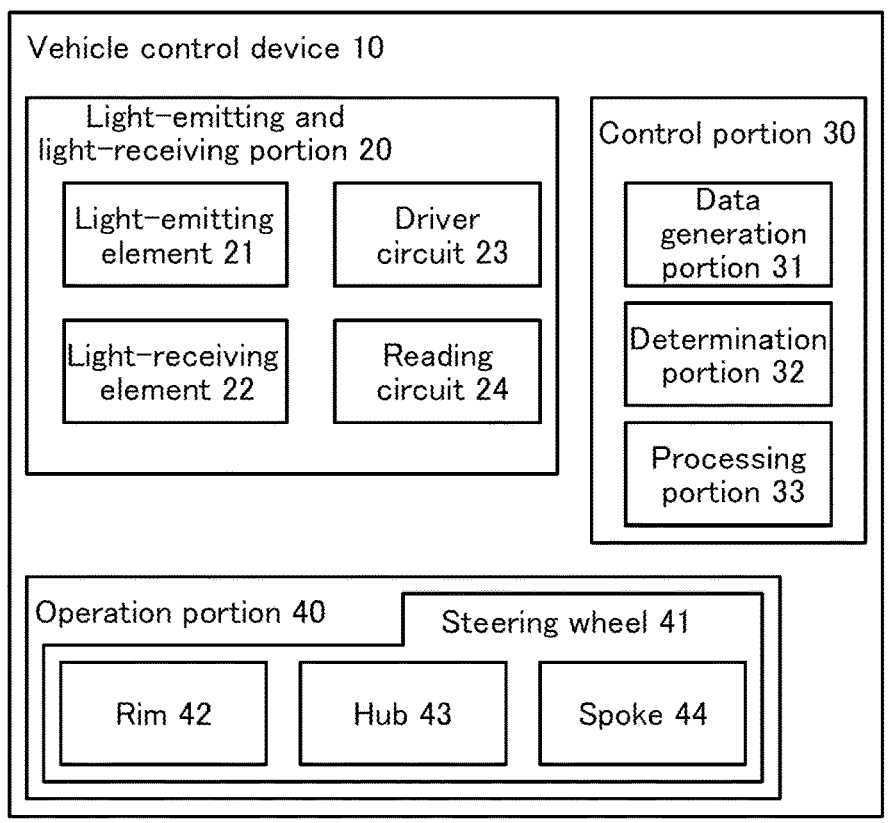
FIG. 5A to FIG. 5D are diagrams illustrating a structure example of a vehicle control device.

FIG. 5A is a block diagram of a vehicle control device 10 exemplified below. The vehicle control device 10 includes the light-emitting and light-receiving portion 20, a control portion 30, an operation portion 40, and the like.

The light-emitting and light-receiving portion 20 has a function of obtaining received-light data including biological information of a driver and a function of outputting the received-light data to the control portion 30. The control portion 30 has a function of generating (obtaining) data including the biological information of the driver (such data is also referred to as biological data) on the basis of the received-light data provided from the light-emitting and light-receiving portion 20 and a function of executing various types of processing on the basis of the biological data. The operation portion 40 corresponds to an operation means with which the driver can operate a vehicle. In the operation portion 40, a light-emitting and light-receiving region of the light-emitting and light-receiving portion 20 is provided along a portion that the driver holds, a portion that the driver touches, or the like.

The light-emitting and light-receiving portion 20 has a function of irradiating part of the driver's body, for example, with light and obtaining the reflected light as the received-light data. The light-emitting and light-receiving portion 20 can obtain biological data, such as a fingerprint and a palm print, by capturing an image of part of skin. With the use of the biological data for authentication, a key (including a smart key) for starting a vehicle is unnecessary; thus, a vehicle in which the engine (or power supply) can be started by biometric authentication without a key can be achieved.

Here, the light reflectance of human skin changes periodically due to bloodstream; thus, data on a pulse wave can be obtained from a time-dependent change in reflected light intensity that is obtained by repeatedly receiving light with the light-emitting and light-receiving portion 20. A variety of vital data can be obtained from the pulse wave. For example, a heart rate can be obtained from the period of the pulse wave. Furthermore, with two kinds of received-light data obtained using light having different wavelengths (e.g., infrared light and red light), artery blood oxygen saturation ($SpO_2$) can be measured. In addition, using a high-accuracy pulse wave obtained with high sampling frequency, stress level, blood vessel age, or the like can be obtained. Moreover, the degree of progress of arteriosclerosis can be estimated, or blood pressure can be estimated from an electrocardiogram measured separately and the pulse wave, for example.

The biological data that can be used in the control portion 30 is roughly classified into vital data and biometric authentication data (biometrics data). The vital data relates to vital information derived from vital activity of a person, and includes data on a pulse wave, a heart rate, a pulse, artery blood oxygen saturation, blood pressure, or the like. On the other hand, the biometrics data, which is derived from a physical feature of a person, can be used for individual authentication (biometric authentication), and includes data on a fingerprint, a palm print, the shape of a pulse (including the shapes of a vein and an artery), an iris, a voiceprint, or the like. In addition, data derived from a behavioral feature of a person (e.g., the position of a steering wheel that the person holds) can also be included in the biometrics data.

As light with which part of the driver's body is irradiated in the light-emitting and light-receiving portion 20, visible light, infrared light, or ultraviolet light can be used. The light preferably includes infrared light, further preferably includes near infrared light. Since such light is not recognized by the driver, image capturing can be constantly performed without hindering the driver's driving, which is preferable.

As illustrated in FIG. 5A, the light-emitting and light-receiving portion 20 includes a light-emitting element 21, a light-receiving element 22, a driver circuit 23, and a reading circuit 24. The control portion 30 includes a data generation portion 31, a determination portion 32, a processing portion 33, and the like. The operation portion 40 includes at least a steering wheel 41. The steering wheel 41 includes a rim 42, a hub 43, and a spoke 44.

In the light-emitting and light-receiving portion 20, the light-emitting element 21 and the light-receiving element 22 are preferably arranged side by side on the same plane. The light-receiving element 22 functions as a photoelectric conversion element that receives incident light and converts it into an electric signal. The light-receiving element 22 has sensitivity to at least part of light emitted from the light-emitting element 21. In particular, it is preferable that the light-emitting element 21 emit light in a wavelength range including infrared light and the light-receiving element 22 have sensitivity to light in a wavelength range including infrared light.

Light emitted from the light-emitting element 21 preferably includes infrared light, further preferably includes near-infrared light. In particular, near-infrared light having one or more peaks in the range of a wavelength greater than or equal to 700 nm and less than or equal to 2500 nm can be favorably used. In particular, the use of light having one or more peaks in the range of a wavelength greater than or equal to 750 nm and less than or equal to 1000 nm is preferable because it permits an extensive choice of a material used for an active layer of the light-receiving element 22.

In particular, the light-emitting and light-receiving portion 20 is preferably provided with a plurality of light-emitting elements 21 and a plurality of light-receiving elements 22. In that case, the light-emitting elements 21 and the light-receiving elements 22 are preferably arranged side by side on the same plane. Furthermore, it is preferable that the light-emitting elements 21 and the light-receiving elements 22 be alternately arranged in one direction or in a matrix.

The light-emitting and light-receiving portion 20 may include the light-emitting element 21 that emits visible light to have a function of displaying an image. In that case, the light-emitting and light-receiving portion 20 may have a structure including a light-emitting element that emits visible light and alight-emitting element that emits infrared light. Moreover, the light-emitting and light-receiving portion 20 preferably functions as a touch panel or a proximity sensor panel.

As the light-emitting element 21, an EL element such as an OLED (Organic Light Emitting Diode) or a QLED (Quantum-dot Light Emitting Diode) is preferably used. Examples of a light-emitting substance included in the EL element include a substance emitting fluorescent light (a fluorescent material), a substance emitting phosphorescent light (a phosphorescent material), a substance exhibiting thermally activated delayed fluorescence (a thermally activated delayed fluorescent (TADF) material), and an inorganic compound (e.g., a quantum dot material).

As the light-receiving element 22, a pn photodiode or a pin photodiode can be used, for example. The light-receiving element functions as a photoelectric conversion element that detects incident light and generates charge. The amount of generated charge in the photoelectric conversion element is determined depending on the amount of incident light. It is particularly preferable to use an organic photodiode including a layer containing an organic compound as the light-receiving element. An organic photodiode, which is easily made thin, lightweight, and large in area and has a high degree of freedom for shape and design, can be used in a variety of devices.

An organic compound is preferably used for the active layer of the light-receiving element 22. In that case, one electrode of the light-emitting element 21 and one electrode of the light-receiving element 22 (the electrodes are also referred to as pixel electrodes) are preferably provided on the same plane. It is further preferable that the other electrode of the light-emitting element 21 and the other electrode of the light-receiving element 22 be an electrode (also referred to as a common electrode) formed using one continuous conductive layer. It is still further preferable that the light-emitting element 21 and the light-receiving element 22 include a common layer. Thus, the manufacturing process of the light-emitting element 21 and the light-receiving element 22 can be simplified, so that the manufacturing cost can be reduced and the manufacturing yield can be increased.

The driver circuit 23 includes a circuit controlling light emission of the light-emitting element 21 and a circuit controlling light reception of the light-receiving element 22. For example, in the case where the light-emitting and light-receiving portion 20 has a structure in which a plurality of pixels each including the light-emitting element 21 and the light-receiving element 22 are arranged in a matrix, the driver circuit 23 includes a pixel circuit included in the pixel, a scan line driver circuit, a signal line driver circuit, and the like.

The reading circuit 24 has a function of generating received-light data on the basis of the electric signal output from the light-receiving element 22 and outputting the data to the control portion 30. For example, the reading circuit 24 includes an amplifier circuit and an AD converter circuit. The received-light data output from the reading circuit 24 to the control portion 30 is preferably digital data.

Light emitted from the light-emitting element 21 is reflected by an object touching or approaching a light-emitting and light-receiving surface of the light-emitting and light-receiving portion 20 and enters the light-receiving element 22. The light-receiving element 22 outputs an electric signal corresponding to the amount of incident light. Accordingly, the touch or approach of the object can be detected. Alternatively, the light-emitting and light-receiving portion 20 may be provided with a touch sensor or a proximity sensor of another type such as a capacitive type, a resistive type, or a surface acoustic wave type.

The data generation portion 31 has a function of generating biological data to be output to the determination portion 32 from the received-light data input by the light-emitting and light-receiving portion 20.

Examples of the vital data that is one of biological data include data on a pulse wave, a heart rate, or the like generated from time-varying data including data obtained by sampling in a certain period, and a variety of data calculated from the pulse wave. The image capturing data on a fingerprint, a palm print, a vein, or the like generated by a still image or the like can be used as biometrics data and is included in biological data.

The determination portion 32 has a function of determining whether the processing portion 33 executes processing or not on the basis of the biological data supplied from the data generation portion 31. In addition, the determination portion 32 has a function of selecting the processing that the processing portion 33 executes on the basis of the biological data.

A variety of vital data or biometrics data can be obtained regularly and constantly by the light-emitting and light-receiving portion 20 and the data generation portion 31; thus, the determination portion 32 can use the vital data or biometrics data for individual authentication, management of a driver's condition, or the like.

Examples of the biological data that can be obtained using visible light and infrared rays include a fingerprint, a palm print, the shape of a vein, a pulse wave, a respiration rate, a pulse, oxygen saturation, blood sugar level, and neutral fat concentration. Examples of the biological data that can be obtained with a different means include facial expression, complexion, a pupil, a voiceprint, and body temperature. It is preferable to use such a variety of biological data to comprehensively determine the user's health conditions.

Whether a plurality of pieces of measured biological data each have a normal value or an abnormal value is determined, and on the basis of a plurality of determination results, the processing can be determined. Alternatively, the conditions of the driver may be determined from the plurality of pieces of measured biological data (e.g., it is determined that the value of a pulse is high, low, or normal), and on the basis of a plurality of determination results, the processing may be determined. These methods have an advantage of a clear basis for the obtained determination results.

Feature values may be extracted from all the pieces of measured biological data, and the processing may be determined from the feature values. According to such a method, it is easy to perform the determination on the basis of not only each piece of the biological data but also a correlation relationship between the plurality of pieces of the biological data.

As a classifier or an identifier for determining the processing from a variety of biological data, a machine learning model that has learned by machine learning is preferably used. The machine learning is roughly classified into supervised machine learning, unsupervised machine learning, outlier detection, and the like.

Examples of the supervised machine learning include k-nearest neighbor, a Naive Bayes classifier, a decision tree, a support vector machine, a random forest, and a neural network. The neural network is especially suitable for a method for extracting feature values from a plurality of pieces of data because learning during the extraction of feature values is possible in the neural network.

Examples of a method for extracting feature values used in the unsupervised machine learning include principal component analysis (PCA) and non-negative matrix factorization (NMF). Examples of the classifier include k-means clustering and DBSCAN.

A combination of a supervised machine learning model and an unsupervised machine learning model may be used for determination of the obtained plurality of pieces of biological data. In that case, as classification labels classified by the unsupervised machine learning model, labels used in another supervised machine learning model may be used.

In the outlier detection, whether the obtained biological data or feature values obtained from one or more pieces of biological data deviate from the normal area is detected. When the outlier is detected, it is highly probable that the conditions of the driver deviate from the normal conditions.

Examples of a model for detecting the outlier include k-nearest neighbor, Local Outlier Factor, One class SVM, and Mahalanobis' Distance. The use of multidimensional data combining information is effective for the outlier detection. The execution of the outlier detection on the basis of a plurality of pieces of information can prevent incorrect detection. In the case where biological data is information that changes over time depending on the state of the user (e.g., a pulse or a respiration rate) or the like, a neighbor method using a sliding window, a dynamic time warping (DTW) method, a singular spectrum transformation method, or the like may be used. In the case of periodically changing biological information, deviation from a prediction model may be detected using LSTM (Long Short Term Memory) or the like.

The determination portion 32 may have a function of comparing information on a fingerprint, a palm print, or the shape of a blood vessel that is input from the data generation portion 31, with information on a fingerprint, a palm print, or the shape of a blood vessel of the driver that is stored in advance, and executing the processing (authentication processing) of determining whether these pieces of information match or not. Examples of the authentication method executed by the determination portion 32 include a method using the degree of similarity between two images compared, e.g., a template matching method or a pattern matching method. Alternatively, fingerprint authentication processing may be executed by inference using machine learning. At this time, the authentication processing is preferably executed by inference using a neural network, in particular.

The processing portion 33 has a function of executing various types of processing in accordance with the result of the determination portion 32.

For example, when a driver is authenticated by the determination portion 32 on the basis of biological information on a fingerprint, a palm print, a vein, or the like of the driver, the processing portion 33 can transfer the vehicle to a state where the vehicle can be driven (also referred to as an idling state). In addition, in the case where the driver is authenticated by the determination portion 32, the processing portion 33 may execute the processing of setting the environment in the vehicle to an environment of the driver's preference. For example, one or more of adjustment of the position of the seat, adjustment of the position of a handle, adjustment of the position of the side view mirror and the rearview mirror, setting of brightness of lighting, setting of an air conditioner, setting of the speed and frequency of wipers, volume setting of audio, and reading of the playlist of the audio are preferably performed by the processing portion 33 after authentication.

In the case where the determination portion 32 determines the wakefulness level of the driver, the processing portion 33 performs processing in accordance with the wakefulness level. For example, brightness of lighting in the vehicle is changed, sound is reproduced, or a scent is diffused such that the wakefulness of the driver is promoted. Furthermore, in the case where it is determined that the driver is incapable of driving, for example, the driving mode of the vehicle is changed to an emergency autonomous driving mode, a hazard lamp is turned on, the vehicle is transferred to a road shoulder, the police, a rescue squad, or an insurance company is called, or other processing can be performed.

The determination portion 32 may further have a function of determining from the biological data, for example, whether the driver had taken alcohol or not, or whether the driver has had a heart attack or the like or not.

The determination portion 32 may further have a function of constantly monitoring whether the driver holds the steering wheel 41 or not. Depending on the kind (level) of autonomous driving, the steering wheel 41 needs to be constantly held; thus, when the determination portion 32 determines that the driver does not hold the steering wheel 41, for example, the processing portion 33 may execute the processing for warning the driver to hold the steering wheel 41.

The rim 42 included in the steering wheel 41 functions as a grip portion that the driver holds, and has a circular shape. The hub 43 is connected to an axis (a shaft) extended from the vehicle and positioned at the center of the steering wheel 41. The spoke 44 is a portion to connect the rim 42 to the hub 43. Although the number of spokes 44 may be one, two or more spokes 44 are preferably included because the intense of the steering wheel 41 increases. For example, a plurality of (typically two to four) spokes 44 are preferably provided in a radial manner with the hub 43 at the center.

An operation switch or an operation panel (touch panel) may be provided on the hub 43 and the spoke 44.

The operation portion 40 may include, in addition to the steering wheel 41, an operation lever such as a column shift or a paddle shift, an operation lever for a winker or a wiper, and the like.

Here, part of the light-emitting and light-receiving portion 20 is preferably provided on a surface of the hub 43. This enables data for authentication to be obtained with a simple operation such as touching the surface of the hub 43 with a finger or a palm of the driver or holding the finger or the palm over the surface of the hub 43 when the driver rides on the vehicle. A part of the light-emitting and light-receiving portion 20 is preferably provided along a surface of the rim 42 of the steering wheel 41. Therefore, when the driver holds the rim 42, received-light data on part of the driver's palm can be obtained.

Structure Example 1-1

Figure 5B:
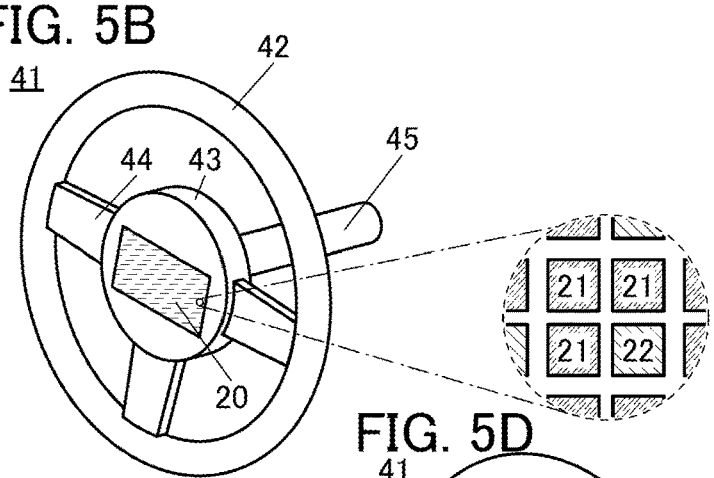

FIG. 5B is a perspective view illustrating an example of the steering wheel 41 provided with the light-emitting and light-receiving portion 20. FIG. 5B illustrates part of a shaft 45 connected to the hub 43.

FIG. 5B illustrates an example in which the light-emitting and light-receiving portion 20 is provided along a surface of the hub 43 on the driver's side.

An enlarged view of part of the light-emitting and light-receiving portion 20 is illustrated on the right side in FIG. 5B. In the light-emitting and light-receiving portion 20, one unit (pixel) consists of four elements which are three light-emitting elements 21 and one light-emitting element 22, and such pixels are arranged in a matrix. For example, each of the pixels has a structure including three kinds of light-emitting elements 21 for red, green, and blue colors and the light-receiving element 22 having sensitivity to visible light. Alternatively, each of the pixels may have a structure including four kinds of light-emitting elements which are a light-emitting element that emits infrared light and the light-emitting elements for red, green, and blue colors, and the light-receiving element 22 having sensitivity to infrared light or both infrared light and visible light. Note that the arrangement method of the light-emitting element 21 and the light-receiving element 22 is not limited thereto, and a variety of arrangement methods can be employed.

Figure 5C:
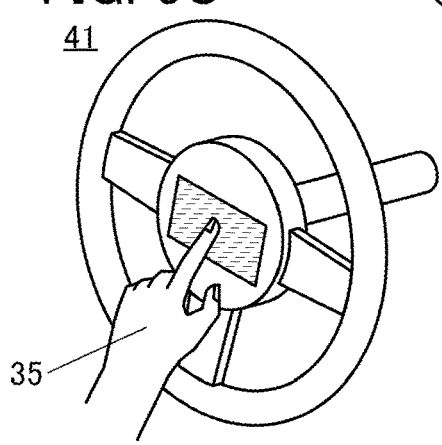
Figure 5D:
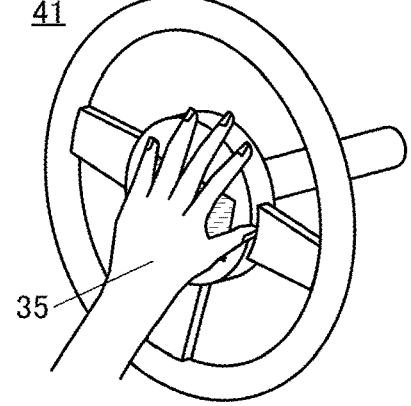

For example, with the use of the light-emitting and light-receiving portion 20, biological information such as a fingerprint, a palm print, or the shape of a vein can be obtained and authentication can be performed. FIG. 5C illustrates a state where an index finger of a hand 35 is touching the light-emitting and light-receiving portion 20. FIG. 5D illustrates a state where a palm of the hand 35 is held over the light-emitting and light-receiving portion 20.

The light-emitting and light-receiving portion 20 provided in the hub 43 may have a function of displaying an image and a function of detecting touch operation or gesture operation. For example, the light-emitting and light-receiving portion 20 may function as a touch panel. Thus, a variety of information can be displayed on the light-emitting and light-receiving portion 20. For example, the light-emitting and light-receiving portion 20 can also be used as a display portion of a navigation system.

Structure Example 1-2

Figure 6:
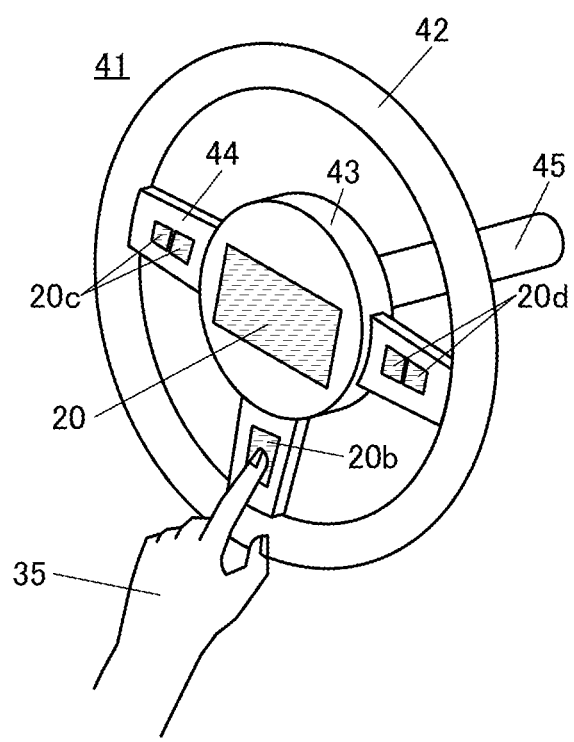
FIG. 6 is a diagram illustrating a structure example of a vehicle control device.

FIG. 6 illustrates an example in which the light-emitting and light-receiving portions are provided along surfaces of the spokes 44.

Of the three spokes 44 in FIG. 6, the spoke 44 positioned on the lower side is provided with a light-emitting and light-receiving portion 20b; the spoke 44 positioned on the left side is provided with a plurality of light-emitting and light-receiving portions 20c; and the spoke 44 positioned on the right side is provided with a plurality of light-emitting and light-receiving portions 20d. Note that the number of the spokes 44 and the number of the light-emitting and light-receiving portions are not limited thereto, and can be changed as appropriate depending on the purpose.

Each of the light-emitting and light-receiving portion 20b, the light-emitting and light-receiving portion 20c, and the light-emitting and light-receiving portion 20d has a structure similar to that of the light-emitting and light-receiving portion 20, in which the light-emitting elements and the light-receiving elements are arranged.

For example, with the light-emitting and light-receiving portion 20b, information on a fingerprint of a driver is obtained, and authentication can be performed using the information. FIG. 6 illustrates a state where a finger of the hand 35 is brought near the light-emitting and light-receiving portion 20b.

The light-emitting and light-receiving portion 20c and the light-emitting and light-receiving portion 20d preferably function as touch sensors. Touching the light-emitting and light-receiving portion 20c, the light-emitting and light-receiving portion 20d, and the like, the driver can operate a navigation system, an audio system, a call system, and the like included in the vehicle. In addition, it is possible to employ a structure capable of a variety of operations such as adjustment of a rearview mirror, adjustment of a sideview mirror, turning on or off of an interior light, adjustment of luminance, and opening or closing a window.

The light-emitting and light-receiving portion 20b, the light-emitting and light-receiving portion 20c, and the light-emitting and light-receiving portion 20d preferably include light-emitting elements that emit visible light. Alternatively, both light-emitting elements that emit visible light and light-emitting elements that emit infrared light may be provided. Accordingly, the position of the light-emitting and light-receiving portion can be shown to the driver even at night. Alternatively, an uneven portion for showing the position of the light-emitting and light-receiving portion may be provided on the surface of the light-emitting and light-receiving portion 20b, the light-emitting and light-receiving portion 20c, and the light-emitting and light-receiving portion 20d or the vicinity thereof.

Structure Example 1-3

Figure 7A:
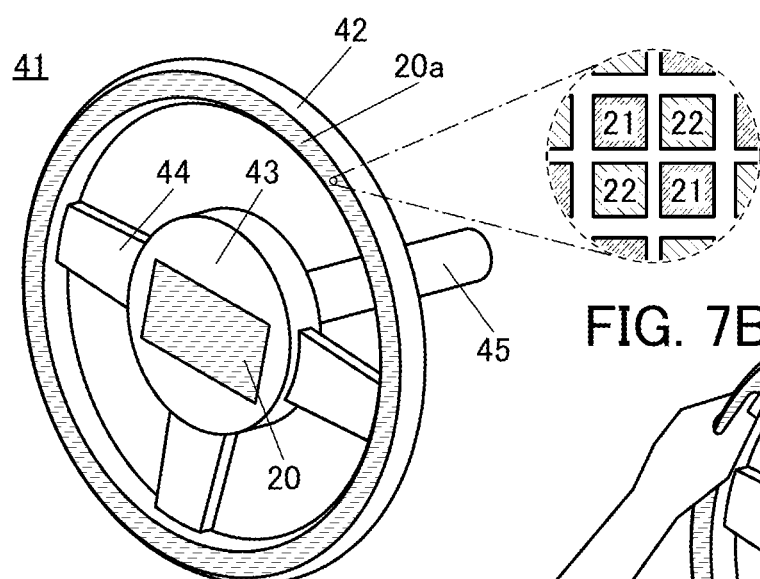
FIG. 7A and FIG. 7B are diagrams illustrating a structure example of a vehicle control device.

FIG. 7A illustrates an example in which a light-emitting and light-receiving portion 20a is provided along the surface of the rim 42 having a circular shape. The rim 42 is processed such that a surface positioned on the front side when seen from the driver is flat, and the light-emitting and light-receiving portion 20a is provided along the flat surface.

An enlarged diagram of part of the light-emitting and light-receiving portion 20a is illustrated on the right side in FIG. 7A. The light-emitting elements 21 and the light-receiving elements 22 are alternately arranged in a matrix in the light-emitting and light-receiving portion 20a. Note that the arrangement method of the light-emitting element 21 and the light-receiving element 22 is not limited thereto, and a variety of arrangement methods can be employed. For example, as in the light-emitting and light-receiving portion 20, a plurality of kinds of light-emitting elements that emit visible light may be included.

Figure 7B:
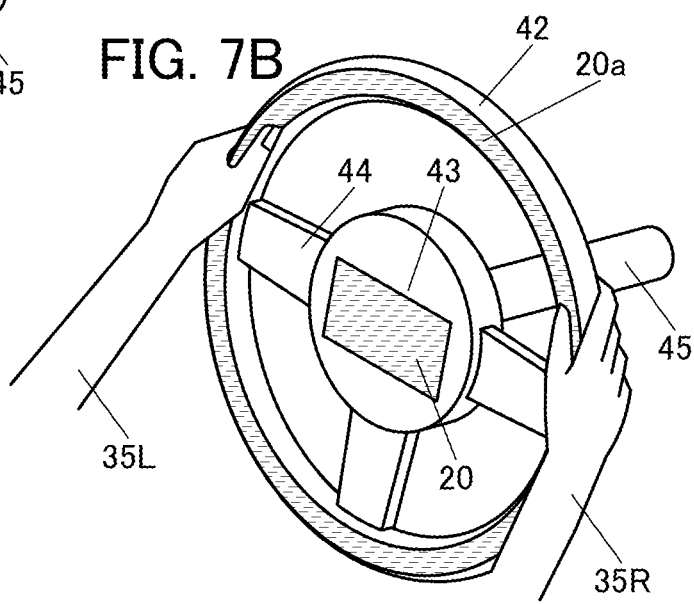

FIG. 7B illustrates a state where a driver holds the rim 42 with his/her left hand 35L and right hand 35R. At this time, the light-emitting element 21 emits light and the light-receiving element 22 receives the light, whereby an image of part of the palms of the driver's left hand 35L and right hand 35R can be captured. Since the light-emitting and light-receiving portion 20a has a circular top surface like the surface of the rim 42, image capturing can be constantly performed when the left hand 35L and the right hand 35R hold any position of the rim 42.

The light-emitting and light-receiving portion 20a is provided on a surface of the rim 42 on the driver's side, and thus the light-emitting and light-receiving portion 20a is positioned in the view of the driver. At this time, the use of a light-emitting element that emits infrared light as the light-emitting element 21 enables image capturing while the driver does not feel glare.

Note that the light-emitting element 21 may be a light-emitting element that emits visible light, in which case it is important that the emission luminance during image capturing is reduced to a level at which the driver does not feel glare. For example, it is preferable to reduce the emission luminance of the light-emitting element 21 at night compared with the daytime.

Figure 8A:
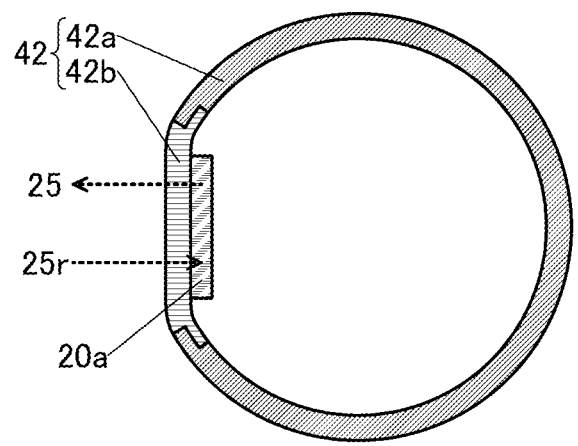
FIG. 8A and FIG. 8B are diagrams illustrating structure examples of a vehicle control device.

FIG. 8A is an example of a schematic cross-sectional view of the rim 42.

The rim 42 includes a member 42a and a member 42b. The member 42b has a light-transmitting property. The light-emitting and light-receiving portion 20a is positioned on the inner side of the rim 42 and provided along part of the member 42b. The light-emitting and light-receiving portion 20a can emit light 25 through the light-transmitting member 42b. Reflected light 25r reflected by an object enters the light-emitting and light-receiving portion 20a through the member 42b.

Here, in FIG. 8A, part of a surface of the member 42b (a surface that is touched by a hand) is flat. Thus, an image capturing surface can be flat, so that an image with little distortion can be captured when an image of a fingerprint, a palm print, the shape of a blood vessel, or the like, which is used in authentication, is captured.

Figure 8B:
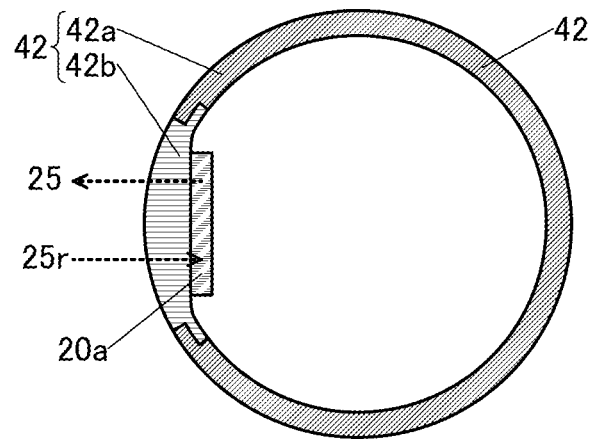

As illustrated in FIG. 8B, the surface may have a curved surface. Therefore, the cross section of the rim 42 can be circular, and thus the driver can easily hold the steering while without a sense of strangeness compared with the case where the rim has the flat surface. Part of the member 42b can function as a lens.

As illustrated in FIG. 8A and FIG. 8B, the light-emitting and light-receiving portion 20a is preferably attached to a flat surface. Thus, the light-emitting and light-receiving portion 20a does not need to be flexible, leading to a reduced manufacturing cost.

Structure Example 1-4

Figure 9A:
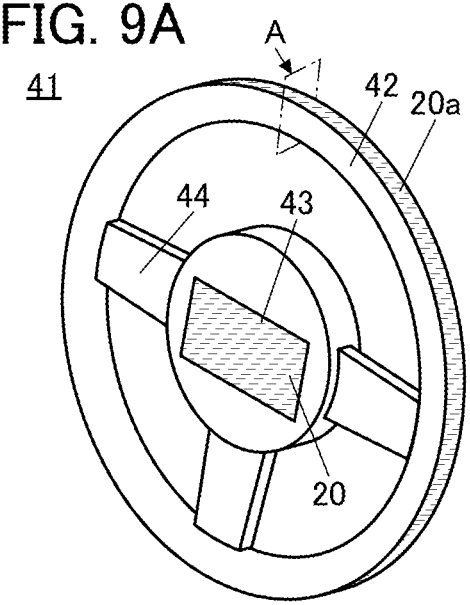
FIG. 9A to FIG. 9D are diagrams illustrating structure examples of a vehicle control device.

The steering wheel 41 illustrated in FIG. 9A is an example in which the light-emitting and light-receiving portion 20a is provided along the periphery of the rim 42.

Figure 9B:
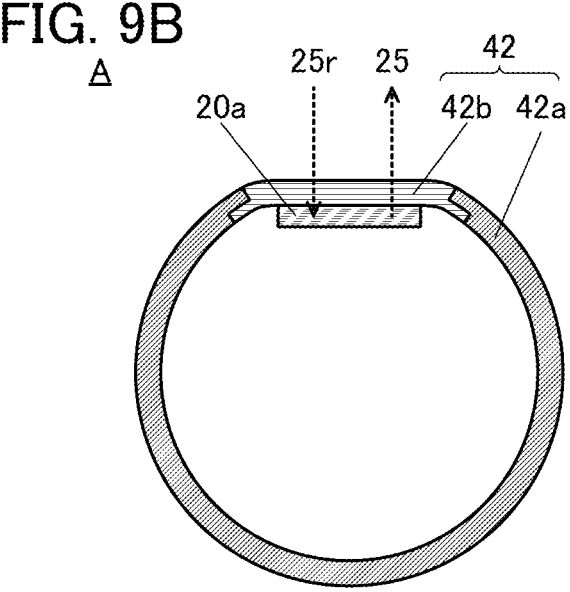

FIG. 9B is a schematic cross-sectional view of the rim 42 at a cutting plane A illustrated in FIG. 9A. FIG. 9B is substantially the same as a diagram obtained by rotating FIG. 8A clockwise by 90°.

In the structure illustrated in FIG. 9A and FIG. 9B, the light-emitting and light-receiving portion 20a having a stripe shape is attached along the member 42b. The light-emitting and light-receiving portion 20a needs to be attached to a curved surface, and thus is preferably flexible. For example, an organic resin is preferably used for a base supporting the light-emitting element 21 and the light-receiving element 22 in the light-emitting and light-receiving portion 20a. Alternatively, glass or the like that is thin enough to have flexibility may be used for the base.

Structure Example 1-5

Figure 9C:
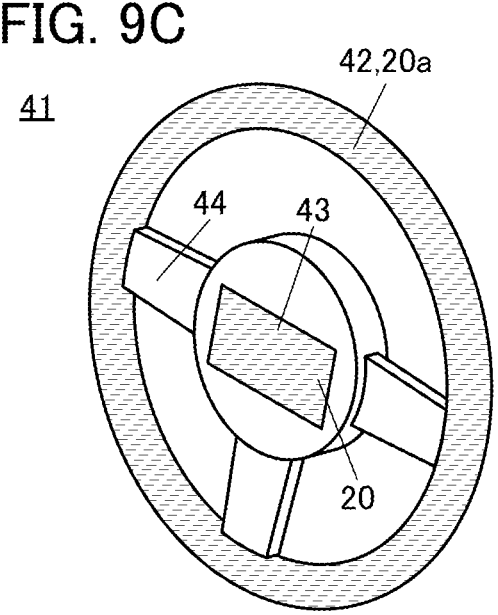

FIG. 9C illustrates an example of the steering wheel 41 in which the light-emitting and light-receiving portion 20a is provided on a large part of the surface of the rim 42.

Figure 9D:
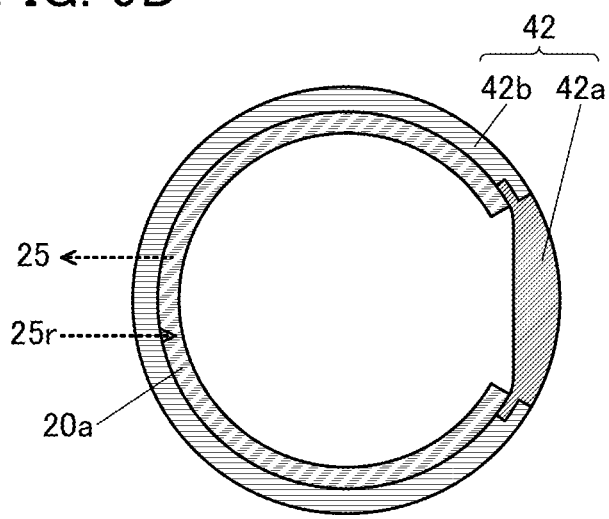

FIG. 9D is a schematic cross-sectional view of the rim 42. The rim 42 includes the member 42a and the member 42b. The member 42a is positioned on the back surface side of the rim 42 (on the side opposite to the driver side). The light-emitting and light-receiving portion 20a is provided along an inner surface of the member 42b. The inner surface of the member 42b is a curved surface that is not a developable surface (three-dimensional curved surface), and the light-emitting and light-receiving surface of the light-emitting and light-receiving portion 20a also forms a three-dimensional curved surface. Therefore, in the case where the light-emitting and light-receiving portion 20a is attached to the inner surface of the member 42a, the light-emitting and light-receiving portion 20a is preferably stretchable. For example, in the light-emitting and light-receiving portion 20a, an elastic body such as rubber is preferably used for the base supporting the light-emitting element 21 and the light-receiving element 22.

With the structure illustrated in FIG. 9C, the area capable of being subjected to image capturing can be increased, so that image capturing sensitivity can be improved. For example, in the case where a pulse wave is estimated from a time-dependent change in the reflectance of skin, a higher sensitivity is preferable to increase the measurement accuracy. An image of a fingerprint, a palm print, the shape of a blood vessel, or the like, which is used in authentication, can be captured in a large area, and thus the authentication accuracy can be increased.

Structure Example 1-6

Figure 10A:
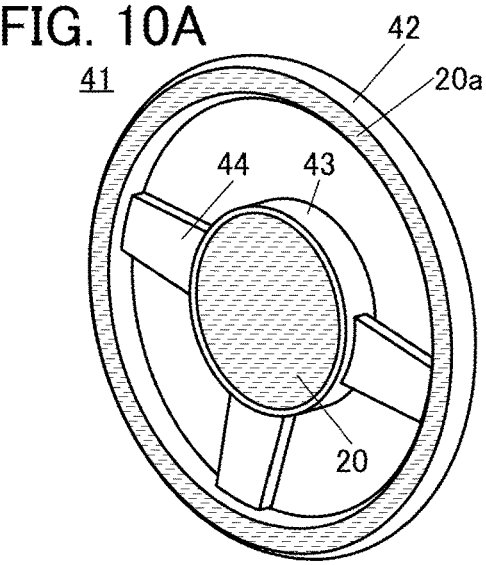
FIG. 10A to FIG. 10D are diagrams illustrating structure examples of a vehicle control device.

The steering wheel 41 illustrated in FIG. 10A is an example in which the external shape of the light-emitting and light-receiving portion 20 provided on the hub 43 is substantially the same (circular) as that of the hub 43. Thus, when the light-emitting and light-receiving portion 20 is provided roughly in the entire region of the surface of the hub 43, the design can be sophisticated compared with the case where the light-emitting and light-receiving portion 20 has a rectangular shape.

Figure 10B:
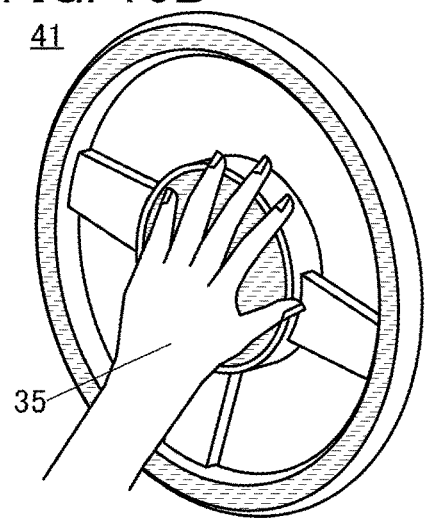

FIG. 10B illustrates a state where a palm of the hand 35 is held over the light-emitting and light-receiving portion 20.

The surface of the hub 43 may be curved. In this case, like the member 42b illustrated as an example in FIG. 8B, a light-transmitting protective member covering the light-emitting and light-receiving surface may have a curved surface and the light-emitting and light-receiving surface of the light-emitting and light-receiving portion 20 may be flat. Alternatively, the light-emitting and light-receiving surface of the light-emitting and light-receiving portion 20 may be curved. In this case, the light-emitting and light-receiving surface of the light-emitting and light-receiving portion 20 may be a developable surface or a three-dimensional curved surface.

Figure 10C:
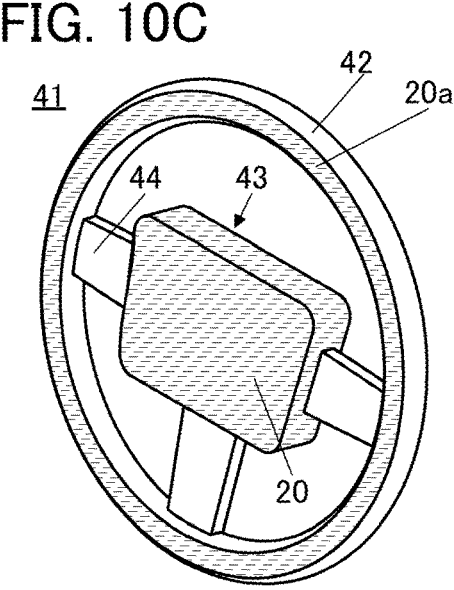

FIG. 10C illustrates an example of a case where the light-emitting and light-receiving portion 20 is provided to cover the surface of the hub 43 having a vertically asymmetric shape. The light-emitting and light-receiving portion is provided on not only the surface of the hub 43 on the driver side but also the side surface of the hub 43.

Figure 10D:
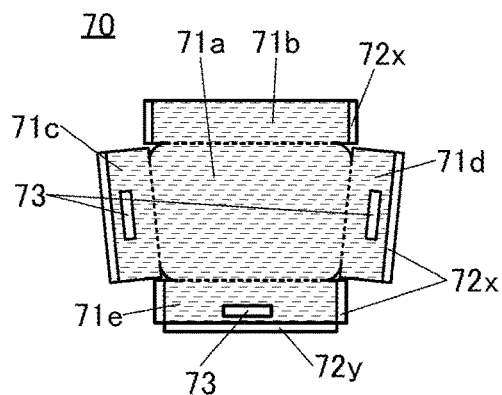

FIG. 10D is a development diagram of a display panel 70 that can be used for the light-emitting and light-receiving portion 20 illustrated in FIG. 10C. The display panel 70 includes a center display region 71a, on all sides of which display regions 71b to 71e each having a rectangular shape are provided. A driver circuit 72x and a driver circuit 72y are connected to the display regions 71b to 71e. The display regions 71c to 71e are provided with three holes 73 that the spokes 44 pass through.

In the structure examples 1-3 to 1-6, the light-emitting and light-receiving portion is provided in each of the rim 42 and the hub 43, so that information obtained in the light-emitting and light-receiving portion 20a provided in the rim 42 and information obtained in the light-emitting and light-receiving portion 20 provided in the hub 43 may be different from each other. For example, the light-emitting and light-receiving portion 20 obtains an image for authentication as information, and the light-emitting and light-receiving portion 20a obtains a time-dependent change in the reflectance of skin as information. In this case, the light-emitting and light-receiving portion 20 needs to capture a high-resolution image, and thus the light-receiving elements 22 are arranged with high density. On the other hand, the light-emitting and light-receiving portion 20a does not need to capture a high-resolution image, and thus the light-receiving elements 22 are arranged with lower density than in the light-emitting and light-receiving portion 20. In this manner, the structure of the light-emitting and light-receiving portion can be varied in accordance with information to be obtained.

Although in FIG. 10A and FIG. 10B, the light-emitting and light-receiving portion 20a provided in the rim 42 has the same structure as that in FIG. 7A and the like, the structure is not limited thereto, and the structure illustrated in FIG. 9A or FIG. 9C can be employed.

Although the cases where the light-emitting and light-receiving portion 20 provided in the rim 42 is provided in the circumferential direction of the rim 42 are described above, the light-emitting and light-receiving portion 20 does not necessarily have a continuous circular shape and may have an arc-like top surface along the surface of the rim 42. That is, in the circumferential direction of the rim 42, part where the light-emitting and light-receiving portion 20 is not provided may exist. A plurality of light-emitting and light-receiving portions 20 may be provided along the surface of the rim 42. In that case, a plurality of light-emitting and light-receiving portions 20 may be arranged so that two adjacent light-emitting and light-receiving portions 20 overlap with each other, whereby the light-emitting and light-receiving region is continuous in the circumferential direction of the rim 42.

Structure Example of Light-Emitting and Light-Receiving Portion

A structure example of a light-emitting and light-receiving portion including two or more kinds of light-emitting elements is described below. In the light-emitting and light-receiving portion exemplified below, the light-emitting elements can be used not only as a light source for image capturing but also for displaying an image. That is, the light-emitting and light-receiving portion exemplified below also functions as a display portion. Such light-emitting and light-receiving portion can be used as the light-emitting and light-receiving portion 20, the light-emitting and light-receiving portions 20a to 20d, or the like.

Figure 10E:
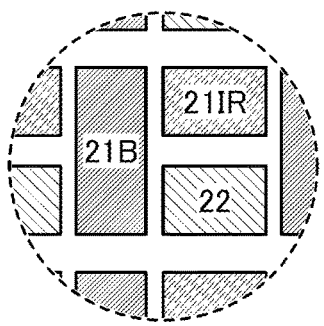
FIG. 10E to FIG. 10G are diagrams illustrating structure examples of a pixel of a light-emitting and light-receiving portion.
Figure 10F:
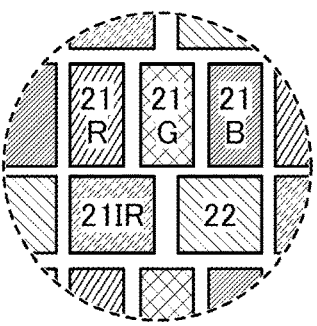
Figure 10G:
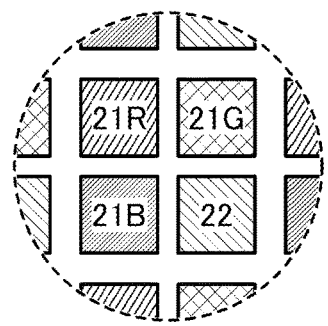

FIG. 10E to FIG. 10G illustrate an enlarged view of the light-emitting and light-receiving portion.

The light-emitting and light-receiving portion illustrated in FIG. 10E includes a light-emitting element 21B that emits blue light, a light-emitting element 21IR that emits infrared light, and the light-receiving element 22. The light-receiving element 22 is a photoelectric conversion element having sensitivity to at least infrared light. The light-receiving element 22 may have sensitivity to blue and infrared light.

The light-emitting and light-receiving portion illustrated in FIG. 10E can display a blue image, emit blue light, and the like. Blue light is preferable because glare is less likely to be felt and driving is less likely to be hindered even at night. Note that the light-emitting element that emits visible light provided in the light-emitting and light-receiving portion is not limited to a light-emitting element that emits blue light, and may be a light-emitting element that emits light of another color such as red or green.

The light-emitting and light-receiving portion illustrated in FIG. 10F includes a light-emitting element 21R that emits red light, a light-emitting element 21G that emits green light, the light-emitting element 21B that emits blue light, the light-emitting element 21IR that emits infrared light, and the light-receiving element 22. The light-receiving element 22 is a photoelectric conversion element having sensitivity to at least infrared light. The light-receiving element 22 may further have sensitivity to at least one of red light, blue light, and green light.

The light-emitting and light-receiving portion illustrated in FIG. 10F can display a full-color image. Even when an image is not displayed, that is, even when visible light is not emitted from the light-emitting and light-receiving portion, image capturing can be performed using infrared light.

The light-emitting and light-receiving portion illustrated in FIG. 10G includes the light-emitting element 21R that emits red light, the light-emitting element 21G that emits green light, the light-emitting element 21B that emits blue light, and the light-receiving element 22. The light-receiving element 22 has sensitivity to at least one of red, blue, and green.

The light-emitting and light-receiving portion illustrated in FIG. 10G has a function of image capturing using visible light, not infrared light, as a light source. A full-color image can be displayed. Since the light-emitting element 21IR is not provided, the pixels can be provided with a high density and an image with a high definition can be captured compared with FIG. 10F. Alternatively, since the area of the light-receiving element can be large, the sensitivity of the light-receiving element can be increased. Furthermore, since the area of each light-emitting element can be large, emission luminance can be increased.

Operation Method Example

An example of an operation method of the vehicle control device 10 of one embodiment of the present invention is described below.

Figure 11:
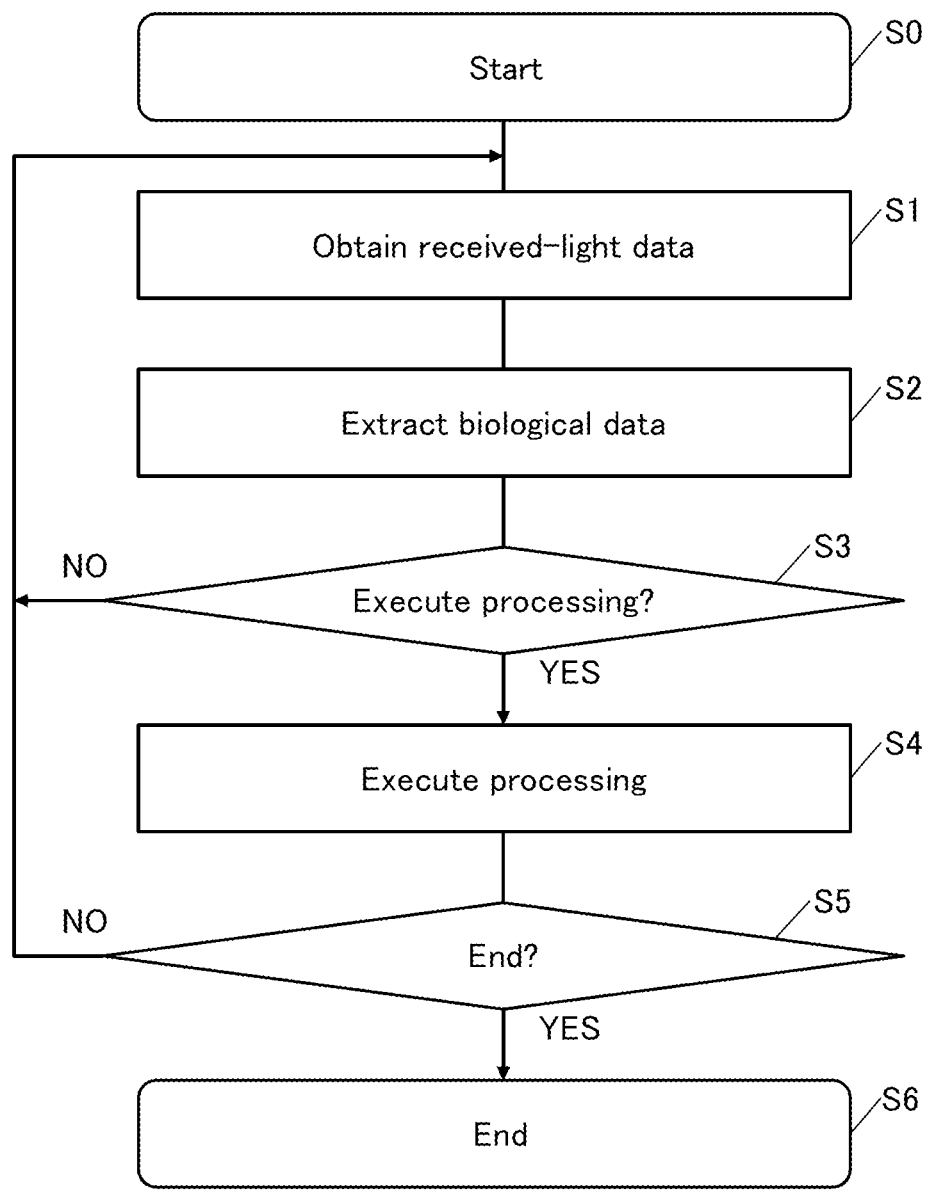
FIG. 11 is a flow chart of an operation method example of a vehicle control device.

FIG. 11 is a flow chart of the operation of the vehicle control device 10. The flow chart shown in FIG. 11 includes Step S0 to Step S6.

First, the operation starts in Step S0.

In Step S1, received-light data is obtained in the light-emitting and light-receiving portion 20 or the like. Specifically, the light-emitting element 21 emits light, the light-receiving element 22 receives the light, and the reading circuit 24 reads the received-light data. In Step S1, the received-light data may be output from the reading circuit 24 to the control portion 30.

In Step S2, the data generation portion 31 extracts biological data. Specifically, the data generation portion 31 generates required biological data from the received-light data supplied from the light-emitting and light-receiving portion 20. For example, vital data such as waveform data of a pulse wave, a heart rate, a pulse, blood oxygen saturation, blood pressure, stress level, blood sugar level, body temperature, neutral fat concentration, or blood alcohol concentration can be generated. Furthermore, biometrics data such as a fingerprint, a palm print, or the shape of a blood vessel can be generated as the biological data.

In Step S3, the determination portion 32 determines whether processing is executed or not. When the processing is executed, the operation proceeds to Step S4. When the processing is not executed, the operation returns to Step S1.

In Step S3, the determination portion 32 can perform the determination on the basis of the above biological data. The determination portion 32 may perform the determination on the basis of two or more pieces of the above biological data.

In Step S4, the processing portion 33 executes processing.

In Step S5, it is determined whether to end the operation. When the operation is ended on the basis of the processing executed in the processing portion 33, the operation proceeds to Step S6 to be ended. When the operation is not ended (the operation is continued), the operation returns to Step S1.

The above is the description of the operation method example.

In the above driving method example, a variety of data can be used as the biological data that can be used for the determination of the determination portion 32. Furthermore, a wide range of processing is executed in the processing portion 33 on the basis of the determination of the determination portion 32. An example is described below.

Figure 12:
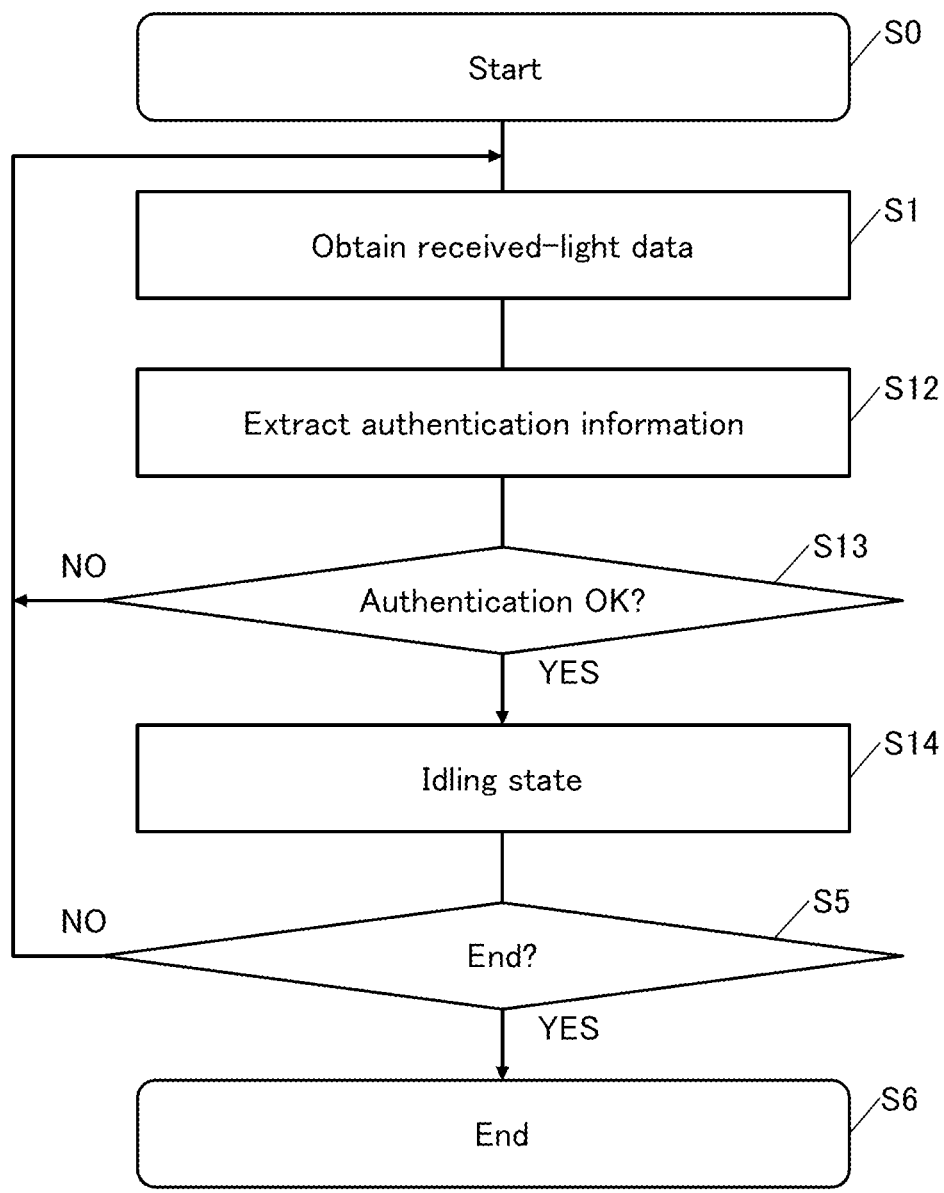
FIG. 12 is a flow chart of an operation method example of a vehicle control device.

FIG. 12 illustrates a flow chart regarding an operation in which authentication processing is executed on the basis of biometrics data to bring the vehicle into a drivable state (an idling state). In the flow chart illustrated in FIG. 12, Step S2 to Step S4 in FIG. 11 are replaced with Step S12 to Step S14.

In Step S12, in the data generation portion 31, captured-image data on a fingerprint, a palm print, or the shape of a vein is extracted as biometrics data.

In Step S13, authentication processing is executed. For example, the information on the fingerprint, the palm print, or the shape of the vein obtained in Step S12 and biological information on the driver registered in advance are compared with each other, and whether they match each other is determined. The determination can be performed by an authentication method that does not use a machine learning model, such as a pattern matching method, or authentication using a machine learning model. When authenticated (authentication OK), the processing proceeds to Step S14. When not authenticated, the processing returns to Step S1.

When not authenticated in Step S13, because of the risk of theft, security actions such as generating a warning sound, notifying the police and providing the present location and an image of the thief, and locking the doors of the vehicle to prevent escape may be executed.

In Step S14, the vehicle can be brought into a drivable state (an idling state). In addition, the above-described processing may be executed to set the environment in the vehicle to an environment of the driver's preference.

The above is the description of the flow chart in FIG. 12.

Figure 13:
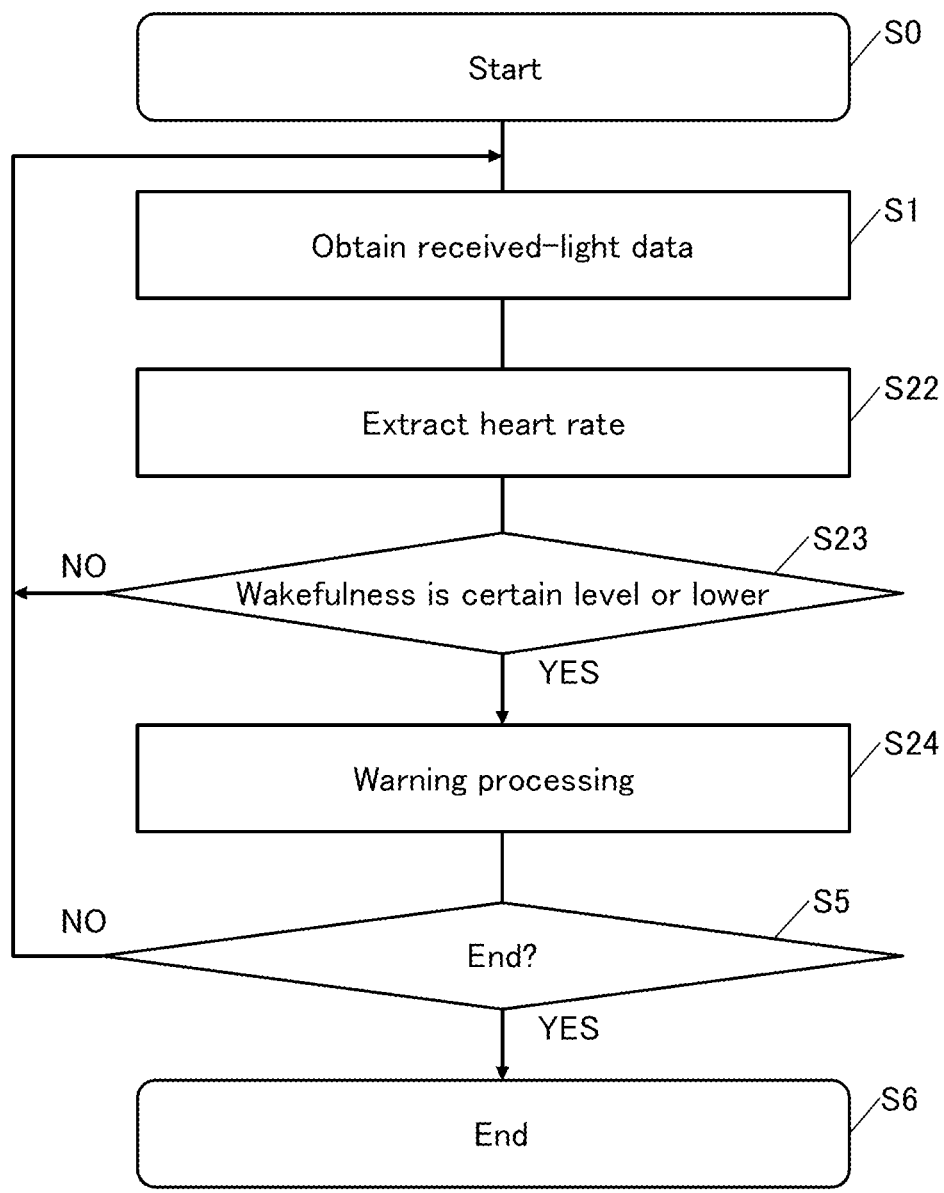
FIG. 13 is a flow chart of an operation method example of a vehicle control device.

FIG. 13 shows a flow chart relating to an operation in which the driver's wakefulness is determined and, in the case where drowsy driving might be happened, the driver is warned. In the flow chart shown in FIG. 13, Step S2 to Step S4 in FIG. 11 are replaced with Step S22 to Step S24.

In Step S22, a heart rate is extracted in the data generation portion 31 as the vital data.

In Step S23, the determination portion 32 determines whether the wakefulness level is lower than or equal to a certain level on the basis of a change in the heart rate. When the wakefulness level is lower than or equal to a certain level, the operation proceeds to Step S24. On the other hand, when the wakefulness level is higher than a certain level, the operation returns to Step S1.

For example, the determination portion 32 can estimate the wakefulness level of the driver from a late heart rate or generation of a change in variation of the heart rate.

In Step S24, the processing portion 33 executes the warning processing to the driver. In the warning processing, the driver's sense of sight, hearing, touch, or smell is stimulated, whereby the driver can recognize a decrease in the wakefulness level or the wakefulness of the driver can be promoted. Specific examples of the processing executed by the processing portion 33 include playing sound, turning up the volume, vibrating a seat, a seat belt, a steering wheel, or the like, changing luminance in a vehicle, opening a window, diffusing scent from an aroma diffuser.

The above is the description of the flow chart in FIG. 13.

Note that in the case where the wakefulness level is too high, it can be determined that the driver is in an excited state; thus, processing for making the driver recognize the excited state or calming the driver down can be executed.

As described above, the vehicle control device of one embodiment of the present invention can monitor a variety of physical states of a driver or the change from vital data that can be obtained in a light-emitting and light-receiving portion. In addition, various types of processing can be executed in accordance with the driver's state such that the driver can continue safe driving or avoid danger.

At least part of this embodiment can be implemented in combination with the other embodiments described in this specification as appropriate.

Embodiment 2

In this embodiment, structure examples and application examples of a stacked-layer panel that is one embodiment of a display panel that can easily have a larger size are described with reference to drawings.

One embodiment of the present invention is a display panel capable of increasing its size by arranging a plurality of display panels to partly overlap one another. In two of the overlapping display panels, at least a display panel positioned on the display surface side (upper side) includes a region transmitting visible light that is adjacent to a display portion. A pixel of a display panel positioned on the lower side and the region transmitting visible light of the display panel positioned on the upper side are provided to overlap with each other. Thus, the two of the overlapping display panels can display a seamless and contiguous image when seen from the display surface side (in a plan view).

For example, one embodiment of the present invention is a stacked-layer panel including a first display panel and a second display panel. The first display panel includes a first region, and the first region includes a first pixel and a second pixel. The second display panel includes a second region, a third region, and a fourth region. The second region includes a third pixel. The third region has a function of transmitting visible light. The fourth region has a function of blocking visible light. The second pixel of the first display panel and the third region of the second display panel have a region where they overlap with each other. The aperture ratio of the second pixel is preferably higher than the aperture ratio of the first pixel.

For one or both of the first display panel and the second display panel, the display apparatus described above as an example, which includes a light-emitting element and a light-receiving element, can be used. In other words, at least one of the first pixel, the second pixel, and the third pixel includes a light-emitting element and a light-receiving element.

More details of the structure of one embodiment of the present invention are as follows.

Structure Example 1

[Display Panel]

Figure 14A:
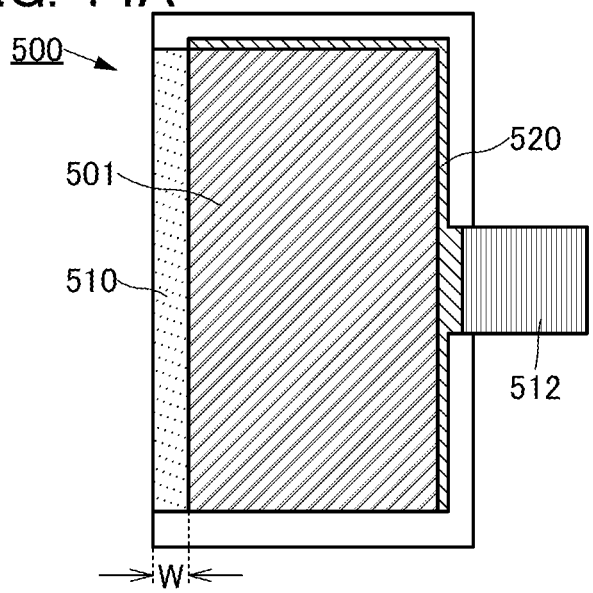
FIG. 14A and FIG. 14B are diagrams illustrating structure examples of a display apparatus.

FIG. 14A is a schematic top view of a display panel 500 included in a display apparatus of one embodiment of the present invention.

The display panel 500 includes a display region 501, and a region 510 transmitting visible light and a region 520 having a portion blocking visible light that are adjacent to the display region 501. FIG. 18A illustrates an example in which the display panel 500 is provided with an FPC (Flexible Printed Circuit) 512.

Here, an image can be displayed on the display region 501 even when the display panel 500 is used independently. Moreover, an image can be captured by the display region 501 even when the display panel 500 is used independently.

In the region 510, for example, a pair of substrates included in the display panel 500, a sealant for sealing the display element interposed between the pair of substrates, and the like may be provided. Here, for a member provided in the region 510, a material with a visible-light-transmitting property is used.

In the region 520, for example, a wiring electrically connected to pixels included in the display region 501 is provided. In addition to such wiring, driver circuits (such as a scan line driver circuit and a signal line driver circuit) for driving the pixels or a circuit such as a protective circuit may be provided. Furthermore, the region 520 includes a region where a terminal electrically connected to the FPC 512 (also referred to as a connection terminal), a wiring electrically connected to the terminal, and the like are provided.

For specific description of a cross-sectional structure example or the like of the display panel, the other embodiments can be referred to.

[Stacked-Layer Panel]

Figure 14B:
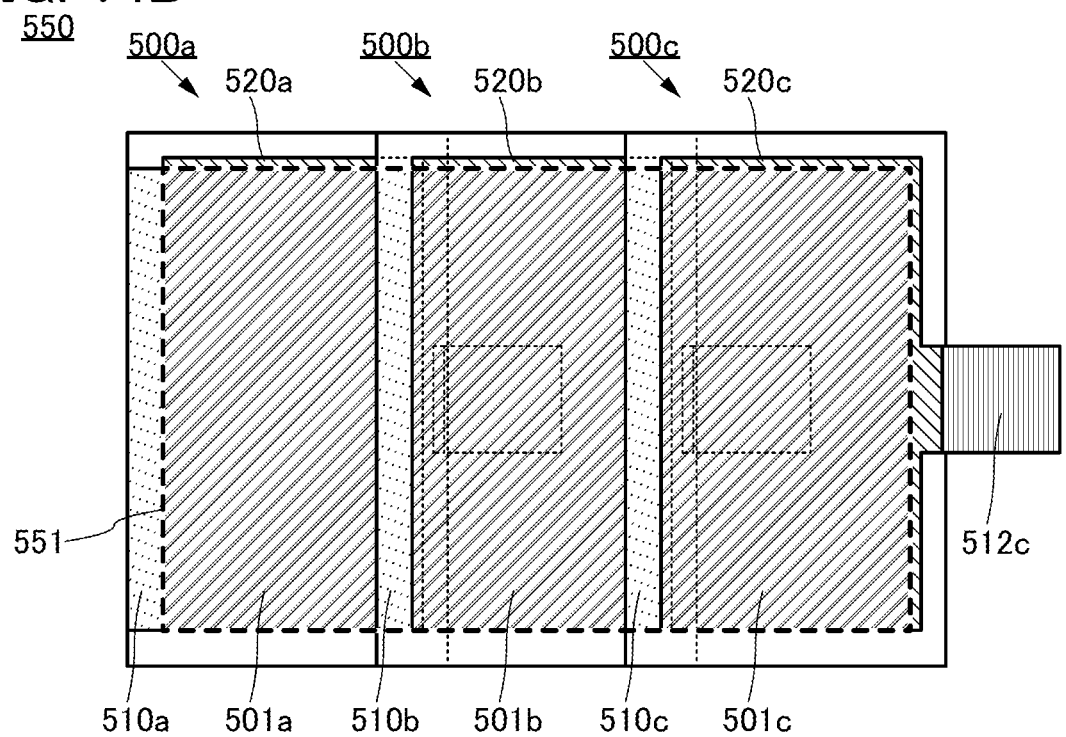

A stacked-layer panel 550 of one embodiment of the present invention includes a plurality of display panels 500 described above. FIG. 14B illustrates a schematic top view of the stacked-layer panel 550 including three display panels.

Hereinafter, to distinguish the display panels from each other, the same components included in the display panels from each other, or the same components relating to the display panels from each other, letters are added to reference numerals of them. Unless otherwise specified, in a plurality of display panels partly overlapping with each other, "a" is added to reference numerals for a display panel placed on the lowest side (the side opposite to the display surface side), components thereof, and the like, and to one or more display panels placed on the upper side of the display panel, components thereof, and the like, "b" or letters after "b" in alphabetical order are added from the lower side. Furthermore, unless otherwise specified, in describing a structure in which a plurality of display panels is included, letters are not added when a common part of the display panels, the components, or the like is described.

The stacked-layer panel 550 illustrated in FIG. 14B includes a display panel 500a, a display panel 500b, and a display panel 500c.

The display panel 500b is placed so that part of the display panel 500b is stacked over an upper side (a display surface side) of the display panel 500a. Specifically, the display panel 500b is placed so that a display region 501a of the display panel 500a and a region 510b transmitting visible light of the display panel 500b overlap with each other and the display region 501a of the display panel 500a and a region 520b blocking visible light of the display panel 500b do not overlap each other.

Similarly, the display panel 500c is placed so as to partly overlap with an upper side (display surface side) of the display panel 500b. Specifically, the display panel 500c is placed so that a display region 501b of the display panel 500b and a region 510c transmitting visible light of the display panel 500c overlap with each other and the display region 501b of the display panel 500b and a region 520c blocking visible light of the display panel 500c do not overlap each other.

The region 510b transmitting visible light overlaps with the display region 501a; thus, the whole display region 501a can be visually recognized from the display surface side. Similarly, the whole display region 501b can also be visually recognized from the display surface side when the region 510c overlaps with the display region 501b. Therefore, a region where the display region 501a, the display region 501b, and a display region 501c are placed seamlessly can serve as a display region 551 of the stacked-layer panel 550.

The display region 551 of the stacked-layer panel 550 can be enlarged by the number of display panels 500. Here, by using display panels each having an image capturing function (i.e., display panels each including a light-emitting element and a light-receiving element) as all the display panels 500, the entire display region 551 can serve as an imaging region.

Note that without limitation to the above, a display panel having an image capturing function and a display panel not having an image capturing function (e.g., a display panel having no light-receiving element) may be combined. For example, a display panel having an image capturing function can be used where needed, and a display panel not having an image capturing function can be used in other portions.

Structure Example 2

In FIG. 14B, the plurality of display panels 500 overlap each other in one direction; however, the plurality of display panels 500 may overlap each other in two directions of the vertical and horizontal directions.

Figure 15A:
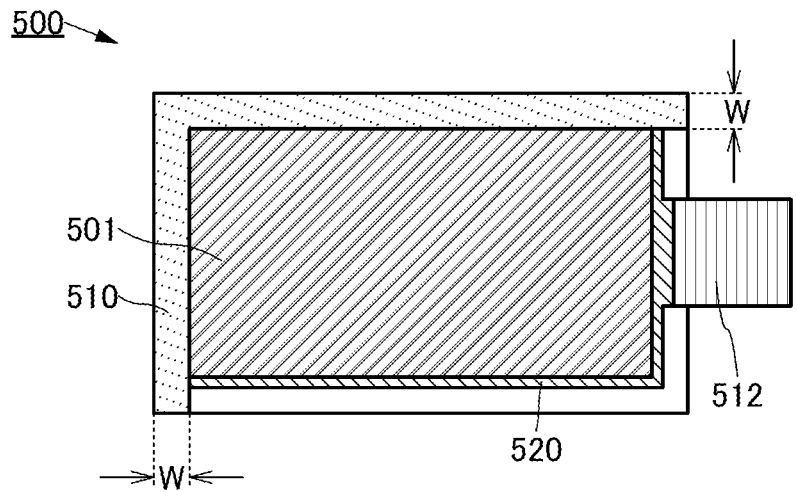
FIG. 15A to FIG. 15C are diagrams illustrating structure examples of a display apparatus.

FIG. 15A illustrates an example of the display panel 500 that differs from that in FIG. 14A in the shape of the region 510. In the display panel 500 in FIG. 15A, the region 510 transmitting visible light is placed along two sides of the display region 501.

Figure 15B:
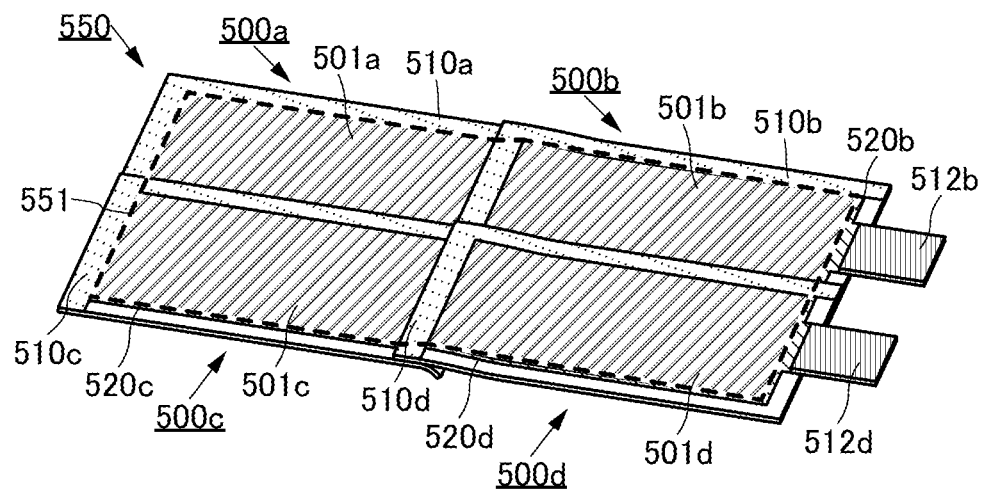
Figure 15C:
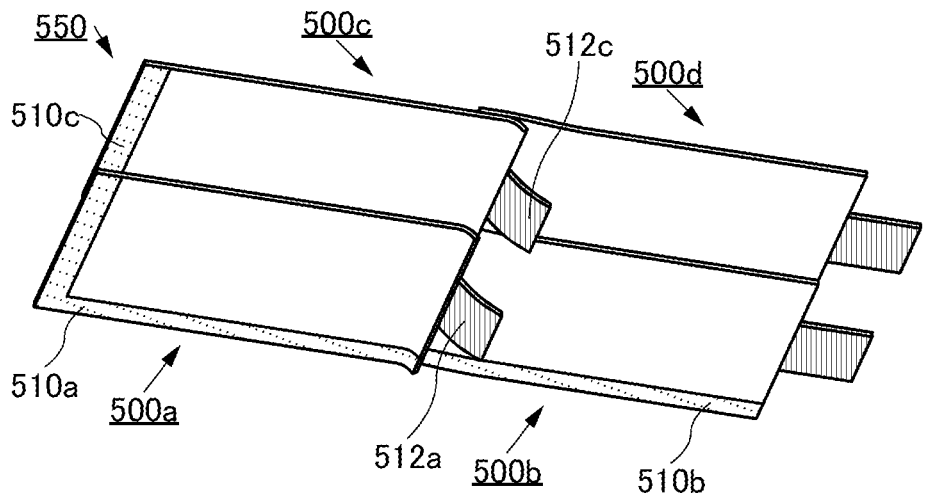

FIG. 15B is a schematic perspective view of the stacked-layer panel 550 in which the display panels 500 in FIG. 15A are arranged two by two in both vertical and horizontal directions. FIG. 15C is a schematic perspective view of the stacked-layer panel 550 when seen from a side opposite to the display surface side.

In FIG. 15B and FIG. 15C, a region along a short side of the display region 501a of the display panel 500a overlaps with part of the region 510b of the display panel 500b. In addition, a region along a long side of the display region 501a of the display panel 500a overlaps with part of the region 510c of the display panel 500c. Moreover, a region 510d of a display panel 500d overlaps with a region along a long side of the display region 501b of the display panel 500b and a region along a short side of the display region 501c of the display panel 500c.

Therefore, as illustrated in FIG. 15B, a region where the display region 501a, the display region 501b, the display region 501c, and the display region 501d are placed seamlessly can serve as the display region 551 of the stacked-layer panel 550.

Here, it is preferable that a flexible material be used for the pair of substrates included in the display panel 500 and the display panel 500 have flexibility. Thus, as is the case of the display panel 500a in FIG. 15B and FIG. 15C, part of the display panel 500a on an FPC 512a side is curved when the FPC 512a and the like are provided on the display surface side, whereby the FPC 512a is placed under the display region 501b of the adjacent display panel 500b so as to overlap with the display region 501b, for example. As a result, the FPC 512a can be placed without physical interference with the rear surface of the display panel 500b. Furthermore, when the display panel 500a and the display panel 500b overlap with and are bonded to each other, it is not necessary to consider the thickness of the FPC 512*a*; thus, a difference in the height between the top surface of the region 510*b* of the display panel 500*b* and the top surface of the display region 501*a* of the display panel 500*a* can be reduced. As a result, the end portion of the display panel 500*b* over the display region 501*a* is prevented from being viewed.

Moreover, each display panel 500 is made flexible, in which case the display panel 500*b* can be curved gently so that the height of the top surface of the display region 501*b* of the display panel 500*b* is the same as the height of the top surface of the display region 501*a* of the display panel 500*a*. Thus, the display regions can have uniform height except in the vicinity of a region where the display panel 500*a* and the display panel 500*b* overlap with each other, and the display quality of an image displayed on the display region 551 of the stacked-layer panel 550 can be improved.

Although the relation between the display panel 500*a* and the display panel 500*b* is taken as an example in the above description, the same applies to the relation between any other two adjacent display panels.

To reduce the step between two adjacent display panels 500, the thickness of the display panel 500 is preferably small. For example, the thickness of the display panel 500 is preferably less than or equal to 1 mm, further preferably less than or equal to 300 µm, still further preferably less than or equal to 100 µm.

Moreover, a substrate for protecting the display region 551 of the stacked-layer panel 550 (e.g., the second substrate in Embodiment 1) may be provided. The substrate may be provided for each display panel, or one substrate may be provided for a plurality of display panels.

Note that although the structure where the four display panels 500 are stacked is described above, when the number of display panels 500 is increased, an extremely large stacked-layer panel can be obtained. Furthermore, by changing a method for arranging the plurality of display panels 500, the shape of the contour of the display region of the stacked-layer panel can be any of a variety of shapes such as a circular shape, an elliptical shape, and a polygonal shape. In addition, when the display panels 500 are arranged in a three-dimensional manner, a stacked-layer panel including a display region with a three-dimensional shape can be obtained.

At least part of this embodiment can be implemented in combination with the other embodiments described in this specification as appropriate.

Embodiment 3

In this embodiment, a light-emitting and light-receiving apparatus of one embodiment of the present invention will be described. A display apparatus exemplified below can be favorably used for the light-emitting and light-receiving portion of the vehicle control device described in Embodiment 1.

A light-emitting and light-receiving portion of the light-emitting and light-receiving apparatus of one embodiment of the present invention includes light-receiving elements (also referred to as light-receiving devices) and light-emitting elements (also referred to as light-emitting devices). The light-emitting and light-receiving portion has a function of displaying an image with the use of the light-emitting elements. Furthermore, the light-emitting and light-receiving portion has one or both of a function of capturing an image with the use of the light-receiving elements and a detection function. Thus, the light-emitting and light-receiving apparatus of one embodiment of the present invention can be expressed as a display apparatus, and the light-emitting and light-receiving portion can be expressed as a display portion.

Alternatively, the light-emitting and light-receiving apparatus of one embodiment of the present invention may have a structure including light-emitting and light-receiving elements (also referred to as light-emitting and light-receiving devices) and light-emitting elements.

First, a light-emitting and light-receiving apparatus including light-receiving elements and light-emitting elements is described.

The light-emitting and light-receiving apparatus of one embodiment of the present invention includes a light-receiving element and a light-emitting element in a light-emitting and light-receiving portion. In the light-emitting and light-receiving apparatus of one embodiment of the present invention, the light-emitting elements are arranged in a matrix in the light-emitting and light-receiving portion, and an image can be displayed on the light-emitting and light-receiving portion. Furthermore, the light-receiving elements are arranged in a matrix in the light-emitting and light-receiving portion, and the light-emitting and light-receiving portion has one or both of an image capturing function and a sensing function. The light-emitting and light-receiving portion can be used as an image sensor, a touch sensor, or the like. That is, by detecting light with the light-emitting and light-receiving portion, an image can be captured and touch operation of an object (e.g., a finger or a stylus) can be detected. Furthermore, in the light-emitting and light-receiving apparatus of one embodiment of the present invention, the light-emitting elements can be used as a light source of the sensor. Accordingly, a light-receiving portion and a light source do not need to be provided separately from the light-emitting and light-receiving apparatus; hence, the number of components of an electronic device can be reduced.

In the light-emitting and light-receiving apparatus of one embodiment of the present invention, when an object reflects (or scatters) light emitted from the light-emitting element included in the light-emitting and light-receiving portion, the light-receiving element can detect the reflected light (or the scattered light); thus, image capturing, touch operation detection, or the like is possible even in a dark place.

The light-emitting element included in the light-emitting and light-receiving apparatus of one embodiment of the present invention functions as a display element (also referred to as a display device).

As the light-emitting element, an EL element (also referred to as an EL device) such as an OLED or a QLED is preferably used. Examples of a light-emitting substance contained in the EL element include a substance exhibiting fluorescence (a fluorescent material), a substance exhibiting phosphorescence (a phosphorescent material), and a substance exhibiting thermally activated delayed fluorescence (a thermally activated delayed fluorescent (TADF) material). Examples of the light-emitting substances contained in the EL elements include inorganic compounds (e.g., quantum dot materials) in addition to organic compounds. An LED such as a micro LED can also be used as the light-emitting element.

The light-emitting and light-receiving apparatus of one embodiment of the present invention has a function of detecting light with the use of a light-receiving element.

When the light-receiving elements are used as an image sensor, the light-emitting and light-receiving apparatus can capture an image using the light-receiving elements. For example, the light-emitting and light-receiving apparatus can be used as a scanner.

An electronic device including the light-emitting and light-receiving apparatus of one embodiment of the present invention can obtain data related to biological information such as a fingerprint or a palm print by using a function of an image sensor. That is, a biometric authentication sensor can be incorporated in the light-emitting and light-receiving apparatus. When the light-emitting and light-receiving apparatus incorporates a biometric authentication sensor, the number of components of an electronic device can be reduced as compared to the case where a biometric authentication sensor is provided separately from the light-emitting and light-receiving apparatus; thus, the size and weight of the electronic device can be reduced.

When the light-receiving elements are used as the touch sensor, the light-emitting and light-receiving apparatus can detect touch operation of an object with the use of the light-receiving elements.

As the light-receiving element, a pn photodiode or a pin photodiode can be used, for example. The light-receiving element functions as a photoelectric conversion element (also referred to as a photoelectric conversion device) that detects light entering the light-receiving element and generates electric charge. The amount of electric charge generated from the light-receiving element depends on the amount of light entering the light-receiving element.

It is particularly preferable to use an organic photodiode including a layer containing an organic compound as the light-receiving element. An organic photodiode, which is easily made thin, lightweight, and large in area and has a high degree of freedom for shape and design, can be used in a variety of devices.

In one embodiment of the present invention, organic EL elements (also referred to as organic EL devices) are used as the light-emitting elements, and organic photodiodes are used as the light-receiving elements. The organic EL elements and the organic photodiodes can be formed over one substrate. Thus, the organic photodiodes can be incorporated in the display apparatus including the organic EL elements.

In the case where all the layers of the organic EL elements and the organic photodiodes are formed separately, the number of deposition steps becomes extremely large. However, a large number of layers of the organic photodiodes can have a structure in common with the organic EL elements; thus, concurrently depositing the layers that can have a common structure can inhibit an increase in the number of deposition steps.

For example, one of a pair of electrodes (a common electrode) can be a layer shared by the light-receiving element and the light-emitting element. For example, at least one of a hole-injection layer, a hole-transport layer, an electron-transport layer, and an electron-injection layer may be a layer shared by the light-receiving element and the light-emitting element. When the light-receiving element and the light-emitting element include common layers in such a manner, the number of deposition steps and the number of masks can be reduced, whereby the number of manufacturing steps and the manufacturing cost of the light-emitting and light-receiving apparatus can be reduced. Furthermore, the light-emitting and light-receiving apparatus including the light-receiving element can be manufactured using an existing manufacturing apparatus and an existing manufacturing method for the display apparatus.

Next, a light-emitting and light-receiving apparatus including light-emitting and light-receiving elements and light-emitting elements is described. Note that functions, behavior, effects, and the like similar to those in the above are not described in some cases.

In the light-emitting and light-receiving apparatus of one embodiment of the present invention, a subpixel exhibiting any color includes a light-emitting and light-receiving element instead of a light-emitting element, and subpixels exhibiting the other colors each include a light-emitting element. The light-emitting and light-receiving element has both a function of emitting light (a light-emitting function) and a function of receiving light (a light-receiving function). For example, in the case where a pixel includes three subpixels of a red subpixel, a green subpixel, and a blue subpixel, at least one of the subpixels includes a light-emitting and light-receiving element, and the other subpixels each include a light-emitting element. Thus, the light-emitting and light-receiving portion of the light-emitting and light-receiving apparatus of one embodiment of the present invention has a function of displaying an image using both light-emitting and light-receiving elements and light-emitting elements.

The light-emitting and light-receiving element functions as both a light-emitting element and a light-receiving element, whereby the pixel can have a light-receiving function without an increase in the number of subpixels included in the pixel. Thus, the light-emitting and light-receiving portion of the light-emitting and light-receiving apparatus can be provided with one or both of an image capturing function and a sensing function while keeping the aperture ratio of the pixel (aperture ratio of each subpixel) and the resolution of the light-emitting and light-receiving apparatus. Accordingly, in the light-emitting and light-receiving apparatus of one embodiment of the present invention, the aperture ratio of the pixel can be more increased and the resolution can be increased more easily than in a light-emitting and light-receiving apparatus provided with a subpixel including a light-receiving element separately from a subpixel including a light-emitting element.

In the light-emitting and light-receiving portion of the light-emitting and light-receiving apparatus of one embodiment of the present invention, the light-emitting and light-receiving elements and the light-emitting elements are arranged in a matrix, and an image can be displayed on the light-emitting and light-receiving portion. The light-emitting and light-receiving portion can be used as an image sensor, a touch sensor, or the like. In the light-emitting and light-receiving apparatus of one embodiment of the present invention, the light-emitting elements can be used as a light source of the sensor. Thus, image capturing, touch operation detection, or the like is possible even in a dark place.

The light-emitting and light-receiving element can be manufactured by combining an organic EL element and an organic photodiode. For example, by adding an active layer of an organic photodiode to a stacked-layer structure of an organic EL element, the light-emitting and light-receiving element can be manufactured. Furthermore, in the light-emitting and light-receiving element formed of a combination of an organic EL element and an organic photodiode, concurrently depositing layers that can be shared with the organic EL element can inhibit an increase in the number of deposition steps.

For example, one of a pair of electrodes (a common electrode) can be a layer shared by the light-emitting and light-receiving element and the light-emitting element. For example, at least one of a hole-injection layer, a hole-transport layer, an electron-transport layer, and an electron-injection layer may be a layer shared by the light-emitting and light-receiving element and the light-emitting element.

Note that a layer included in the light-emitting and light-receiving element might have a different function between the case where the light-emitting and light-receiving element functions as a light-receiving element and the case where the light-emitting and light-receiving element functions as a light-emitting element. In this specification, the name of a component is based on its function in the case where the light-emitting and light-receiving element functions as a light-emitting element.

The light-emitting and light-receiving apparatus of this embodiment has a function of displaying an image with the use of the light-emitting elements and the light-emitting and light-receiving elements. That is, the light-emitting elements and the light-emitting and light-receiving elements function as display elements.

The light-emitting and light-receiving apparatus of this embodiment has a function of detecting light with the use of the light-emitting and light-receiving elements. The light-emitting and light-receiving element can detect light having a shorter wavelength than light emitted from the light-emitting and light-receiving element itself.

When the light-emitting and light-receiving elements are used as an image sensor, the light-emitting and light-receiving apparatus of this embodiment can capture an image using the light-emitting and light-receiving elements. When the light-emitting and light-receiving elements are used as a touch sensor, the light-emitting and light-receiving apparatus of this embodiment can detect touch operation of an object with the use of the light-emitting and light-receiving elements.

The light-emitting and light-receiving element functions as a photoelectric conversion element. The light-emitting and light-receiving element can be manufactured by adding an active layer of the light-receiving element to the above-described structure of the light-emitting element. For the light-emitting and light-receiving element, an active layer of a pn photodiode or a pin photodiode can be used, for example.

It is particularly preferable to use, for the light-emitting and light-receiving element, an active layer of an organic photodiode including a layer containing an organic compound. An organic photodiode, which is easily made thin, lightweight, and large in area and has a high degree of freedom for shape and design, can be used in a variety of devices.

The display apparatus that is an example of the light-emitting and light-receiving apparatus of one embodiment of the present invention is specifically described below with reference to drawings.

Structure Example 1 of Display Apparatus

Structure Example 1-1

Figure 16A:
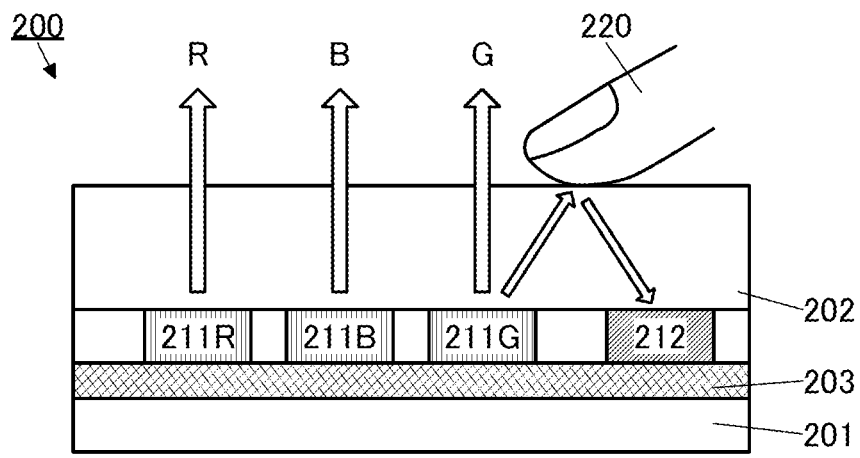
FIG. 16A, FIG. 16B, and FIG. 16D are cross-sectional views illustrating an example of a display apparatus.

FIG. 16A is a schematic view of a display panel 200. The display panel 200 includes a substrate 201, a substrate 202, a light-receiving element 212, a light-emitting element 211R, a light-emitting element 211G, a light-emitting element 211B, a functional layer 203, and the like.

The light-emitting element 211R, the light-emitting element 211G, the light-emitting element 211B, the light-receiving element 212 are provided between the substrate 201 and the substrate 202. The light-emitting element 211R, the light-emitting element 211G, and the light-emitting element 211B emit red (R) light, green (G) light, and blue (B) light, respectively. Note that in the following description, the term "light-emitting element 211" may be used when the light-emitting element 211R, the light-emitting element 211G, and the light-emitting element 211B are not distinguished from each other.

The display panel 200 includes a plurality of pixels arranged in a matrix. One pixel includes one or more subpixels. One subpixel includes one light-emitting element. For example, the pixel can have a structure including three subpixels (e.g., three colors of R, G, and B or three colors of yellow (Y), cyan (C), and magenta (M)) or four subpixels (e.g., four colors of R, G, B, and white (W) or four colors of R, G, B, and Y). The pixel further includes the light-receiving element 212. The light-receiving element 212 may be provided in all the pixels or may be provided in some of the pixels. In addition, one pixel may include a plurality of light-receiving elements 212.

FIG. 16A illustrates a finger 220 touching a surface of the substrate 202. Part of light emitted from the light-emitting element 211G is reflected at a contact portion of the substrate 202 and the finger 220. In the case where part of the reflected light is incident on the light-receiving element 212, the contact of the finger 220 with the substrate 202 can be detected. That is, the display panel 200 can function as a touch panel.

The functional layer 203 includes a circuit for driving the light-emitting element 211R, the light-emitting element 211G, and the light-emitting element 211B and a circuit for driving the light-receiving element 212. The functional layer 203 is provided with a switch, a transistor, a capacitor, a wiring, and the like. Note that in the case where the light-emitting element 211R, the light-emitting element 211G, the light-emitting element 211B, and the light-receiving element 212 are driven by a passive-matrix method, a structure not provided with a switch, a transistor, or the like may be employed.

Figure 16B:
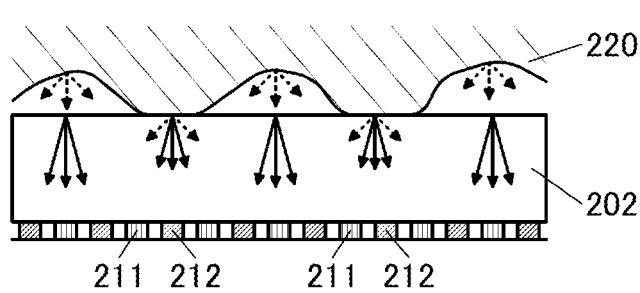

The display panel 200 preferably has a function of detecting a fingerprint of the finger 220. FIG. 16B schematically illustrates an enlarged view of the contact portion in a state where the finger 220 touches the substrate 202. FIG. 16B illustrates light-emitting elements 211 and the light-receiving elements 212 that are alternately arranged.

The fingerprint of the finger 220 is formed of depressions and projections. Therefore, as illustrated in FIG. 16B, the projections of the fingerprint touch the substrate 202.

Reflection of light from a surface, an interface, or the like is categorized into regular reflection and diffuse reflection. Regularly reflected light is highly directional light with an angle of reflection equal to the angle of incidence. Diffusely reflected light has low directionality and low angular dependence of intensity. As for regular reflection and diffuse reflection, diffuse reflection components are dominant in the light reflected from the surface of the finger 220. Meanwhile, regular reflection components are dominant in the light reflected from the interface between the substrate 202 and the air.

The intensity of light that is reflected from contact surfaces or non-contact surfaces between the finger 220 and the substrate 202 and is incident on the light-receiving elements 212 positioned directly below the contact surfaces or the non-contact surfaces is the sum of intensities of regularly reflected light and diffusely reflected light. As described above, regularly reflected light (indicated by solid arrows) is dominant near the depressions of the finger 220, where the finger 220 is not in contact with the substrate 202; whereas diffusely reflected light (indicated by dashed arrows) from the finger 220 is dominant near the projections of the finger 220, where the finger 220 is in contact with the substrate 202. Thus, the intensity of light received by the light-receiving element 212 positioned directly below the depression is higher than the intensity of light received by the light-receiving element 212 positioned directly below the projection. Accordingly, a fingerprint image of the finger 220 can be captured.

In the case where an arrangement interval between the light-receiving elements 212 is smaller than a distance between two projections of a fingerprint, preferably a distance between a depression and a projection adjacent to each other, a clear fingerprint image can be obtained. The distance between a depression and a projection of a human's fingerprint is approximately 200 µm; thus, the arrangement interval between the light-receiving elements 212 is, for example, less than or equal to 400 µm, preferably less than or equal to 200 µm, further preferably less than or equal to 150 µm, still further preferably less than or equal to 100 µm, even still further preferably less than or equal to 50 µm and greater than or equal to 1 µm, preferably greater than or equal to 10 µm, further preferably greater than or equal to 20 µm.

Figure 16C:
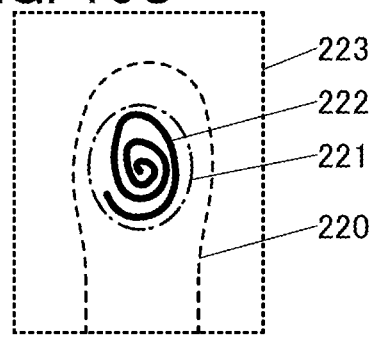
FIG. 16C and FIG. 16E are diagrams illustrating examples of images.

FIG. 16C illustrates an example of a fingerprint image captured by the display panel 200. In an image-capturing range 223 in FIG. 16C, the outline of the finger 220 is indicated by a dashed line and the outline of a contact portion 221 is indicated by a dashed-dotted line. In the contact portion 221, a high-contrast image of a fingerprint 222 can be captured owing to a difference in the amount of light incident on the light-receiving elements 212.

Figure 16D:
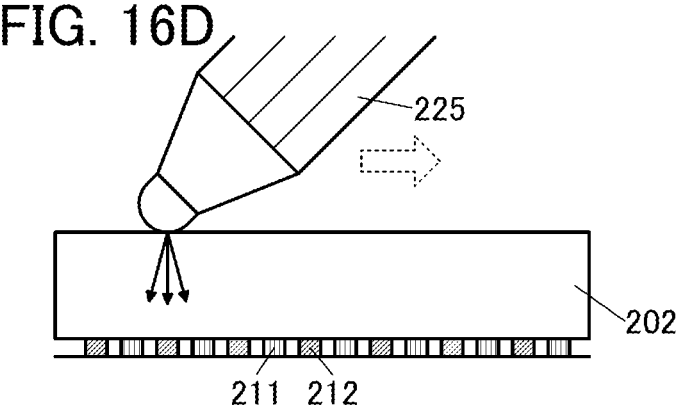

The display panel 200 can also function as a touch panel or a pen tablet. FIG. 16D illustrates a state where a tip of a stylus 225 slides in a direction indicated with a dashed arrow while the tip of the stylus 225 touches the substrate 202.

As illustrated in FIG. 16D, when diffusely reflected light that is diffused at the contact surface of the tip of the stylus 225 and the substrate 202 is incident on the light-receiving element 212 that overlaps with the contact surface, the position of the tip of the stylus 225 can be detected with high accuracy.

Figure 16E:
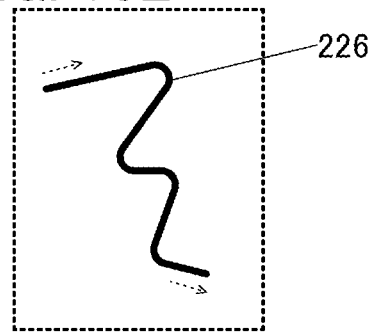

FIG. 16E illustrates an example of a path 226 of the stylus 225 that is detected by the display panel 200. The display panel 200 can detect the position of a detection target, such as the stylus 225, with high position accuracy, so that high-definition drawing can be performed using a drawing application or the like. Unlike the case of using a capacitive touch sensor, an electromagnetic induction touch pen, or the like, the display panel 200 can detect even the position of a highly insulating object to be detected, the material of a tip portion of the stylus 225 is not limited, and a variety of writing materials (e.g., a brush, a glass pen, a quill pen, and the like) can be used.

Figure 16F:
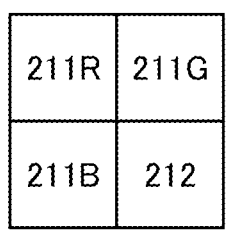
FIG. 16F to FIG. 16H are top views each illustrating an example of a pixel.
Figure 16G:
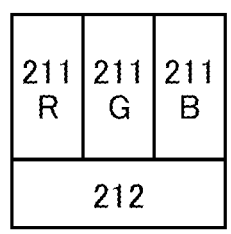
Figure 16H:
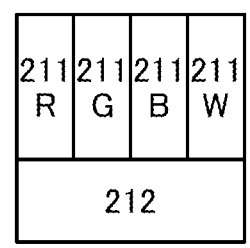

Here, FIG. 16F to FIG. 16H illustrate examples of a pixel that can be used in the display panel 200.

The pixels illustrated in FIG. 16F and FIG. 16G each include the light-emitting element 211R for red (R), the light-emitting element 211G for green (G), the light-emitting element 211B for blue (B), and the light-receiving element 212. The pixels each include a pixel circuit for driving the light-emitting element 211R, the light-emitting element 211G, the light-emitting element 211B, and the light-receiving element 212.

FIG. 16F illustrates an example in which three light-emitting elements and one light-receiving element are provided in a matrix of 2×2. FIG. 16G illustrates an example in which three light-emitting elements are arranged in one line and one laterally long light-receiving element 212 is provided below the three light-emitting elements.

The pixel illustrated in FIG. 16H is an example including a light-emitting element 211W for white (W). Here, four light-emitting elements are arranged in one line and the light-receiving element 212 is provided below the four light-emitting elements.

Note that the pixel structure is not limited to the above structure, and a variety of arrangement methods can be employed.

Structure Example 1-2

An example of a structure including light-emitting elements emitting visible light, a light-emitting element emitting infrared light, and a light-receiving element is described below.

Figure 17A:
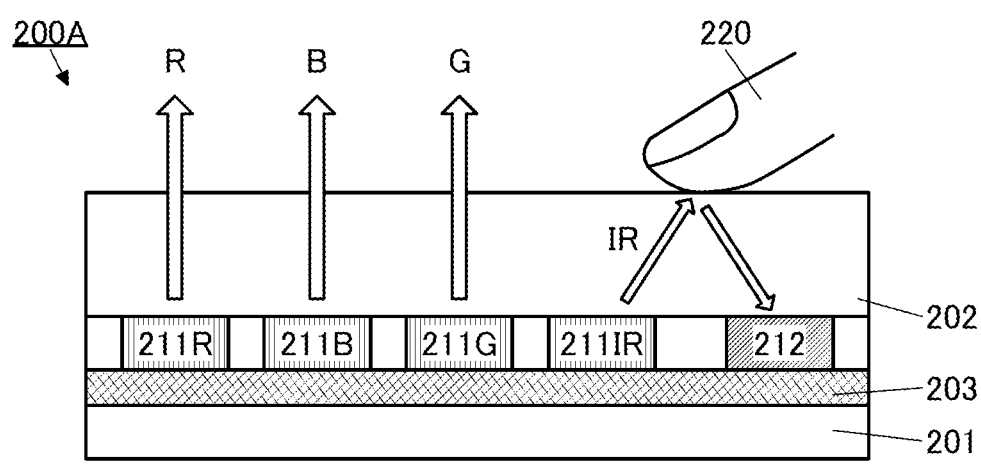
FIG. 17A is a cross-sectional view illustrating a structure example of a display apparatus.

A display panel 200A illustrated in FIG. 17A includes a light-emitting element 211IR in addition to the components illustrated in FIG. 16A as an example. The light-emitting element 211IR is a light-emitting element emitting infrared light IR. Moreover, in that case, an element capable of receiving at least the infrared light IR emitted from the light-emitting element 211IR is preferably used as the light-receiving element 212. As the light-receiving element 212, an element capable of receiving visible light and infrared light is further preferably used.

As illustrated in FIG. 17A, when the finger 220 touches the substrate 202, the infrared light IR emitted from the light-emitting element 211IR is reflected by the finger 220 and part of reflected light is incident on the light-receiving element 212, so that the positional information of the finger 220 can be obtained.

Figure 17B:
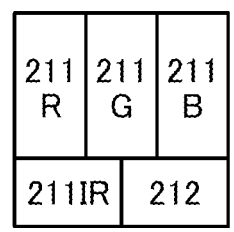
FIG. 17B to FIG. 17D are top views each illustrating an example of a pixel.
Figure 17C:
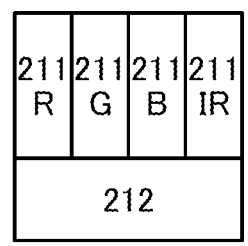
Figure 17D:
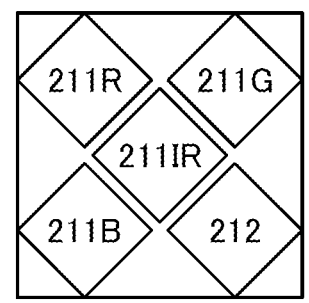

FIG. 17B to FIG. 17D illustrate examples of a pixel that can be used in the display panel 200A.

FIG. 17B illustrates an example in which three light-emitting elements are arranged in one line and the light-emitting element 211IR and the light-receiving element 212 are arranged below the three light-emitting elements in a horizontal direction. FIG. 17C illustrates an example in which four light-emitting elements including the light-emitting element 211IR are arranged in one line and the light-receiving element 212 is provided below the four light-emitting elements.

FIG. 17D illustrates an example in which three light-emitting elements and the light-receiving element 212 are arranged in all directions with the light-emitting element 211IR as the center.

Note that in the pixels illustrated in FIG. 17B to FIG. 17D, the positions of the light-emitting elements can be interchangeable, or the positions of the light-emitting element and the light-receiving element can be interchangeable.

Structure Example 1-3

An example of a structure including a light-emitting element emitting visible light and a light-emitting and light-receiving element emitting and receiving visible light is described below.

A display panel 200B illustrated in FIG. 18A includes the light-emitting element 211B, the light-emitting element 211G, and a light-emitting and light-receiving element 213R. The light-emitting and light-receiving element 213R has a function of a light-emitting element that emits red (R) light, and a function of a photoelectric conversion element that receives visible light. FIG. 18A illustrates an example in which the light-emitting and light-receiving element 213R receives green (G) light emitted from the light-emitting element 211G. Note that the light-emitting and light-receiving element 213R may receive blue (B) light emitted from the light-emitting element 2111B. Alternatively, the light-emitting and light-receiving element 213R may receive both green light and blue light.

For example, the light-emitting and light-receiving element 213R preferably receives light having a shorter wavelength than light emitted from itself. Alternatively, the light-emitting and light-receiving element 213R may receive light (e.g., infrared light) having a longer wavelength than light emitted from itself. The light-emitting and light-receiving element 213R may receive light having approximately the same wavelength as light emitted from itself; however, in that case, the light-emitting and light-receiving element 213R also receives light emitted from itself, whereby its emission efficiency might be decreased. Therefore, the peak of the emission spectrum and the peak of the absorption spectrum of the light-emitting and light-receiving element 213R preferably overlap as little as possible.

Here, light emitted from the light-emitting and light-receiving element is not limited to red light. Furthermore, the light emitted from the light-emitting elements is not limited to the combination of green light and blue light. For example, the light-emitting and light-receiving element can be an element that emits green or blue light and receives light having a different wavelength from light emitted from itself.

The light-emitting and light-receiving element 213R serves as both a light-emitting element and a light-receiving element as described above, whereby the number of elements provided in one pixel can be reduced. Thus, higher definition, a higher aperture ratio, higher resolution, and the like can be easily achieved.

FIG. 18B to FIG. 18I illustrate examples of a pixel that can be used in the display panel 200B.

FIG. 18B illustrates an example in which the light-emitting and light-receiving element 213R, the light-emitting element 211G, and the light-emitting element 211B are arranged in one column. FIG. 18C illustrates an example in which the light-emitting element 211G and the light-emitting element 211B are alternately arranged in the vertical direction and the light-emitting and light-receiving element 213R is provided alongside the light-emitting elements.

FIG. 18D illustrates an example in which three light-emitting elements (the light-emitting element 211G, the light-emitting element 211B, and a light-emitting element 211X) and one light-emitting and light-receiving element are arranged in matrix of 2×2. The light-emitting element 211X is an element that emits light of a color other than R, G, and B. The light of a color other than R, G, and B can be white (W) light, yellow (Y) light, cyan (C) light, magenta (M) light, infrared light (IR), ultraviolet light (UV), or the like. In the case where the light-emitting element 211X emits infrared light, the light-emitting and light-receiving element preferably has a function of detecting infrared light or a function of detecting both visible light and infrared light. The wavelength of light detected by the light-emitting and light-receiving element can be determined depending on the application of a sensor.

FIG. 18E illustrates two pixels. A region that includes three elements and is enclosed by a dotted line corresponds to one pixel. Each of the pixels includes the light-emitting element 211G, the light-emitting element 211B, and the light-emitting and light-receiving element 213R. In the left pixel in FIG. 18E, the light-emitting element 211G is provided in the same row as the light-emitting and light-receiving element 213R, and the light-emitting element 211B is provided in the same column as the light-emitting and light-receiving element 213R. In the right pixel in FIG. 18E, the light-emitting element 211G is provided in the same row as the light-emitting and light-receiving element 213R, and the light-emitting element 211B is provided in the same column as the light-emitting element 211G. In the pixel layout in FIG. 18E, the light-emitting and light-receiving element 213R, the light-emitting element 211G, and the light-emitting element 211B are repeatedly arranged in both the odd-numbered row and the even-numbered row, and in each column, the light-emitting elements or the light-emitting element and the light-emitting and the receiving element arranged in the odd-numbered row and the even-numbered row emit light of different colors.

FIG. 18F illustrates four pixels which employ PenTile arrangement; adjacent two pixels have different combinations of light-emitting elements or light-emitting and light-receiving elements that emit light of two different colors. FIG. 18F illustrates the top-surface shapes of the light-emitting elements or light-emitting and light-receiving elements.

The upper left pixel and the lower right pixel in FIG. 18F each include the light-emitting and light-receiving element 213R and the light-emitting element 211G. The upper right pixel and the lower left pixel each include the light-emitting element 211G and the light-emitting element 211B. That is, in the example illustrated in FIG. 18F, the light-emitting element 211G is provided in each pixel.

The top surface shape of the light-emitting elements and the light-emitting and light-receiving elements is not particularly limited and can be a circular shape, an elliptical shape, a polygonal shape, a polygonal shape with rounded corners, or the like. FIG. 18F and the like illustrate examples in which the top surface shapes of the light-emitting elements and the light-emitting and light-receiving elements are each a square tilted at approximately 45° (a diamond shape). Note that the top surface shape of the light-emitting elements and the light-emitting and light-receiving elements may vary depending on the color thereof, or the light-emitting elements and the light-emitting and light-receiving elements of some colors or every color may have the same top surface shape.

The sizes of light-emitting regions (or light-emitting and light-receiving regions) of the light-emitting elements and the light-emitting and light-receiving elements may vary depending on the color thereof, or the light-emitting elements and the light-emitting and light-receiving elements of some colors or every color may have light-emitting regions of the same size. For example, in FIG. 18F, the light-emitting region of the light-emitting element 211G provided in each pixel may have a smaller area than the light-emitting region (or the light-emitting and light-receiving region) of the other elements.

FIG. 18G is a modification example of the pixel arrangement of FIG. 18F. Specifically, the structure of FIG. 18G is obtained by rotating the structure of FIG. 18F by 45°. Although one pixel is regarded as including two elements in FIG. 18F, one pixel can be regarded as being formed of four elements as illustrated in FIG. 18G.

FIG. 18H is a modification example of the pixel arrangement of FIG. 18F. The upper left pixel and the lower right pixel in FIG. 18H each include the light-emitting and light-receiving element 213R and the light-emitting element 211G. The upper right pixel and the lower left pixel each include the light-emitting and light-receiving element 213R and the light-emitting element 211B. That is, in the example illustrated in FIG. 18H, the light-emitting and light-receiving element 213R is provided in each pixel. The structure illustrated in FIG. 18H achieves higher-resolution image capturing than the structure illustrated in FIG. 18F because of having the light-emitting and light-receiving element 213R in each pixel. Thus, the accuracy of biometric authentication can be increased, for example.

FIG. 18I illustrates a modification example of the pixel arrangement in FIG. 18H, obtained by rotating the pixel arrangement in FIG. 18H by 45°.

In FIG. 18I, one pixel is described as being formed of four elements (two light-emitting elements and two light-emitting and light-receiving elements). One pixel including a plurality of light-emitting and light-receiving elements having a light-receiving function allows high-resolution image capturing. Accordingly, the accuracy of biometric authentication can be increased. For example, the resolution of image capturing can be the square root of 2 times the resolution of display.

A display apparatus that employs the structure shown in FIG. 18H or FIG. 18I includes p (p is an integer greater than or equal to 2) first light-emitting elements, q (q is an integer greater than or equal to 2) second light-emitting elements, and r (r is an integer greater than p and q) light-emitting and light-receiving elements. As for p and r, r=2p is satisfied. As for p, q, and r, r=p+q is satisfied. Either the first light-emitting elements or the second light-emitting elements emit green light, and the other light-emitting elements emit blue light. The light-emitting and light-receiving elements emit red light and have a light-receiving function.

In the case where touch operation is detected with the light-emitting and light-receiving elements, for example, it is preferable that light emitted from a light source be hard for a user to recognize. Since blue light has lower visibility than green light, light-emitting elements that emit blue light are preferably used as a light source. Accordingly, the light-emitting and light-receiving elements preferably have a function of receiving blue light. Note that without limitation to the above, light-emitting elements used as a light source can be selected as appropriate depending on the sensitivity of the light-emitting and light-receiving elements.

As described above, the display apparatus of this embodiment can employ any of various types of pixel arrangements.

At least part of this embodiment can be implemented in combination with the other embodiments described in this specification as appropriate.

Embodiment 4

In this embodiment, a light-emitting element (also referred to as a light-emitting device) and a light-receiving element (also referred to as a light-receiving device) that can be used in a light-emitting and light-receiving apparatus of one embodiment of the present invention will be described.

In this specification and the like, a device fabricated using a metal mask or an FMM (fine metal mask or a high-resolution metal mask) may be referred to as a device having an MM (metal mask) structure. In this specification and the like, a device fabricated without using a metal mask or an FMM may be referred to as a device having an MML (metal maskless) structure.

In this specification and the like, a structure in which light-emitting layers in light-emitting devices of different colors (here, blue (B), green (G), and red (R)) are separately formed or separately patterned may be referred to as an SBS (Side By Side) structure. In this specification and the like, a light-emitting device capable of emitting white light may be referred to as a white-light-emitting device. Note that a combination of white-light-emitting devices with coloring layers (e.g., color filters) enables a full-color display apparatus.

[Light-Emitting Device]

Light-emitting devices can be classified roughly into a single structure and a tandem structure. A device having a single structure includes one light-emitting unit between a pair of electrodes, and the light-emitting unit preferably includes one or more light-emitting layers. To obtain white light emission by using two light-emitting layers, two light-emitting layers are selected such that the light-emitting layers emit light of complementary colors. For example, when the emission color of a first light-emitting layer and the emission color of a second light-emitting layer are complementary colors, the light-emitting device can be configured to emit white light as a whole. To obtain white light emission by using three or more light-emitting layers, the light-emitting device is configured to emit white light as a whole by combining emission colors of the three or more light-emitting layers.

A device having a tandem structure includes two or more light-emitting units between a pair of electrodes, and each light-emitting unit preferably includes one or more light-emitting layers. When light-emitting layers that emit light of the same color are used in each light-emitting unit, luminance per predetermined current can be increased, and the light-emitting device can have higher reliability than that with a single structure. To obtain white light emission with a tandem structure, a structure in which white light emission can be obtained by combining light from light-emitting layers of a plurality of light-emitting units is employed. Note that a combination of emission colors for obtaining white light emission is similar to that of the case of a single structure. In the device having a tandem structure, an intermediate layer such as a charge-generation layer is suitably provided between the plurality of light-emitting units.

When the white-light-emitting device (having a single structure or a tandem structure) and a light-emitting device having an SBS structure are compared to each other, the light-emitting device having an SBS structure can have lower power consumption than the white-light-emitting device. To reduce power consumption, a light-emitting device having an SBS structure is preferably used. Meanwhile, the white-light-emitting device is preferable in terms of lower manufacturing cost or higher manufacturing yield because the manufacturing process of the white-light-emitting device is simpler than that of a light-emitting device having an SBS structure.

Structure Example of Light-Emitting Device

Figure 19A:
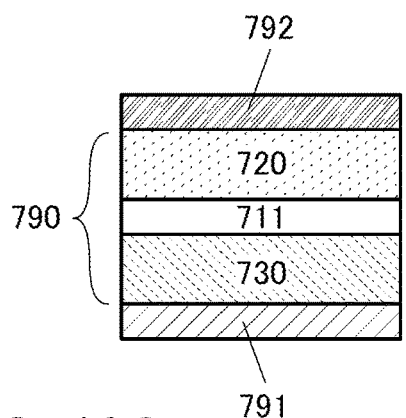
FIG. 19A to FIG. 19F are diagrams each illustrating a structure example of a light-emitting device.

As illustrated in FIG. 19A, the light-emitting device includes an EL layer 790 between a pair of electrodes (a lower electrode 791 and an upper electrode 792). The EL layer 790 can be formed of a plurality of layers such as a layer 720, a light-emitting layer 711, and a layer 730. The layer 720 can include, for example, a layer containing a substance with a high electron-injection property (an electron-injection layer) and a layer containing a substance with a high electron-transport property (an electron-transport layer). The light-emitting layer 711 contains a light-emitting compound, for example. The layer 730 can include, for example, a layer containing a substance with a high hole-injection property (a hole-injection layer) and a layer containing a substance with a high hole-transport property (a hole-transport layer).

The structure including the layer 720, the light-emitting layer 711, and the layer 730, which is provided between a pair of electrodes, can function as a single light-emitting unit, and the structure in FIG. 19A is referred to as a single structure in this specification.

Figure 19B:
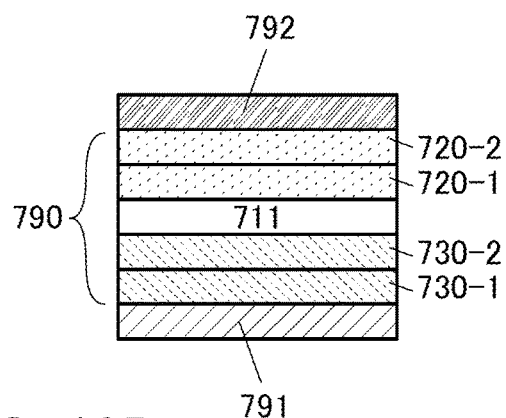

FIG. 19B is a modification example of the EL layer 790 included in the light-emitting device illustrated in FIG. 19A. Specifically, the light-emitting device illustrated in FIG. 19B includes a layer 730-1 over the lower electrode 791, a layer 730-2 over the layer 730-1, the light-emitting layer 711 over the layer 730-2, a layer 720-1 over the light-emitting layer 711, a layer 720-2 over the layer 720-1, and the upper electrode 792 over the layer 720-2. For example, when the lower electrode 791 is an anode and the upper electrode 792 is a cathode, the layer 730-1 functions as a hole-injection layer, the layer 730-2 functions as a hole-transport layer, the layer 720-1 functions as an electron-transport layer, and the layer 720-2 functions as an electron-injection layer. Alternatively, when the lower electrode 791 is a cathode and the upper electrode 792 is an anode, the layer 730-1 functions as an electron-injection layer, the layer 730-2 functions as an electron-transport layer, the layer 720-1 functions as a hole-transport layer, and the layer 720-2 functions as a hole-injection layer. With such a layered structure, carriers can be efficiently injected to the light-emitting layer 711, and the efficiency of the recombination of carriers in the light-emitting layer 711 can be enhanced.

Figure 19C:
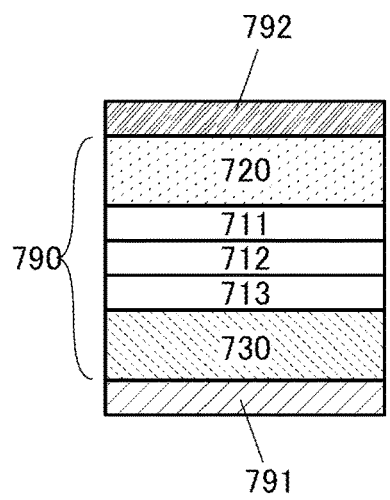
Figure 19D:
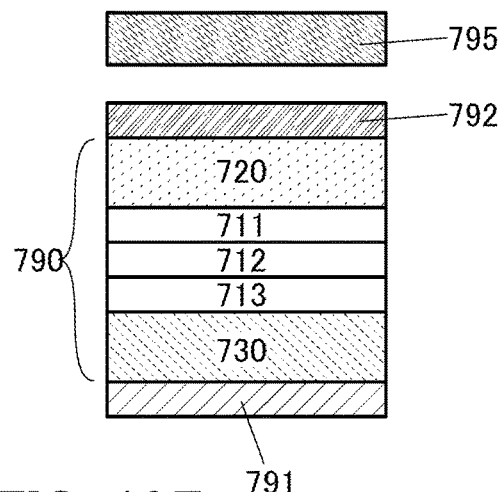

Note that structures in which a plurality of light-emitting layers (light-emitting layers 711, 712, and 713) are provided between the layer 720 and the layer 730 as illustrated in FIG. 19C and FIG. 19D are variations of the single structure.

Figure 19E:
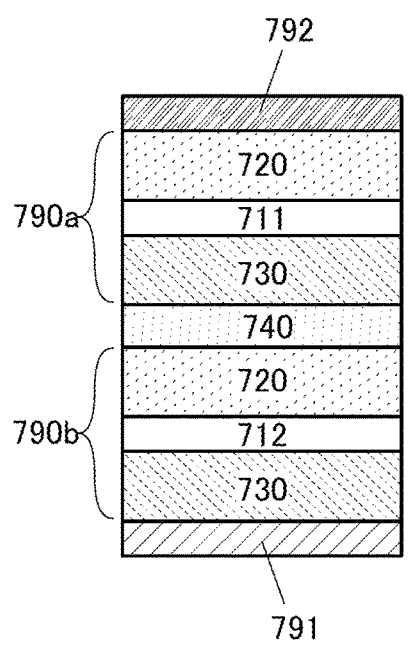
Figure 19F:
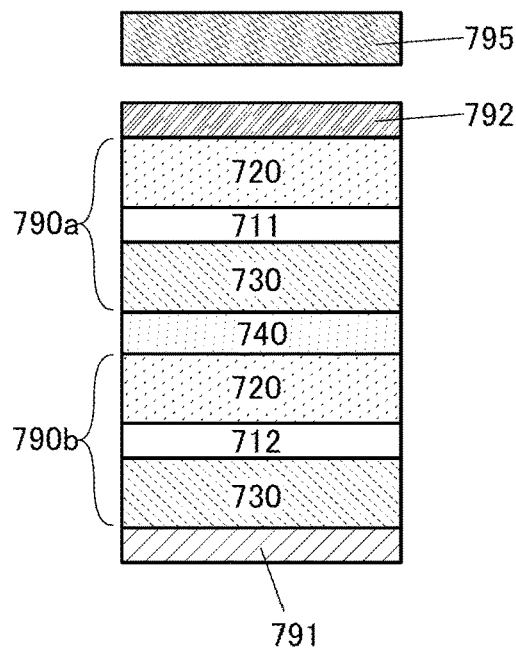

Structures in which a plurality of light-emitting units (EL layer 790a and EL layer 790b) are connected in series with an intermediate layer (charge-generation layer) 740 therebetween as illustrated in FIG. 19E and FIG. 19F are referred to as a tandem structure in this specification. In this specification and the like, the structures illustrated in FIG. 19E and FIG. 19F are referred to as a tandem structure; however, without being limited to this, a tandem structure may be referred to as a stack structure, for example. The tandem structure enables alight-emitting device capable of high-luminance light emission.

In FIG. 19C, light-emitting materials that emit light of the same color may be used for the light-emitting layer 711, the light-emitting layer 712, and the light-emitting layer 713.

Alternatively, different light-emitting materials may be used for the light-emitting layer 711, the light-emitting layer 712, and the light-emitting layer 713. For example, white light can be obtained from light emitted by the light-emitting layer 711, the light-emitting layer 712, and the light-emitting layer 713. FIG. 19D illustrates an example in which a coloring layer 795 functioning as a color filter is provided. When white light passes through a color filter, light of a desired color can be obtained.

In FIG. 19E, the same light-emitting material may be used for the light-emitting layer 711 and the light-emitting layer 712. Alternatively, light-emitting materials that emit light of different colors may be used for the light-emitting layer 711 and the light-emitting layer 712. White light can be obtained when the light-emitting layer 711 and the light-emitting layer 712 emit light of complementary colors. FIG. 19F illustrates an example in which the coloring layer 795 is further provided In FIG. 19C, FIG. 19D, FIG. 19E, and FIG. 19F, the layer 720 and the layer 730 may each have a layered structure of two or more layers as illustrated in FIG. 19B.

In FIG. 19D, the same light-emitting material may be used for the light-emitting layer 711, the light-emitting layer 712, and the light-emitting layer 713. Similarly, in FIG. 19F, the same light-emitting material may be used for the light-emitting layer 711 and the light-emitting layer 712. In that case, by using a color conversion layer instead of the coloring layer 795, light of a desired color different from the emission color of the light-emitting material can be obtained. For example, a blue-light-emitting material is used for each light-emitting layer and blue light passes through the color conversion layer, whereby light with a wavelength longer than that of blue light (e.g., red light or green light) can be obtained. For the color conversion layer, a fluorescent material, a phosphorescent material, quantum dots, or the like can be used.

A structure in which light-emitting layers (here, blue (B), green (G), and red (R)) are separately formed is referred to as an SBS (Side By Side) structure in some cases The emission color of the light-emitting device can be red, green, blue, cyan, magenta, yellow, white, or the like depending on the material of the EL layer 790. Furthermore, the color purity can be further increased when the light-emitting device has a microcavity structure.

The light-emitting device that emits white light preferably contains two or more kinds of light-emitting substances in the light-emitting layer. To obtain white light emission, two or more kinds of light-emitting substances are selected such that their emission colors are complementary. For example, when emission colors of a first light-emitting layer and a second light-emitting layer are complementary colors, the light-emitting device as a whole can be configured to emit white light. The same applies to a light-emitting device including three or more light-emitting layers.

The light-emitting layer preferably contains two or more selected from light-emitting substances that emit light of red (R), green (G), blue (B), yellow (Y), orange (O), and the like. Alternatively, the light-emitting layer preferably contains two or more light-emitting substances that emit light containing two or more of spectral components of R, G, and B.

[Light-Receiving Device]

Figure 20A:
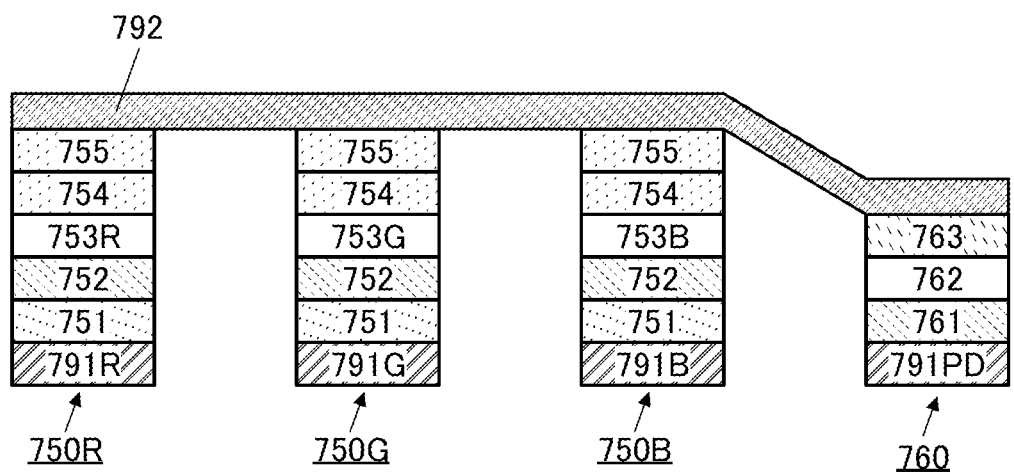
FIG. 20A and FIG. 20B are diagrams illustrating structure examples of light-emitting devices and a light-receiving device.

FIG. 20A is a schematic cross-sectional view of a light-emitting device 750R, a light-emitting device 750G, alight-emitting device 750B, and a light-receiving device 760. The light-emitting device 750R, the light-emitting device 750G, the light-emitting device 750B, and the light-receiving device 760 share an upper electrode 792.

The light-emitting device 750R includes a pixel electrode 791R, a layer 751, a layer 752, a light-emitting layer 753R, a layer 754, a layer 755, and the upper electrode 792. The light-emitting device 750G includes the pixel electrode 791G and a light-emitting layer 753G. The light-emitting device 750B includes the pixel electrode 791B and a light-emitting layer 753B.

The layer 751 includes, for example, a layer containing a substance with a high hole-injection property (a hole-injection layer). The layer 752 includes, for example, a layer containing a substance with a high hole-transport property (a hole-transport layer). The layer 754 includes, for example, a layer containing a substance with a high electron-transport property (an electron-transport layer). The layer 755 includes, for example, a layer containing a substance with a high electron-injection property (an electron-injection layer).

Alternatively, the layer 751 may include an electron-injection layer, the layer 752 may include an electron-transport layer, the layer 754 may include a hole-transport layer, and the layer 755 may include a hole-injection layer.

FIG. 20A illustrates the layer 751 and the layer 752 separately; however, one embodiment of the present invention is not limited thereto. For example, the layer 752 may be omitted when the layer 751 has functions of both a hole-injection layer and a hole-transport layer or the layer 751 has functions of both an electron-injection layer and an electron-transport layer.

Note that the light-emitting layer 753R included in the light-emitting device 750R contains a light-emitting substance that emits red light, the light-emitting layer 753G included in the light-emitting device 750G contains a light-emitting substance that emits green light, and the light-emitting layer 753B included in the light-emitting device 750B contains a light-emitting substance that emits blue light. Note that the light-emitting device 750G and the light-emitting device 750B have a structure in which the light-emitting layer 753R included in the light-emitting device 750R is replaced with the light-emitting layer 753G and the light-emitting layer 753B, respectively, and the other components are similar to those of the light-emitting device 750R.

The structure (e.g., material and thickness) of the layer 751, the layer 752, the layer 754, and the layer 755 may be the same or different from each other among the light-emitting devices of different colors.

The light-receiving device 760 includes a pixel electrode 791PD, a layer 761, a layer 762, a layer 763, and the upper electrode 792. The light-receiving device 760 can be configured not to include a hole-injection layer or an electron-injection layer.

The layer 762 includes an active layer (also referred to as a photoelectric conversion layer). The layer 762 has a function of absorbing light in a specific wavelength range and generating carriers (electrons and holes).

The layer 761 and the layer 763 each include, for example, a hole-transport layer or an electron-transport layer. In the case where the layer 761 includes a hole-transport layer, the layer 763 includes an electron-transport layer. In the case where the layer 761 includes an electron-transport layer, the layer 763 includes a hole-transport layer.

In the light-receiving device 760, the pixel electrode 791PD may be an anode and the upper electrode 792 may be a cathode, or the pixel electrode 791PD may be a cathode and the upper electrode 792 may be an anode.

Figure 20B:
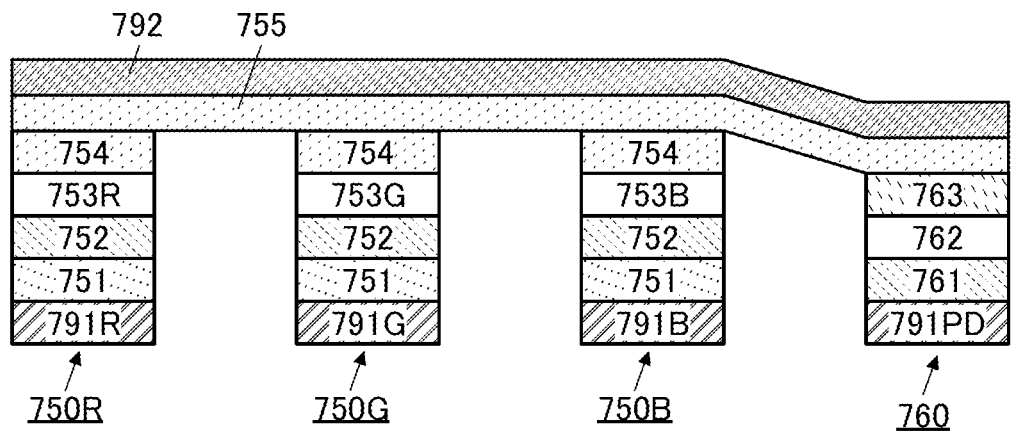

FIG. 20B is a modification example of FIG. 20A. FIG. 20B illustrates an example in which the light-emitting elements and the light-receiving element share the layer 755 as well as the upper electrode 792. In this case, the layer 755 can be referred to as a common layer. The light-emitting elements and the light-receiving element share one or more common layers in this manner, whereby the manufacturing process can be simplified, resulting in reduced manufacturing cost.

Here, the layer 755 functions as an electron-injection layer or a hole-injection layer of the light-emitting device 750R and the like. In this case, the layer 755 functions as an electron-transport layer or a hole-transport layer of the light-receiving device 760. Thus, the light-receiving device 760 illustrated in FIG. 20B is not necessarily provided with the layer 763 functioning as an electron-transport layer or a hole-transport layer.

[Light-Emitting Device]

A specific structure example of the light-emitting device will be described here.

The light-emitting devices include at least a light-emitting layer. The light-emitting device may further include, as a layer other than the light-emitting layer, a layer containing a substance with a high hole-injection property, a substance with a high hole-transport property, a hole-blocking material, a substance with a high electron-transport property, an electron-blocking material, a substance with a high electron-injection property, an electron-blocking material, a substance with a bipolar property (a substance with a high electron-transport property and a high hole-transport property), or the like.

Either a low molecular compound or a high molecular compound can be used for the light-emitting devices, and an inorganic compound may also be included. Each layer included in the light-emitting device can be formed by a method such as an evaporation method (including a vacuum evaporation method), a transfer method, a printing method, an inkjet method, or a coating method.

For example, the light-emitting device can include one or more of a hole-injection layer, a hole-transport layer, a hole-blocking layer, an electron-blocking layer, an electron-transport layer, and an electron-injection layer in addition to the light-emitting layer.

The hole-injection layer is a layer that injects holes from an anode to a hole-transport layer and contains a material with a high hole-injection property. Examples of the material with a high hole-injection property include an aromatic amine compound, and a composite material containing a hole-transport material and an acceptor material (an electron-accepting material).

The hole-transport layer is a layer that transports holes, which are injected from the anode by the hole-injection layer, to the light-emitting layer. The hole-transport layer is a layer that contains a hole-transport material. As the hole-transport material, a substance having a hole mobility greater than or equal to $1 \times 10^{-6}$ cm$^2$/Vs is preferable. Note that other substances can also be used as long as the substances have a hole-transport property higher than an electron-transport property. As the hole-transport material, materials with a high hole-transport property, such as a π-electron rich heteroaromatic compound (e.g., a carbazole derivative, a thiophene derivative, and a furan derivative) and an aromatic amine (a compound having an aromatic amine skeleton), are preferable.

The electron-transport layer is a layer that transports electrons, which are injected from a cathode by the electron-injection layer, to the light-emitting layer. The electron-transport layer is a layer that contains an electron-transport material. As the electron-transport material, a substance having an electron mobility greater than or equal to $1 \times 10^{-6}$ cm$^2$/Vs is preferable. Note that other substances can also be used as long as the substances have an electron-transport property higher than a hole-transport property. As the electron-transport material, it is possible to use a material with a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer that injects electrons from the cathode to the electron-transport layer and contains a material with a high electron-injection property. As the material with a high electron-injection property, an alkali metal, an alkaline earth metal, or a compound thereof can be used. As the material with a high electron-injection property, a composite material containing an electron-transport material and a donor material (an electron-donating material) can also be used.

For the electron-injection layer, it is possible to use, for example, an alkali metal, an alkaline earth metal, or a compound thereof, such as lithium, cesium, ytterbium, lithium fluoride (LiF), cesium fluoride (CsF), calcium fluoride ($CaF_2$), 8-(quinolinolato)lithium (abbreviation: Liq), 2-(2-pyridyl)phenolatolithium (abbreviation: LiPP), 2-(2-pyridyl)-3-pyridinolatolithium (abbreviation: LiPPy), 4-phenyl-2-(2-pyridyl)phenolatolithium (abbreviation: LiPPP), lithium oxide ($LiO_x$), or cesium carbonate. In addition, the electron-injection layer may have a stacked-layer structure of two or more layers. In the stacked-layer structure, for example, lithium fluoride can be used for the first layer and ytterbium can be used for the second layer.

Alternatively, an electron-transport material may be used for the electron-injection layer. For example, a compound having an unshared electron pair and an electron deficient heteroaromatic ring can be used for the electron-transport material. Specifically, a compound having at least one of a pyridine ring, a diazine ring (a pyrimidine ring, a pyrazine ring, and a pyridazine ring), and a triazine ring can be used.

Note that the lowest unoccupied molecular orbital (LUMO) of the organic compound having an unshared electron pair is preferably greater than or equal to −3.6 eV and less than or equal to −2.3 eV. In general, the highest occupied molecular orbital (HOMO) level and the LUMO level of an organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-bis(naphthalen-2-yl)-4,7-diphenyl-1,10-phenanthroline (abbreviation: NBPhen), diquinoxalino [2,3-a:2',3'-c]phenazine (abbreviation: HATNA), 2,4,6-tris [3'-(pyridin-3-yl)biphenyl-3-yl]-1,3,5-triazine (abbreviation: TmPPPyTz), or the like can be used as the organic compound having an unshared electron pair. Note that NBPhen has a higher glass transition temperature (Tg) than BPhen and thus has high heat resistance.

The light-emitting layer is a layer that contains a light-emitting substance. The light-emitting layer can include one or more kinds of light-emitting substances. As the light-emitting substance, a substance that exhibits an emission color of blue, violet, bluish violet, green, yellowish green, yellow, orange, red, or the like is used as appropriate. Alternatively, as the light-emitting substance, a substance that emits near-infrared light can be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (in particular, an iridium complex) having a 4H-triazole skeleton, a 1H-triazole skeleton, an imidazole skeleton, a pyrimidine skeleton, a pyrazine skeleton, or a pyridine skeleton; an organometallic complex (in particular, an iridium complex) having a phenylpyridine derivative including an electron-withdrawing group as a ligand; a platinum complex; and a rare earth metal complex.

The light-emitting layer may contain one or more kinds of organic compounds (e.g., a host material and an assist material) in addition to the light-emitting substance (a guest material). As one or more kinds of organic compounds, one or both of the hole-transport material and the electron-transport material can be used. Alternatively, as one or more kinds of organic compounds, a bipolar material or a TADF material may be used.

The light-emitting layer preferably includes, for example, a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected to form an exciplex that exhibits light emission whose wavelength is to be overlapped with the wavelength of the lowest-energy-side absorption band of the light-emitting substance, energy can be transferred smoothly and light emission can be obtained efficiently. With the above structure, high efficiency, low-voltage driving, and a long lifetime of a light-emitting device can be achieved at the same time.

[Light-Receiving Device]

The active layer included in the light-receiving device includes a semiconductor. Examples of the semiconductor include an inorganic semiconductor such as silicon and an organic semiconductor including an organic compound. This embodiment shows an example in which an organic semiconductor is used as the semiconductor included in the active layer. An organic semiconductor is preferably used, in which case the light-emitting layer and the active layer can be formed by the same method (e.g., a vacuum evaporation method) and thus the same manufacturing apparatus can be used.

Examples of an n-type semiconductor material contained in the active layer include electron-accepting organic semiconductor materials such as fullerene (e.g., $C_{60}$ and $C_{70}$) and fullerene derivatives. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, an electron-donating property (donor property) usually increases; however, having a spherical shape, fullerene has a high electron-accepting property even when π-electrons widely spread therein. The high electron-accepting property efficiently causes rapid charge separation and is useful for the light-receiving device. Both $C_{60}$ and $C_{70}$ have a wide absorption band in the visible light region, and $C_{70}$ is especially preferable because of having a larger π-electron conjugation system and a wider absorption band in the long wavelength region than $C_{60}$. Other examples of the fullerene derivative include [6,6]-Phenyl-C71-butyric acid methyl ester (abbreviation: PC70BM), [6,6]-Phenyl-C61-butyric acid methyl ester (abbreviation: PC60BM), and 1',1''',4',4'''-Tetrahydro-di[1,4]methanonaphthaleno[1,2:2', 3', 56,60:2''', 3''' ][5,6]fullerene-C60 (abbreviation: ICBA).

Other examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Other examples of the p-type semiconductor material include a carbazole derivative, a thiophene derivative, a furan derivative, and a compound having an aromatic amine skeleton. Furthermore, other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of the same kind, which have molecular orbital energy levels close to each other, can improve a carrier-transport property.

For example, the active layer is preferably formed by co-evaporation of an n-type semiconductor and a p-type semiconductor. Alternatively, the active layer may be formed by stacking an n-type semiconductor and a p-type semiconductor.

In addition to the active layer, the light-receiving device may further include a layer containing a substance with a high hole-transport property, a substance with a high electron-transport property, a substance with a bipolar property (a substance with a high electron-transport property and a high hole-transport property), or the like. Without limitation to the above, the light-receiving device may further include a layer containing a substance with a high hole-injection property, a hole-blocking material, a material with a high electron-injection property, an electron-blocking material, or the like.

Either a low molecular compound or a high molecular compound can be used in the light-receiving device, and an inorganic compound may also be included. Each layer included in the light-receiving device can be formed by a method such as an evaporation method (including a vacuum evaporation method), a transfer method, a printing method, an inkjet method, or a coating method.

As the hole-transport material or the electron-blocking material, a high molecular compound such as poly(3,4-ethylenedioxythiophene)/poly(styrenesulfonic acid) (PEDOT/PSS), or an inorganic compound such as a molybdenum oxide or copper iodide (CuI) can be used, for example. As the electron-transport material or the hole-blocking material, an inorganic compound such as zinc oxide (ZnO) or an organic compound such as polyethylenimine ethoxylated (PEIE) can be used. The light-receiving device may include a mixed film of PEIE and ZnO, for example.

For the active layer, a high molecular compound such as poly[[4,8-bis[5-(2-ethylhexyl)-2-thienyl]benzo[1,2-b:4,5-b']dithiophene-2,6-diyl]-2,5-thiophenediyl[5,7-bis(2-ethylhexyl)-4,8-dioxo-4H,8H-benzo[1,2-c:4,5-c']dithiophene-1,3-diyl]]polymer (abbreviation: PBDB-T) or a PBDB-T derivative, which functions as a donor, can be used. For example, a method in which an acceptor material is dispersed to PBDB-T or a PBDB-T derivative can be used.

The active layer may contain a mixture of three or more kinds of materials. For example, a third material may be mixed with an n-type semiconductor material and a p-type semiconductor material in order to expand the absorption wavelength range. In that case, the third material may be a low molecular compound or a high molecular compound.

The above is the description of the light-receiving device.

At least part of this embodiment can be implemented in combination with the other embodiments described in this specification as appropriate.

Embodiment 5

In this embodiment, a structure example of a light-emitting apparatus or a display apparatus that can be used for the light-emitting/receiving apparatus of one embodiment of the present invention will be described.

One embodiment of the present invention is a display apparatus including a light-emitting element (also referred to as a light-emitting device) and a light-receiving element (also referred to as a light-receiving device). For example, three kinds of light-emitting elements emitting red (R), green (G), and blue (B) light are included, whereby a full-color display apparatus can be achieved.

In one embodiment of the present invention, patterning of EL layers and an EL layer and an active layer is performed by a photolithography method without a shadow mask such as a metal mask. With the patterning, a high-resolution display apparatus with a high aperture ratio, which had been difficult to achieve, can be fabricated. Moreover, EL layers can be formed separately, which enables extremely clear images; thus, a display apparatus with a high contrast and high display quality can be fabricated.

It is difficult to set the distance between EL layers for different colors or between an EL layer and an active layer to be less than 10 μm with a formation method using a metal mask, for example. In contrast, with use of the above method, the distance can be decreased to be less than or equal to 3 μm, less than or equal to 2 μm, or less than or equal to 1 μm. For example, with use of an exposure tool for LSI, the distance can be decreased to be less than or equal to 500 nm, less than or equal to 200 nm, less than or equal to 100 nm, or less than or equal to 50 nm. Accordingly, the area of a non-light-emitting region existing between two light-emitting elements or between a light-emitting element and a light-receiving element can be significantly reduced, and the aperture ratio can be close to 100%. For example, the aperture ratio is higher than or equal to 50%, higher than or equal to 60%, higher than or equal to 70%, higher than or equal to 80%, or higher than or equal to 90%; that is, an aperture ratio lower than 100% can be achieved.

Furthermore, sizes of the EL layer and the active layer themselves can be made much smaller than that in the case of using a metal mask. For example, in the case of using a metal mask for forming EL layers separately, a variation in the thickness occurs between the center and the edge of the island-shaped EL layer. This causes a reduction in an effective area that can be used as a light-emitting region with respect to the area of the entire EL layer. In contrast, in the above manufacturing method, an island-shaped EL layer is formed by processing a film deposited to have a uniform thickness, which enables a uniform thickness in the EL layer. Thus, even when the size of the EL layer is small, almost the whole area can be used as a light-emitting region. Therefore, the above manufacturing method makes it possible to obtain a high resolution display apparatus with a high aperture ratio.

In many cases, an organic film formed using a fine metal mask (FMM) has an extremely small taper angle (e.g., a taper angle of greater than 0° and less than 30°) so that the thickness of the film becomes smaller in a portion closer to an end portion. Therefore, it is difficult to clearly observe a side surface of an organic film formed using an FMM because the side surface and atop surface are continuously connected. In contrast, an EL layer included in one embodiment of the present invention is processed without using an FMM, and has a clear side surface. In particular, part of the taper angle of the EL layer included in one embodiment of the present invention is preferably greater than or equal to 300 and less than or equal to 120°, further preferably greater than or equal to 600 and less than or equal to 120°.

Note that in this specification and the like, an end portion of an object having a tapered shape indicates that the end portion of the object has a cross-sectional shape in which the angle between a side surface (a surface) of the object and a surface on which the object is formed (a bottom surface) is greater than 0° and less than 900 in a region of the end portion, and the thickness continuously increases from the end portion. A taper angle refers to an angle between a bottom surface (a surface on which an object is formed) and a side surface (a surface) at an end portion of the object.

Hereinafter, a more specific example will be described.

Figure 21A:
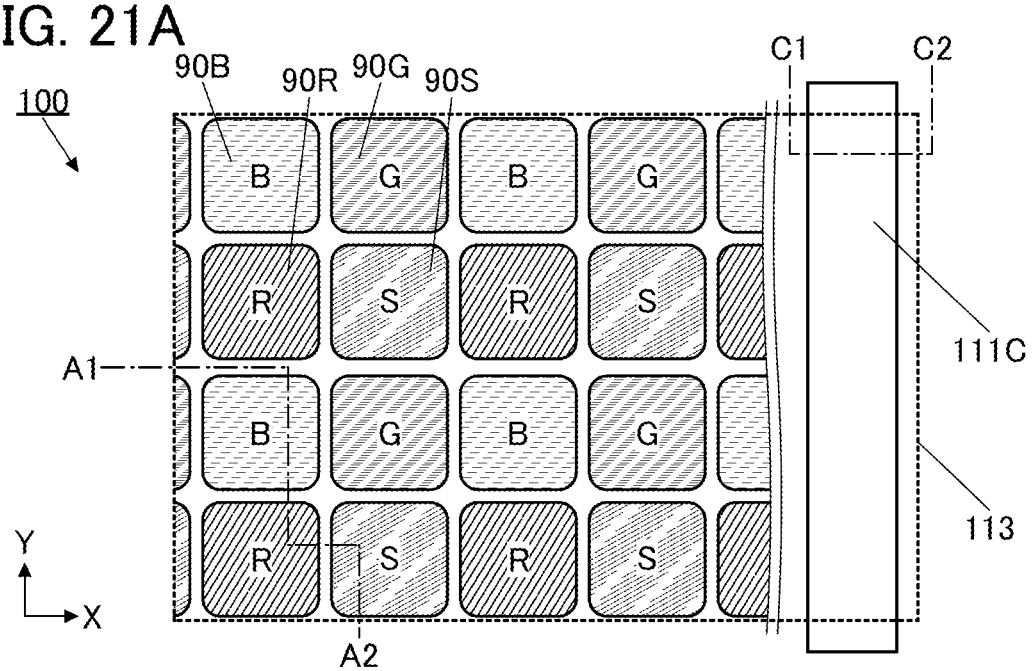
FIG. 21A and FIG. 21B are diagrams illustrating a structure example of a display apparatus.

FIG. 21A is a schematic top view of the display apparatus 100. The display apparatus 100 includes, over a substrate 101, a plurality of light-emitting elements 90R emitting red light, a plurality of light-emitting elements 90G emitting green light, a plurality of light-emitting elements 90B emitting blue light, and a plurality of light-receiving elements 90S. In FIG. 21A, light-emitting regions of the light-emitting elements and the light-receiving elements are denoted by R, G, B, and S to easily differentiate the light-emitting elements.

The light-emitting elements 90R, the light-emitting elements 90G, the light-emitting elements 90B, and the light-receiving elements 90S are arranged in a matrix. In FIG. 21A, two elements are alternately arranged in one direction. Note that the arrangement method of the light-emitting elements is not limited thereto; another method such as a stripe, S stripe, delta, Bayer, zigzag, PenTile, or diamond arrangement may also be used.

FIG. 21A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is provided outside a display region where the light-emitting elements 90R and the like are arranged. In FIG. 21A, the common electrode 113 is denoted by a dashed line.

The connection electrode 111C can be provided along the outer periphery of the display region. For example, the connection electrode 111C may be provided along one side of the outer periphery of the display region or two or more sides of the outer periphery of the display region. That is, in the case where the display region has a rectangular top surface, the top surface of the connection electrode 111C can have a band shape, an L shape, a square bracket shape, a quadrangular shape, or the like.

Figure 21B:
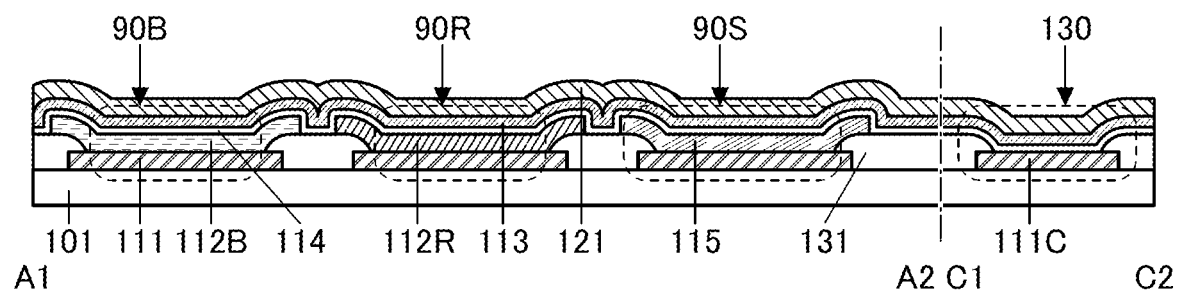

FIG. 21B is a schematic cross-sectional view taken along dashed-dotted lines A1-A2 and C1-C2 in FIG. 21A. FIG. 21B is a schematic cross-sectional view of the light-emitting element 90B, the light-emitting element 90R, the light-receiving element 90S, and the connection electrode 111C.

Note that the light-emitting element 90G that is not illustrated in the schematic cross-sectional view can have a structure similar to that of the light-emitting element 90B or the light-emitting element 90R. Hereinafter, the description of the light-emitting element 90B or the light-emitting element 90R can be referred to for the description of the light-emitting element 90G.

The light-emitting element 90B includes a pixel electrode 111, an organic layer 112B, an organic layer 114, and the common electrode 113. The light-emitting element 90R includes the pixel electrode 111, an organic layer 112R, the organic layer 114, and the common electrode 113. The light-receiving element 90S includes the pixel electrode 111, an organic layer 115, the organic layer 114, and the common electrode 113. The organic layer 114 and the common electrode 113 are shared by the light-emitting element 90B, the light-emitting element 90R, and the light-receiving element 90S. The organic layer 114 can also be referred to as a common layer. The pixel electrodes 111 are provided apart from each other between the light-emitting elements and between the light-emitting element and the light-receiving element.

The organic layer 112R contains at least a light-emitting organic compound that emits red light. The organic layer 112B contains at least a light-emitting organic compound that emits blue light. The organic layer 115 contains a photoelectric conversion material that has sensitivity in the visible light or infrared light wavelength range. The organic layer 112R and the organic layer 112B can each be called an EL layer.

The organic layer 112R, the organic layer 112B, and the organic layer 115 may each include one or more of an electron-injection layer, an electron-transport layer, a hole-injection layer, and a hole-transport layer. The organic layer 114 does not necessarily include the light-emitting layer. For example, the organic layer 114 includes one or more of an electron-injection layer, an electron-transport layer, a hole-injection layer, and a hole-transport layer.

Here, the uppermost layer in the stacked-layer structure of the organic layer 112R, the organic layer 112B, and the organic layer 115, i.e., the layer in contact with the organic layer 114 is preferably a layer other than the light-emitting layer. For example, a structure is preferable in which an electron-injection layer, an electron-transport layer, a hole-injection layer, a hole-transport layer, or a layer other than those covers the light-emitting layer so as to be in contact with the organic layer 114. When atop surface of the light-emitting layer is protected by another layer in manufacturing each light-emitting element, the reliability of the light-emitting element can be improved.

The pixel electrode 111 is provided for each element. The common electrode 113 and the organic layer 114 are provided as layers common to the light-emitting elements. A conductive film that transmits visible light is used for either the respective pixel electrodes or the common electrode 113, and a reflective conductive film is used for the other. When the respective pixel electrodes are light-transmitting electrodes and the common electrode 113 is a reflective electrode, a bottom-emission display apparatus is obtained. When the respective pixel electrodes are reflective electrodes and the common electrode 113 is a light-transmitting electrode, atop-emission display apparatus is obtained. Note that when both the respective pixel electrodes and the common electrode 113 transmit light, a dual-emission display apparatus can be obtained.

The insulating layer 131 is provided to cover end portions of the pixel electrode 111. The end portions of the insulating layer 131 are preferably tapered. Note that in this specification and the like, an end portion of an object having a tapered shape indicates that the end portion of the object has a cross-sectional shape in which the angle between a surface of the object and a surface on which the object is formed is greater than 0° and less than 900 in a region of the end portion, and the thickness continuously increases from the end portion.

When an organic resin is used for the insulating layer 131, a surface of the insulating layer 131 can be moderately curved. Thus, coverage with a film formed over the insulating layer 131 can be improved.

Examples of materials that can be used for the insulating layer 131 include an acrylic resin, a polyimide resin, an epoxy resin, a polyamide resin, a polyimide-amide resin, a siloxane resin, a benzocyclobutene-based resin, a phenol resin, and precursors of these resins.

Alternatively, the insulating layer 131 may be formed using an inorganic insulating material. Examples of inorganic insulating materials that can be used for the insulating layer 131 include oxides and nitrides such as silicon oxide, silicon oxynitride, silicon nitride oxide, silicon nitride, aluminum oxide, aluminum oxynitride, and hafnium oxide. Yttrium oxide, zirconium oxide, gallium oxide, tantalum oxide, magnesium oxide, lanthanum oxide, cerium oxide, neodymium oxide, or the like may be used.

As illustrated in FIG. 21B, there are gaps between the organic layers of two light-emitting elements that emit light of different colors and between the organic layers of the light-emitting element and the light-receiving element, and the organic layers are provided apart from each other. The organic layer 112R, the organic layer 112B, and the organic layer 115 are thus preferably provided so as not to be in contact with each other. This favorably prevents unintentional light emission from being caused by current flowing through adjacent two organic layers. As a result, the contrast can be increased to achieve a display apparatus with high display quality.

The organic layers 112R, 112B, and 115 each preferably have a taper angle of greater than or equal to 30°. In an end portion of each of the organic layer 112R, an organic layer 112G, and the organic layer 112B, the angle between a side surface (a surface) of the layer and a bottom surface of the layer (a surface on which the layer is formed) is preferably greater than or equal to 300 and less than or equal to 120°, further preferably greater than or equal to 450 and less than or equal to 120°, still further preferably greater than or equal to 600 and less than or equal to 120°. Alternatively, the organic layers 112R, 112G, and 112B each preferably have a taper angle of 900 or a neighborhood thereof (greater than or equal to 800 and less than or equal to 100°, for example).

A protective layer 121 is provided over the common electrode 113. The protective layer 121 has a function of preventing diffusion of impurities such as water into each light-emitting element from the above.

The protective layer 121 can have, for example, a single-layer structure or a stacked-layer structure including at least an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, or a hafnium oxide film. Alternatively, a semiconductor material such as indium gallium oxide or indium gallium zinc oxide may be used for the protective layer 121.

As the protective layer 121, a stacked film of an inorganic insulating film and an organic insulating film can be used. For example, a structure in which an organic insulating film is sandwiched between a pair of inorganic insulating films is preferable. Furthermore, it is preferable that the organic insulating film function as a planarization film. With this structure, the top surface of the organic insulating film can be flat, and accordingly, coverage with the inorganic insulating film over the organic insulating film is improved, leading to an improvement in barrier properties. Moreover, since the top surface of the protective layer 121 is flat, a preferable effect can be obtained; when a component (e.g., a color filter, an electrode of a touch sensor, or a lens array) is provided above the protective layer 121, the component is less affected by an uneven shape caused by the lower structure.

In the connection portion 130, the common electrode 113 is provided on and in contact with the connection electrode 111C and the protective layer 121 is provided to cover the common electrode 113. In addition, the insulating layer 131 is provided to cover end portions of the connection electrode 111C.

A structure example of a display apparatus that is partly different from that in FIG. 21B is described below. Specifically, an example in which the insulating layer 131 is not provided is described.

Figure 22A:
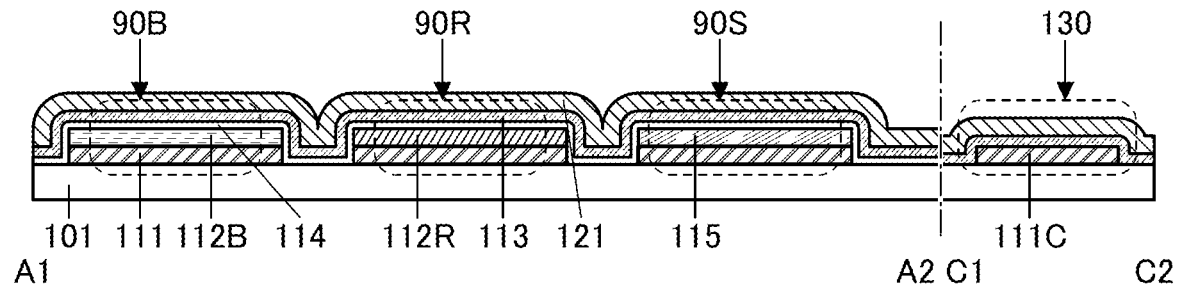
FIG. 22A to FIG. 22D are diagrams illustrating structure examples of a display apparatus.
Figure 22B:
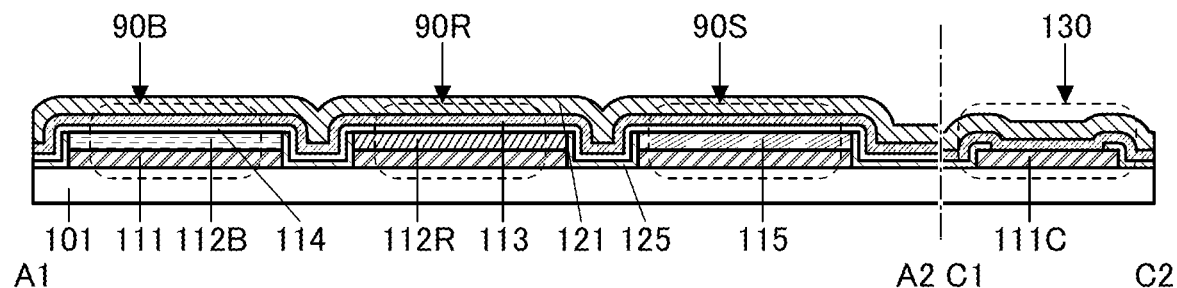
Figure 22C:
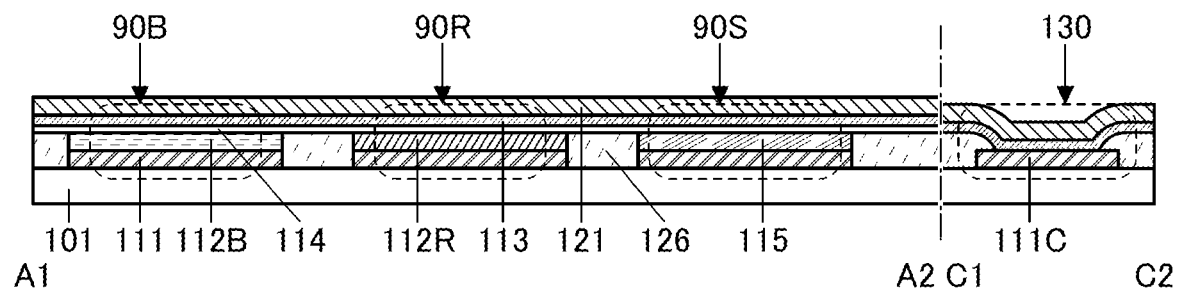

FIGS. 22A to 22C show examples of the case where a side surface of the pixel electrode 111 is substantially aligned with side surfaces of the organic layer 112R, the organic layer 112B, or the organic layer 115.

In FIG. 22A, the organic layer 114 is provided to cover top surfaces and side surfaces of the organic layer 112R, the organic layer 112B, and the organic layer 115. The organic layer 114 can prevent the pixel electrode 111 and the common electrode 113 from being in contact with each other and being electrically short-circuited.

FIG. 22B shows an example in which an insulating layer 125 is provided to be in contact with the side surfaces of the organic layer 112R, the organic layer 112G, the organic layer 112B, and the pixel electrode 111. The insulating layer 125 can prevent the pixel electrode 111 and the common electrode 113 from being electrically short-circuited and effectively inhibit leakage current therebetween.

The insulating layer 125 can be an insulating layer containing an inorganic material. As the insulating layer 125, an inorganic insulating film such as an oxide insulating film, a nitride insulating film, an oxynitride insulating film, or a nitride oxide insulating film can be used, for example.

The insulating layer 125 may have a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when an inorganic insulating film such as an aluminum oxide film, a hafnium oxide film, or a silicon oxide film formed by an ALD method is used as the insulating layer 125, the insulating layer 125 has a small number of pin holes and excels in a function of protecting the organic layer.

Note that in this specification and the like, oxynitride refers to a material that contains more oxygen than nitrogen, and nitride oxide refers to a material that contains more nitrogen than oxygen. For example, a silicon oxynitride refers to a material that contains oxygen at a higher proportion than nitrogen, and a silicon nitride oxide refers to a material that contains nitrogen at a higher proportion than oxygen.

The insulating layer 125 can be formed by a sputtering method, a CVD method, a PLD method, an ALD method, or the like. The insulating layer 125 is preferably formed by an ALD method achieving good coverage.

In FIG. 22C, resin layers 126 are provided between two adjacent light-emitting elements and between the light-emitting element and the light-receiving element so as to fill the space between two facing pixel electrodes and two facing organic layers. The resin layer 126 can planarize the surface on which the organic layer 114, the common electrode 113, and the like are formed, which prevents disconnection of the common electrode 113 due to poor coverage in a step between adjacent light-emitting elements.

As the resin layer 126, an insulating layer containing an organic material can be favorably used. For example, the resin layer 126 can be formed using an acrylic resin, a polyimide resin, an epoxy resin, an imide resin, a polyamide resin, a polyimide-amide resin, a silicone resin, a siloxane resin, a benzocyclobutene-based resin, a phenol resin, precursors of these resins, or the like. The resin layer 126 may be formed using an organic material such as polyvinyl alcohol (PVA), polyvinyl butyral, polyvinylpyrrolidone, polyethylene glycol, polyglycerin, pullulan, water-soluble cellulose, or an alcohol-soluble polyamide resin. Moreover, the resin layer 126 can be formed using a photosensitive resin. A photoresist may be used as the photosensitive resin. The photosensitive resin can be of positive or negative type.

A colored material (e.g., a material containing a black pigment) may be used for the resin layer 126 so that the resin layer 126 has a function of blocking stray light from an adjacent pixel and inhibiting color mixture.

Figure 22D:
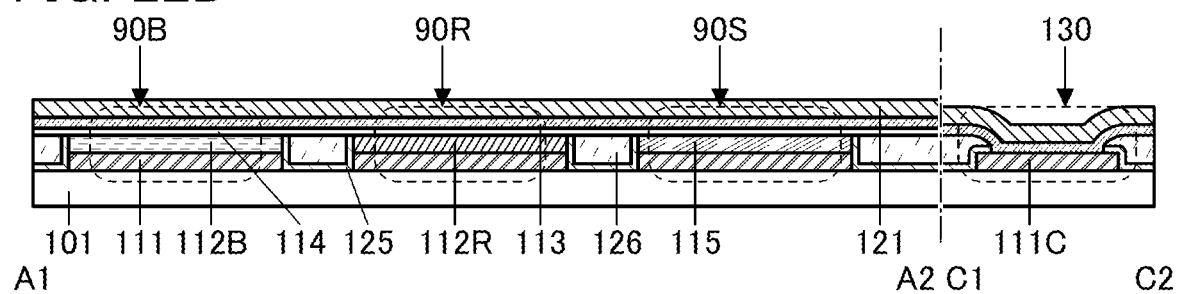

In FIG. 22D, the insulating layer 125 and the resin layer 126 over the insulating layer 125 are provided. Since the insulating layer 125 prevents the organic layer 112R or the like from being in contact with the resin layer 126, impurities such as moisture included in the resin layer 126 can be prevented from being diffused into the organic layer 112R or the like, whereby a highly reliable display apparatus can be provided.

A reflective film (e.g., a metal film containing one or more of silver, palladium, copper, titanium, aluminum, and the like) may be provided between the insulating layer 125 and the resin layer 126 so that light emitted from the light-emitting layer is reflected by the reflective film; hence, the display apparatus may be provided with a function of increasing the light extraction efficiency.

Figure 23A:
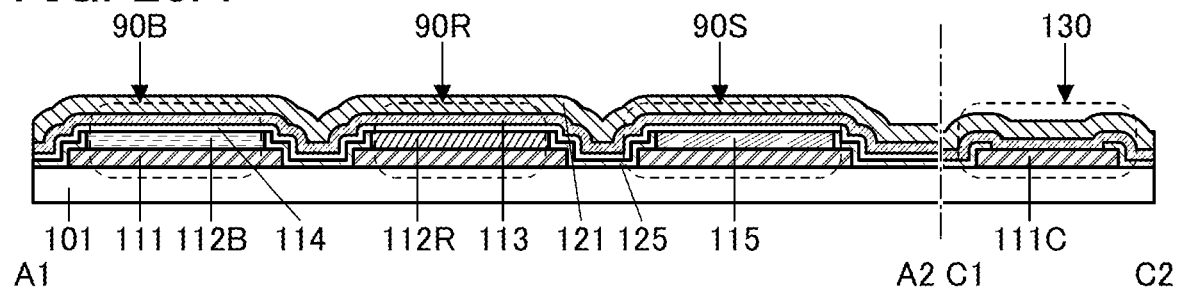
FIG. 23A to FIG. 23C are diagrams illustrating structure examples of a display apparatus.
Figure 23B:
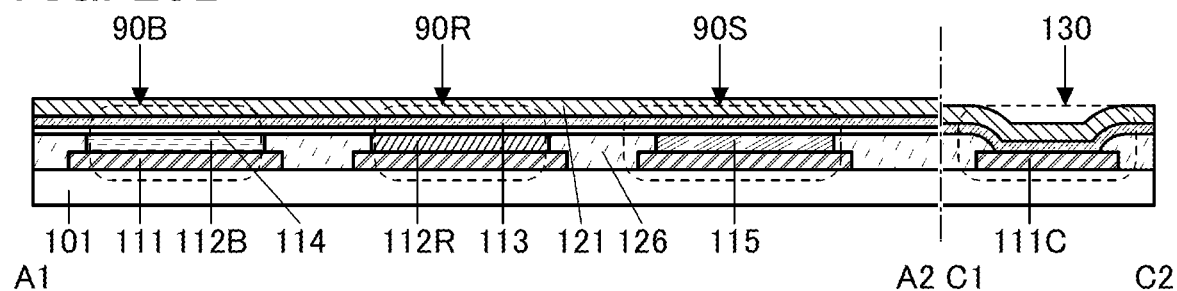
Figure 23C:
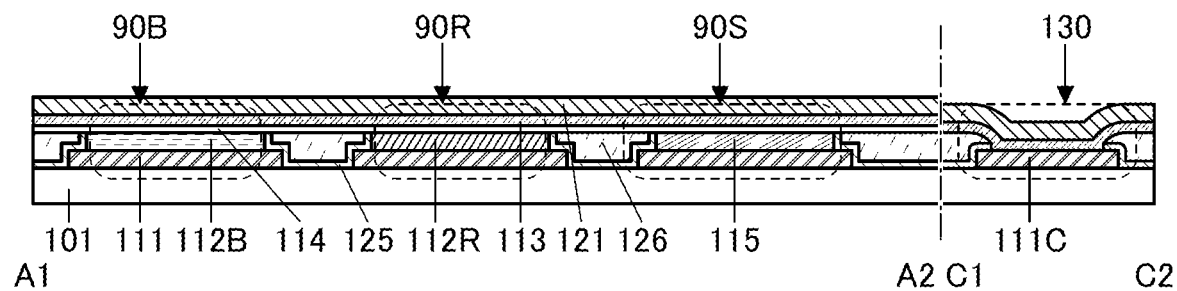

FIGS. 23A to 23C show examples in which the width of the pixel electrode 111 is larger than the width of the organic layer 112R, the organic layer 112B, or the organic layer 115. The organic layer 112R or the like is provided on the inner side than end portions of the pixel electrode 111.

FIG. 23A shows an example in which the insulating layer 125 is provided. The insulating layer 125 is provided to cover the side surfaces of the organic layers included in the light-emitting element and the light-receiving element and part of a top surface and the side surfaces of the pixel electrode 111.

FIG. 23B shows an example in which the resin layer 126 is provided. The resin layer 126 is positioned between two adjacent light-emitting elements or between the light-emitting element and the light-receiving element, and covers the side surfaces of the organic layers and the top and side surfaces of the pixel electrode 111.

FIG. 23C shows an example in which both the insulating layer 125 and the resin layer 126 are provided. The insulating layer 125 is provided between the organic layer 112R or the like and the resin layer 126.

FIG. 24A to FIG. 24D show examples in which the width of the pixel electrode 111 is smaller than the width of the organic layer 112R, the organic layer 112B, or the organic layer 115. The organic layer 112R or the like extends to an outer side beyond the end portions of the pixel electrode 111.

Figure 24A:
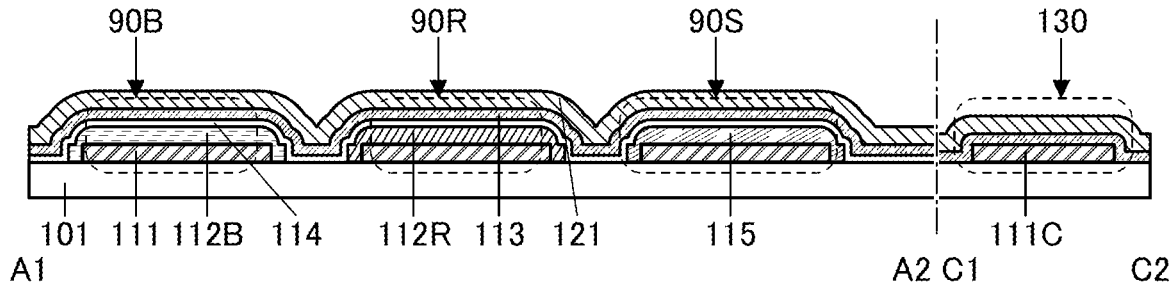
FIG. 24A to FIG. 24D are diagrams illustrating structure examples of a display apparatus.
Figure 24B:
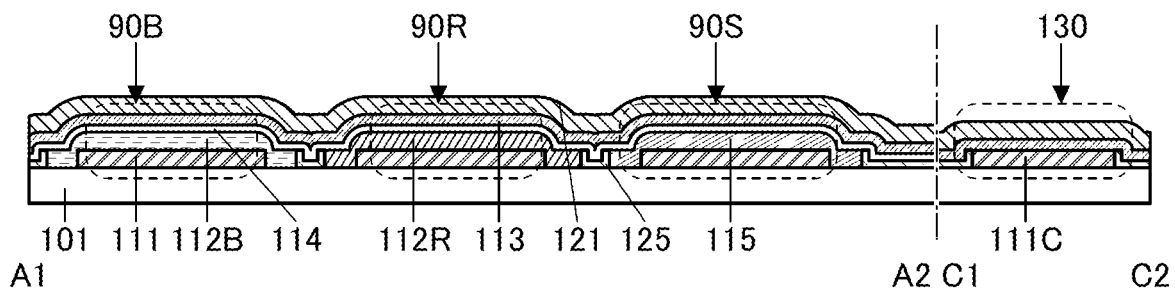

FIG. 24B shows an example in which the insulating layer 125 is provided. The insulating layer 125 is provided in contact with the side surfaces of the organic layers of two adjacent light-emitting elements. The insulating layer 125 may be provided to cover not only the side surface but also part of atop surface of the organic layer 112R or the like.

Figure 24C:
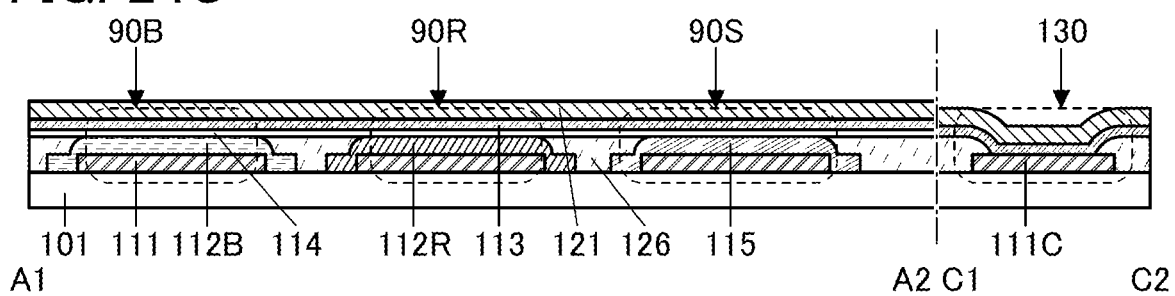

FIG. 24C shows an example in which the resin layer 126 is provided. The resin layer 126 is positioned between two adjacent light-emitting elements and covers the side surface and part of the top surface of the organic layer 112R or the like. The resin layer 126 may be formed to be in contact with the side surface of the organic layer 112R or the like and not to cover the top surface thereof.

Figure 24D:
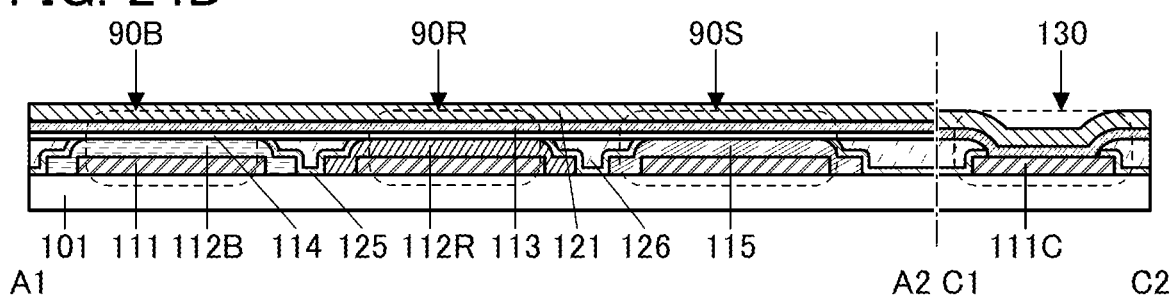

FIG. 24D shows an example in which both the insulating layer 125 and the resin layer 126 are provided. The insulating layer 125 is provided between the organic layer 112R or the like and the resin layer 126.

Here, a structure example of the resin layer 126 is described.

A top surface of the resin layer 126 is preferably as flat as possible; however, the surface of the resin layer 126 may be concave or convex depending on an uneven shape of a surface on which the resin layer 126 is formed, the formation conditions of the resin layer 126, or the like.

FIG. 25A to FIG. 26F are each an enlarged view of an end portion of the pixel electrode 111R included in the light-emitting element 90R, an end portion of the pixel electrode 111G included in the light-emitting element 90G, and the vicinity thereof. The organic layer 112G is provided over the pixel electrode 111G.

Figure 25A:
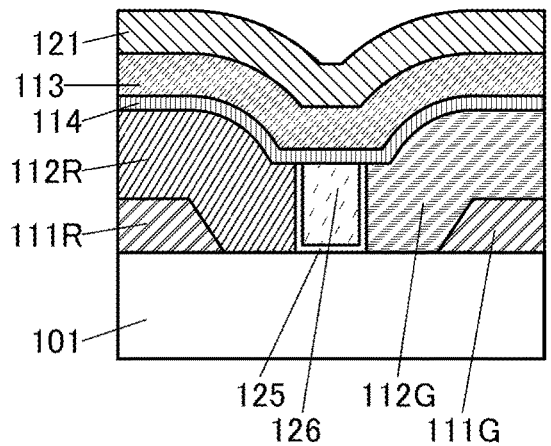
FIG. 25A to FIG. 25F are diagrams illustrating structure examples of a display apparatus.
Figure 25D:
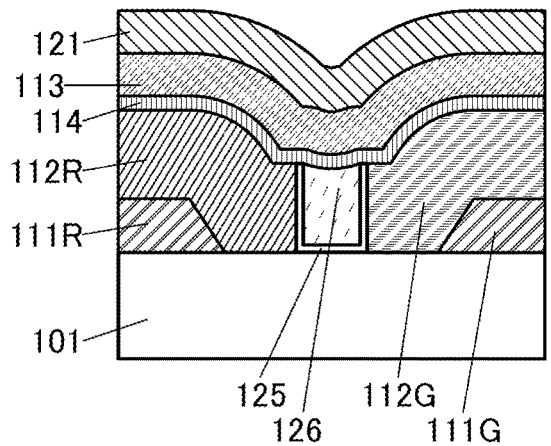
Figure 25B:
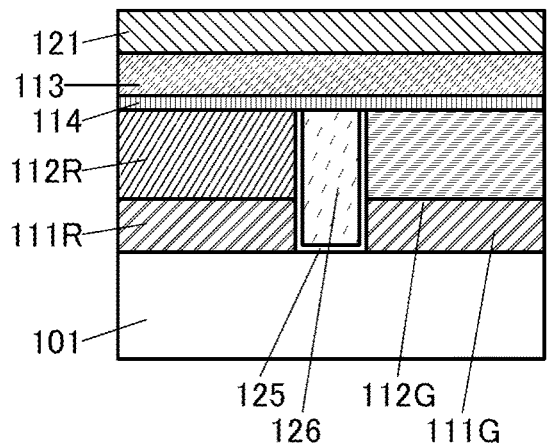
Figure 25E:
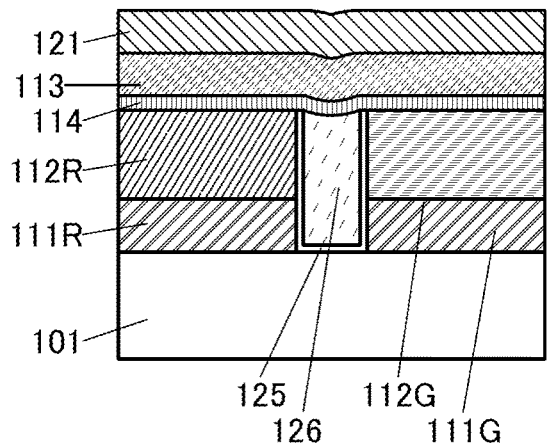
Figure 25C:
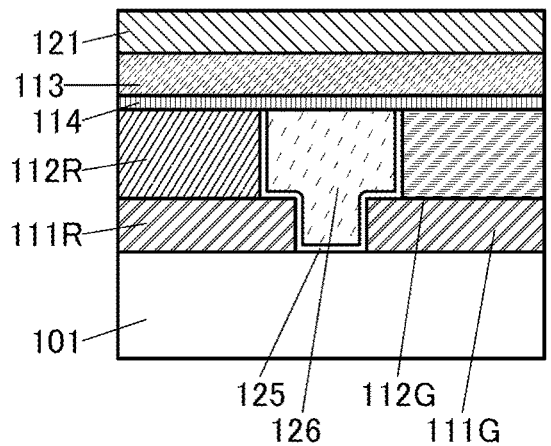

FIG. 25A, FIG. 25B, and FIG. 25C are each an enlarged view of the resin layer 126 having a flat top surface and the vicinity thereof. FIG. 25A shows an example of the case where the organic layer 112R or the like has a larger width than the pixel electrode 111. FIG. 25B shows an example in which these widths are substantially the same. FIG. 25C shows an example of the case where the organic layer 112R or the like has a smaller width than the pixel electrode 111.

The organic layer 112R is provided to cover the end portions of the pixel electrode 111 as illustrated in FIG. 25A, so that the end portion of the pixel electrode 111 is preferably tapered. Accordingly, the step coverage with the organic layer 112R is improved and a highly reliable display apparatus can be provided.

Figure 25F:
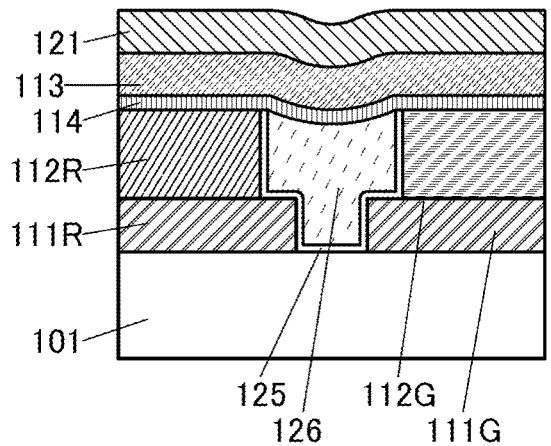

FIG. 25D, FIG. 25E, and FIG. 25F show examples of the case where the top surface of the resin layer 126 is concave. In this case, a concave portion that reflects the concave top surface of the resin layer 126 is formed on each of top surfaces of the organic layer 114, the common electrode 113, and the protective layer 121.

Figure 26A:
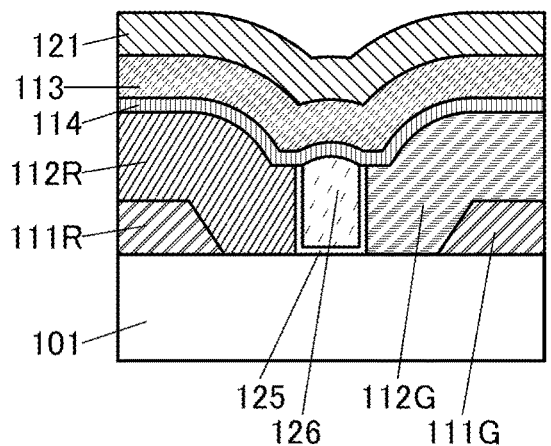
FIG. 26A to FIG. 26F are diagrams illustrating structure examples of a display apparatus.
Figure 26D:
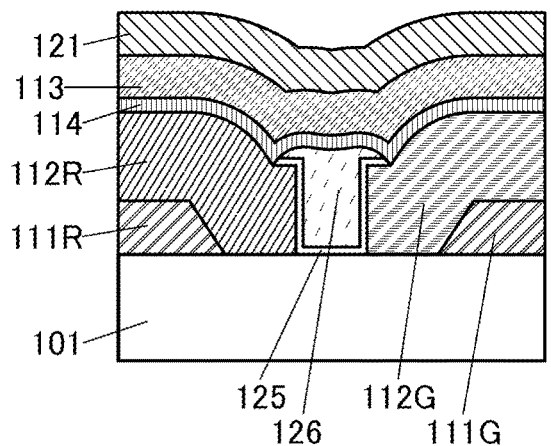
Figure 26B:
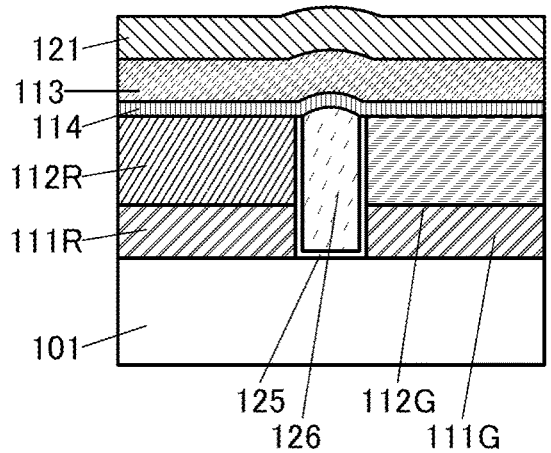
Figure 26E:
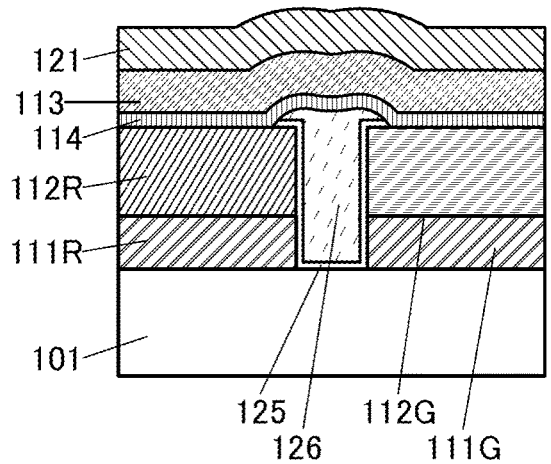
Figure 26C:
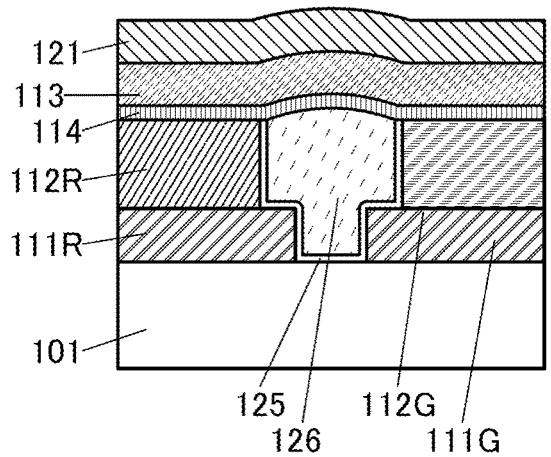

FIG. 26A, FIG. 26B, and FIG. 26C show examples of the case where the top surface of the resin layer 126 is convex. In this case, a convex portion that reflects the convex top surface of the resin layer 126 is formed on each of the top surfaces of the organic layer 114, the common electrode 113, and the protective layer 121.

Figure 26F:
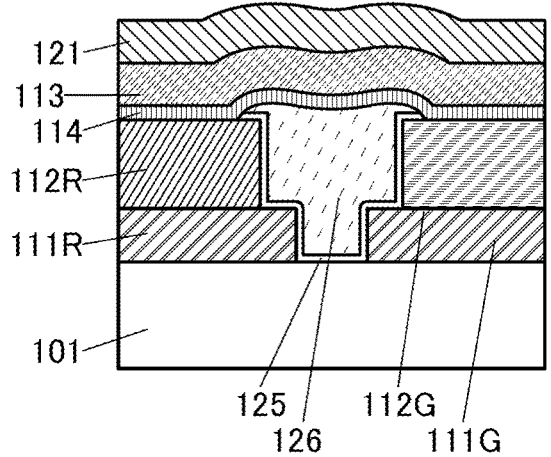

FIG. 26D, FIG. 26E, and FIG. 26F show examples of the case where part of the resin layer 126 covers an upper end portion and part of the top surface of the organic layer 112R and an upper end portion and part of the top surface of the organic layer 112G. Here, the insulating layer 125 is provided between the resin layer 126 and the top surfaces of the organic layers 112R and 112G.

FIG. 26D, FIG. 26E, and FIG. 26F show examples of the case where the top surface of the resin layer 126 is partly concave. In this case, unevenness that reflects the shape of the resin layer 126 is formed on each of the organic layer 114, the common electrode 113, and the protective layer 121.

The above is the description of the structure example of the resin layer.

At least part of this embodiment can be implemented in combination with any of the other embodiments described in this specification, as appropriate.

Embodiment 6

In this embodiment, structure examples of a display apparatus that can be used for the light-emitting and light-receiving apparatus of one embodiment of the present invention are described. Although a display apparatus capable of displaying an image is described here, when a light-emitting element is used as a light source, a light-emitting and light-receiving apparatus can be obtained.

The display apparatus of this embodiment can be a high-definition display apparatus or a large-sized display apparatus. Accordingly, the display apparatus of this embodiment can be used for display portions of electronic devices such as a digital camera, a digital video camera, a digital photo frame, a mobile phone, a portable game console, a smart phone, a wristwatch terminal, a tablet terminal, a portable information terminal, and an audio reproducing device, in addition to display portions of electronic devices with a relatively large screen, such as a television device, a desktop or notebook personal computer, a monitor of a computer or the like, digital signage, and a large game machine such as a pachinko machine.

[Display Apparatus 400]

Figure 27:
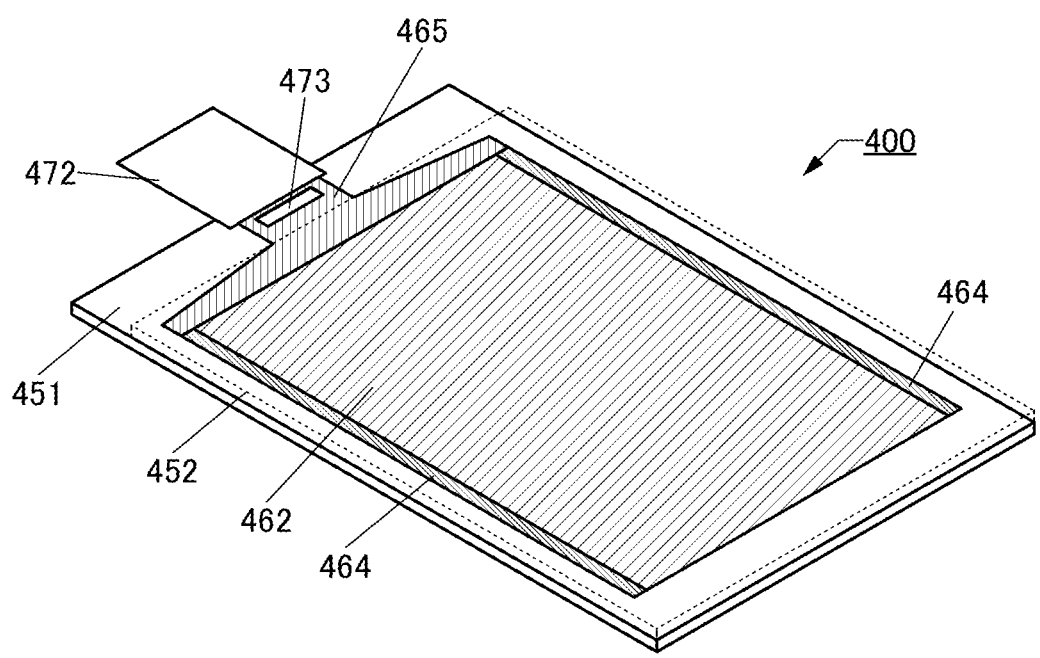
FIG. 27 is a diagram illustrating a structure example of a display apparatus.
Figure 28A:
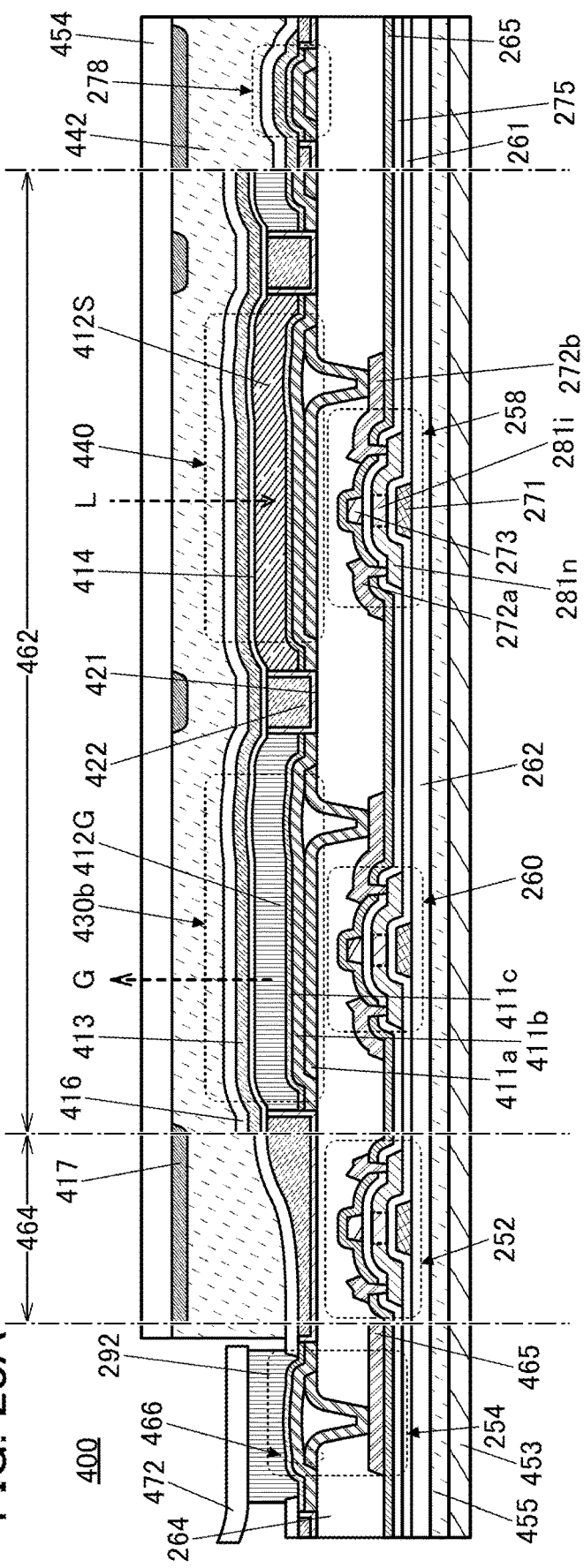
FIG. 28A is a cross-sectional view illustrating an example of a display apparatus.

FIG. 27 is a perspective view of a display apparatus 400, and FIG. 28A is a cross-sectional view of the display apparatus 400.

The display apparatus 400 has a structure in which a substrate 452 and a substrate 451 are bonded to each other. In FIG. 27, the substrate 452 is denoted by a dashed line.

The display apparatus 400 includes a display portion 462, a circuit 464, a wiring 465, and the like. FIG. 27 illustrates an example in which an IC 473 and an FPC 472 are integrated on the display apparatus 400. Thus, the structure illustrated in FIG. 13 can be regarded as a display module including the display apparatus 400, the IC (integrated circuit), and the FPC.

As the circuit 464, for example, a scan line driver circuit can be used.

The wiring 465 has a function of supplying a signal and power to the display portion 462 and the circuit 464. The signal and power are input to the wiring 465 from the outside through the FPC 472 or input to the wiring 465 from the IC 473.

FIG. 27 illustrates an example in which the IC 473 is provided over the substrate 451 by a COG (Chip On Glass) method, a COF (Chip on Film) method, or the like. An IC including a scan line driver circuit, a signal line driver circuit, or the like can be used as the IC 473, for example. Note that the display apparatus 400 and the display module are not necessarily provided with an IC. The IC may be mounted on the FPC by a COF method or the like.

FIG. 28A illustrates an example of cross sections of part of a region including the FPC 472, part of the circuit 464, part of the display portion 462, and part of a region including a connection portion in the display apparatus 400. FIG. 28A specifically illustrates an example of a cross section of a region including a light-emitting element 430b that emits green light (G) and a light-emitting and light-receiving element 440 that receives reflected light (L) in the display portion 462.

The display apparatus 400 illustrated in FIG. 28A includes a transistor 252, a transistor 260, a transistor 258, the light-emitting element 430b, the light-emitting and light-receiving element 440, and the like between a substrate 453 and a substrate 454.

The light-emitting element or the light-receiving element described above as an example can be employed for the light-emitting element 430b and the light-emitting and light-receiving element 440.

Here, in the case where the pixel of the display apparatus includes three kinds of subpixels including light-emitting elements that emit light of different colors, as the three subpixels, subpixels of three colors of red (R), green (G), and blue (B), subpixels of three colors of yellow (Y), cyan (C), and magenta (M), and the like can be given. In the case where the pixel includes four subpixels each including a light-emitting element, as the four subpixels, subpixels of four colors of R, G, B, and white (W), subpixels of four colors of R, G, B, and Y, and the like can be given. Alternatively, the subpixel may include a light-emitting element that emits infrared light.

As the light-receiving element 440, a photoelectric conversion element having sensitivity to light in a red, green, or blue wavelength range or a photoelectric conversion element having sensitivity to light in an infrared wavelength range can be used.

The substrate 454 and the protective layer 416 are bonded to each other with the adhesive layer 442. The adhesive layer 442 is provided to overlap with the light-emitting element 430b and the light-emitting and light-receiving element 440; that is, the display apparatus 400 employs a solid sealing structure. The substrate 454 is provided with a light-blocking layer 417.

The light-emitting element 430b and the light-emitting and light-receiving element 440 each include a conductive layer 411a, a conductive layer 411b, and a conductive layer 411c as a pixel electrode. The conductive layer 411b has a property of reflecting visible light and functions as a reflective electrode. The conductive layer 411c has a property of transmitting visible light and functions as an optical adjustment layer.

The conductive layer 411a included in the light-emitting element 430b is connected to a conductive layer 272b included in the transistor 260 through the opening provided in the insulating layer 264. The transistor 260 has a function of controlling driving of the light-emitting element. The conductive layer 411a included in the light-receiving element 440 is electrically connected to the conductive layer 272b included in the transistor 258. The transistor 258 has a function of controlling, for example, the timing of light exposure using the light-receiving element 440.

An EL layer 412G or a photoelectric conversion layer 412S is provided to cover the pixel electrode. An insulating layer 421 is provided in contact with a side surface of the EL layer 412G and a side surface of the photoelectric conversion layer 412S, and a resin layer 422 is provided to fill a depressed portion of the insulating layer 421. An organic layer 414, a common electrode 413, and the protective layer 416 are provided to cover the EL layer 412G and the photoelectric conversion layer 412S. With provision of the protective layer 416 that covers the light-emitting element, entry of impurities such as water into the light-emitting element can be inhibited, leading to an increase in the reliability of the light-emitting element.

Light G emitted from the light-emitting element 430b is emitted toward the substrate 452 side. The light-receiving element 440 receives light L incident through the substrate 452 and converts the light L into an electric signal. For the substrate 452, a material having a high visible-light-transmitting property is preferably used.

The transistor 252, the transistor 260, and the transistor 258 are formed over the substrate 451. These transistors can be fabricated using the same material in the same step.

Note that the transistor 252, the transistor 260, and the transistor 258 may be separately formed to have different structures. For example, it is possible to separately form a transistor having a back gate and a transistor having no back gate, or transistors having semiconductors, gate electrodes, gate insulating layers, source electrodes, and drain electrodes that are formed of different materials and/or have different thicknesses.

The substrate 453 and an insulating layer 262 are bonded to each other with an adhesive layer 455.

In a manufacturing method of the display apparatus 400, first, a formation substrate provided with the insulating layer 262, the transistors, the light-emitting elements, the light-receiving element, and the like is bonded to the substrate 454 provided with the light-blocking layer 417 with the adhesive layer 442. Then, the substrate 453 is attached to a surface exposed by separation of the formation substrate, whereby the components formed over the formation substrate are transferred onto the substrate 453. The substrate 453 and the substrate 454 preferably have flexibility. This can increase the flexibility of the display apparatus 400.

A connection portion 254 is provided in a region of the substrate 453 that does not overlap with the substrate 454. In the connection portion 254, the wiring 465 is electrically connected to the FPC 472 through a conductive layer 466 and a connection layer 292. The conductive layer 466 can be obtained by processing the same conductive film as the pixel electrode. Thus, the connection portion 254 and the FPC 472 can be electrically connected to each other through the connection layer 292.

Each of the transistor 252, the transistors 260, and the transistor 258 includes a conductive layer 271 functioning as a gate, an insulating layer 261 functioning as a gate insulating layer, a semiconductor layer 281 including a channel formation region 281i and a pair of low-resistance regions 281n, the conductive layer 272a connected to one of the pair of low-resistance regions 281n, the conductive layer 272b connected to the other of the pair of low-resistance regions 281n, an insulating layer 275 functioning as a gate insulating layer, a conductive layer 273 functioning as a gate, and an insulating layer 265 covering the conductive layer 273. The insulating layer 261 is positioned between the conductive layer 271 and the channel formation region 281i. The insulating layer 275 is positioned between the conductive layer 273 and the channel formation region 281i.

The conductive layer 272a and the conductive layer 272b are connected to the corresponding low-resistance regions 281n through openings provided in the insulating layer 265. One of the conductive layer 272a and the conductive layer 272b functions as a source, and the other functions as a drain.

FIG. 28A illustrates an example in which the insulating layer 275 covers the top surface and a side surface of the semiconductor layer. The conductive layer 272a and the conductive layer 272b are connected to the corresponding low-resistance regions 281n through openings provided in the insulating layer 275 and the insulating layer 265.

Figure 28B:
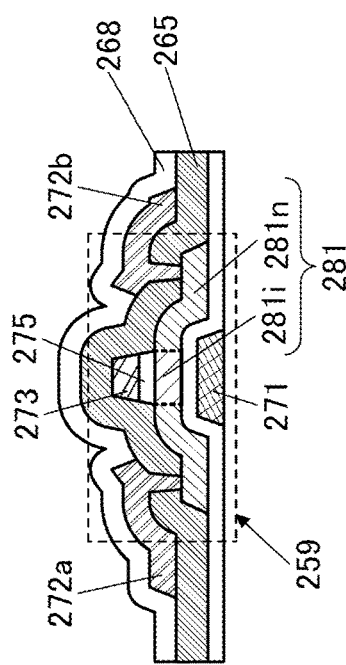
FIG. 28B is a cross-sectional view illustrating an example of a transistor.

Meanwhile, in a transistor 259 illustrated in FIG. 28B, the insulating layer 275 overlaps with the channel formation region 281i of the semiconductor layer 281 and does not overlap with the low-resistance regions 281n. The structure illustrated in FIG. 28B can be fabricated by processing the insulating layer 275 using the conductive layer 273 as a mask, for example. In FIG. 28B, the insulating layer 265 is provided to cover the insulating layer 275 and the conductive layer 273, and the conductive layer 272a and the conductive layer 272b are connected to the low-resistance regions 281n through the openings in the insulating layer 265. Furthermore, an insulating layer 268 covering the transistor may be provided.

There is no particular limitation on the structure of the transistors included in the display apparatus of this embodiment. For example, a planar transistor, a staggered transistor, an inverted staggered transistor, or the like can be used. A top-gate or a bottom-gate transistor structure may be employed. Alternatively, gates may be provided above and below the semiconductor layer in which a channel is formed.

The structure in which the semiconductor layer where a channel is formed is interposed between two gates is used for the transistor 252, the transistor 260, and the transistor 258. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the semiconductor layer of the transistor, and any of an amorphous semiconductor, a single crystal semiconductor, and a semiconductor having crystallinity other than single crystal (a microcrystalline semiconductor, a polycrystalline semiconductor, or a semiconductor partly including crystal regions) may be used. A single crystal semiconductor or a semiconductor having crystallinity is preferably used, in which case deterioration of the transistor characteristics can be inhibited.

The semiconductor layer of the transistor preferably includes a metal oxide (also referred to as an oxide semiconductor). That is, a transistor including a metal oxide in its channel formation region (hereinafter, also referred to as an OS transistor) is preferably used for the display apparatus of this embodiment.

The band gap of a metal oxide used for the semiconductor layer of the transistor is preferably 2 eV or more, further preferably 2.5 eV or more. With the use of a metal oxide having a wide bandgap, the off-state current of the OS transistor can be reduced.

A metal oxide contains preferably at least indium or zinc and further preferably indium and zinc. A metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. In particular, M is preferably one or more kinds selected from gallium, aluminum, yttrium, and tin, and M is further preferably gallium. Hereinafter, a metal oxide containing indium, M, and zinc is referred to as In-M-Zn oxide in some cases.

When a metal oxide is an In-M-Zn oxide, the atomic ratio of In is preferably higher than or equal to the atomic ratio of Min the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of an intended atomic ratio. By increasing the proportion of the number of indium atoms in the metal oxide, the on-state current, field-effect mobility, or the like of the transistor can be improved.

For example, when the atomic ratio is described as In:Ga:Zn=4:2:3 or a composition in the neighborhood thereof, the case is included where the content ratio of each element is as follows; Ga is greater than or equal to 1 and less than or equal to 3 and Zn is greater than or equal to 2 and less than or equal to 4 with In being 4. When the atomic ratio is described as In:Ga:Zn=5:1:6 or a composition in the neighborhood thereof, the case is included where the content ratio of each element is as follows; Ga is greater than 0.1 and less than or equal to 2 and Zn is greater than or equal to 5 and less than or equal to 7 with In being 5. When the atomic ratio is described as In:Ga:Zn=1:1:1 or a composition in the neighborhood thereof, the case is included where the content ratio of each element is as follows; Ga is greater than 0.1 and less than or equal to 2 and Zn is greater than 0.1 and less than or equal to 2 with In being 1.

The proportion of In contained may be less than the proportion of M contained in the In-M-Zn oxide. Examples of the atomic ratio of the metal elements in such an In-M-Zn oxide include In:M:Zn=1:3:2 or a composition in the neighborhood thereof, In:M:Zn=1:3:3 or a composition in the neighborhood thereof, and In:M:Zn=1:3:4 or a composition in the neighborhood thereof. By increasing the proportion of the number of M atoms in the metal oxide, the band gap of the In-M-Zn oxide is further increased; thus, the resistance to a negative bias stress test with light irradiation can be improved. Specifically, the amount of change in the threshold voltage or the amount of change in the shift voltage (Vsh) measured in a NBTIS (Negative Bias Temperature Illumination Stress) test of the transistor can be decreased. Note that the shift voltage (Vsh) is defined as Vg at which, in a drain current (Id)-gate voltage (Vg) curve of a transistor, the tangent at a point where the slope of the curve is the steepest intersects the straight line of Id=1 pA.

Alternatively, the semiconductor layer of the transistor may include silicon. Examples of silicon include amorphous silicon and crystalline silicon (e.g., low-temperature polysilicon or single crystal silicon).

In particular, low-temperature polysilicon has relatively high mobility and can be formed over a glass substrate, and thus can be favorably used for a display apparatus. For example, a transistor including low-temperature polysilicon in a semiconductor layer can be used as the transistor 252 and the like included in the driver circuit, and a transistor including an oxide semiconductor in a semiconductor layer can be used as the transistor 260, the transistor 258, and the like provided for the pixel.

Alternatively, a semiconductor layer of a transistor may include a layered material that functions as a semiconductor. The layered material is a general term of a group of materials having a layered crystal structure. In the layered crystal structure, layers formed by covalent bonding or ionic bonding are stacked with bonding such as the Van der Waals force, which is weaker than covalent bonding or ionic bonding. The layered material has high electrical conductivity in a monolayer, that is, high two-dimensional electrical conductivity. When a material that functions as a semiconductor and has high two-dimensional electrical conductivity is used for a channel formation region, a transistor having a high on-state current can be provided.

Examples of the layered materials include graphene, silicene, and chalcogenide. Chalcogenide is a compound containing chalcogen (an element belonging to Group 16). Examples of chalcogenide include transition metal chalcogenide and chalcogenide of Group 13 elements. Specific examples of the transition metal chalcogenide which can be used for a semiconductor layer of a transistor include molybdenum sulfide (typically $MoS_2$), molybdenum selenide (typically $MoSe_2$), molybdenum telluride (typically $MoTe_2$), tungsten sulfide (typically $WS_2$), tungsten selenide (typically $WSe_2$), tungsten telluride (typically $WTe_2$), hafnium sulfide (typically $HfS_2$), hafnium selenide (typically $HfSe_2$), zirconium sulfide (typically $ZrS_2$), and zirconium selenide (typically $ZrSe_2$).

The transistor included in the circuit 464 and the transistor included in the display portion 462 may have the same structure or different structures. A plurality of transistors included in the circuit 464 may have the same structure or two or more kinds of structures. Similarly, a plurality of transistors included in the display portion 462 may have the same structure or two or more kinds of structures.

A material through which impurities such as water and hydrogen do not easily diffuse is preferably used for at least one of the insulating layers covering the transistors. Such an insulating layer can function as a barrier layer. Such a structure can effectively inhibit diffusion of impurities into the transistors from the outside and increase the reliability of a display apparatus.

An inorganic insulating film is preferably used as each of the insulating layer 261, the insulating layer 262, the insulating layer 265, the insulating layer 268, and the insulating layer 275. As the inorganic insulating film, a silicon nitride film, a silicon oxynitride film, a silicon oxide film, a silicon nitride oxide film, an aluminum oxide film, or an aluminum nitride film can be used, for example. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above inorganic insulating films may also be used.

Here, an organic insulating film often has a lower barrier property than an inorganic insulating film. Therefore, the organic insulating film preferably has an opening in the vicinity of an end portion of the display apparatus 400. This can inhibit entry of impurities from the end portion of the display apparatus 400 through the organic insulating film. Alternatively, the organic insulating film may be formed so that its end portion is positioned on the inner side compared to the end portion of the display apparatus 400, to prevent the organic insulating film from being exposed at the end portion of the display apparatus 400.

An organic insulating film is suitable for the insulating layer 264 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

The light-blocking layer 417 is preferably provided on a surface of the substrate 454 on the substrate 453 side. A variety of optical members can be arranged on the outer surface of the substrate 454. Examples of the optical members include a polarizing plate, a retardation plate, a light diffusion layer (e.g., a diffusion film), an anti-reflective layer, and a light-condensing film. Furthermore, an antistatic film preventing the attachment of dust, a water repellent film suppressing the attachment of stain, a hard coat film suppressing generation of a scratch caused by the use, an impact-absorbing layer, or the like may be arranged on the outer surface of the substrate 454.

FIG. 28A illustrates a connection portion 278. In the connection portion 278, the common electrode 413 is electrically connected to a wiring. FIG. 28A illustrates an example of the case in which the wiring has the same stacked-layer structure as the pixel electrode.

For each of the substrate 453 and the substrate 454, glass, quartz, ceramics, sapphire, a resin, a metal, an alloy, a semiconductor, or the like can be used. The substrate on the side from which light from the light-emitting element is extracted is formed using a material which transmits the light. When the substrate 453 and the substrate 454 are formed using a flexible material, the flexibility of the display apparatus can be increased. Furthermore, a polarizing plate may be used as the substrate 453 or the substrate 454.

For each of the substrate 453 and the substrate 454, a polyester resin such as polyethylene terephthalate (PET) or polyethylene naphthalate (PEN), a polyacrylonitrile resin, an acrylic resin, a polyimide resin, a polymethyl methacrylate resin, a polycarbonate (PC) resin, a polyether sulfone (PES) resin, a polyamide resin (e.g., nylon or aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, or cellulose nanofiber can be used, for example. Glass that is thin enough to have flexibility may be used for one or both of the substrate 453 and the substrate 454.

In the case where a circularly polarizing plate overlaps with the display apparatus, a highly optically isotropic substrate is preferably used as the substrate included in the display apparatus. A highly optically isotropic substrate has a low birefringence (in other words, a small amount of birefringence).

The absolute value of a retardation (phase difference) of a highly optically isotropic substrate is preferably less than or equal to 30 nm, further preferably less than or equal to 20 nm, still further preferably less than or equal to 10 nm.

Examples of the films having high optical isotropy include a triacetyl cellulose (TAC, also referred to as cellulose triacetate) film, a cycloolefin polymer (COP) film, a cycloolefin copolymer (COC) film, and an acrylic film.

When a film is used for the substrate and the film absorbs water, the shape of a display panel might be changed, e.g., creases are generated. Thus, for the substrate, a film with a low water absorption rate is preferably used. For example, the water absorption rate of the film is preferably lower than or equal to 1%, further preferably lower than or equal to 0.1%, still further preferably lower than or equal to 0.01%.

As the adhesive layer, any of a variety of curable adhesives such as a reactive curable adhesive, a thermosetting curable adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. A two-component-mixture-type resin may be used. An adhesive sheet or the like may be used.

As the connection layer 292, an anisotropic conductive film (ACF), an anisotropic conductive paste (ACP), or the like can be used.

Examples of materials that can be used for a gate, a source, and a drain of a transistor and conductive layers such as a variety of wirings and electrodes included in a display apparatus include metals such as aluminum, titanium, chromium, nickel, copper, yttrium, zirconium, molybdenum, silver, tantalum, or tungsten, and an alloy containing any of these metals as its main component. A film containing any of these materials can be used in a single layer or as a stacked-layer structure.

For a conductive material having a light-transmitting property, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), the thickness is preferably set small enough to be able to transmit light. A stacked film of any of the above materials can be used as a conductive layer. For example, a stacked film of indium tin oxide and an alloy of silver and magnesium, or the like is preferably used for increased conductivity. These materials can also be used, for example, for the conductive layers such as a variety of wirings and electrodes included in a display apparatus, and conductive layers (conductive layers functioning as a pixel electrode or a common electrode) included in the light-emitting element.

For an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

At least part of the structure examples, the drawings corresponding thereto, and the like described in this embodiment as an example can be combined with the other structure examples, the other drawings, and the like as appropriate.

At least part of this embodiment can be implemented in combination with the other embodiments described in this specification as appropriate.

Embodiment 7

In this embodiment, an example of a display apparatus including a light-receiving device of one embodiment of the present invention and the like will be described.

In the display apparatus of this embodiment, a pixel can include a plurality of types of subpixels including light-emitting devices that emit light of different colors. For example, the pixel can include three types of subpixels. The three subpixels can be of three colors of red (R), green (G), and blue (B) or of three colors of yellow (Y), cyan (C), and magenta (M), for example. Alternatively, the pixel can include four types of subpixels. The four subpixels can be of four colors of R, G, B, and white (W) or of four colors of R, G, B, and Y, for example.

There is no particular limitation on the arrangement of subpixels, and a variety of methods can be employed. Examples of the arrangement of subpixels include stripe arrangement, S-stripe arrangement, matrix arrangement, delta arrangement, Bayer arrangement, and pentile arrangement.

Examples of a top surface shape of the subpixel include polygons such as a triangle, a tetragon (including a rectangle and a square), and a pentagon; polygons with rounded corners; an ellipse; and a circle. Here, atop surface shape of the subpixel corresponds to atop surface shape of a light-emitting region of the light-emitting device.

In the display apparatus including light-emitting devices and a light-receiving device in each pixel, the pixel has a light-receiving function; thus, the display apparatus can sense a contact or approach of an object while displaying an image. For example, an image can be displayed by using all the subpixels included in the display apparatus; or light can be emitted by some of the subpixels as a light source, some of the rest of the subpixels can sense light, and an image can be displayed by using the other subpixels.

Figure 29A:
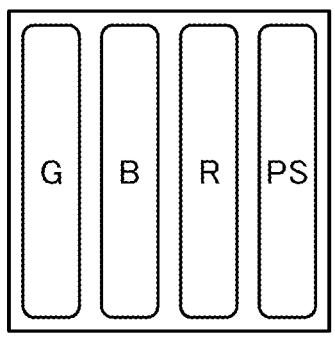
FIG. 29A to FIG. 29F are diagrams illustrating examples of a pixel.
Figure 29B:
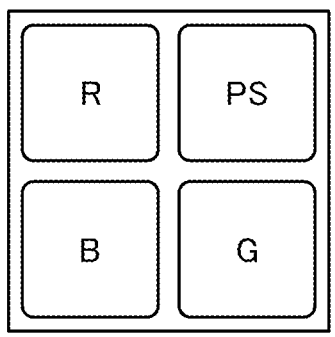
Figure 29C:
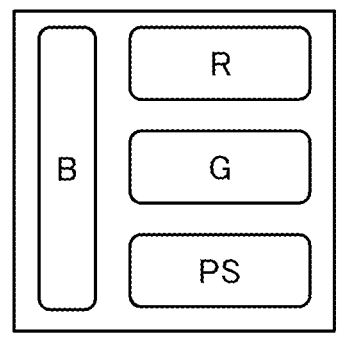

Pixels illustrated in FIG. 29A, FIG. 29B, and FIG. 29C each include a subpixel G, a subpixel B, a subpixel R, and a subpixel PS.

The pixel illustrated in FIG. 29A employs S-stripe arrangement. The pixel illustrated in FIG. 29B employs matrix arrangement.

In the pixel illustrated in FIG. 29C, three subpixels (the subpixels R, G, and PS) are vertically arranged next to one subpixel (the subpixel B).

Figure 29D:
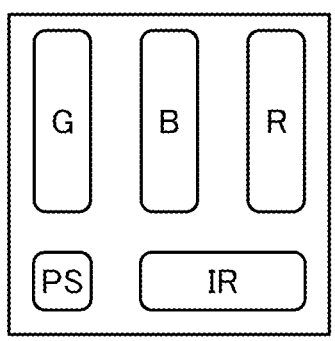
Figure 29E:
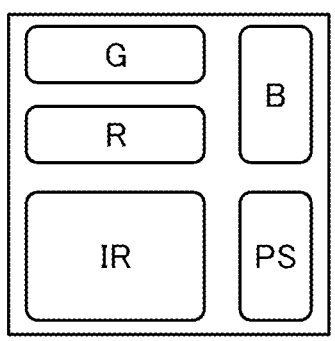
Figure 29F:
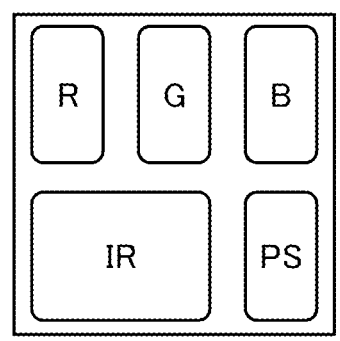

Pixels illustrated in FIG. 29D, FIG. 29E, and FIG. 29F each include the subpixel G, the subpixel B, the subpixel R, a subpixel IR, and the subpixel PS.

FIG. 29D, FIG. 29E, and FIG. 29F illustrate examples in which one pixel is provided in two rows. Three subpixels (the subpixels G, B, and R) are provided in the upper row (first row), and two subpixel (one subpixel PS and one subpixel IRS) are provided in the lower row (second row).

In FIG. 29D, the three vertically oriented subpixels G, B, and R are arranged laterally, and the subpixel PS and the horizontally oriented subpixel IR are arranged laterally below the three subpixels. In FIG. 29E, the two horizontally oriented subpixels G and R are arranged in the vertical direction; the vertically oriented subpixel B is arranged laterally next to the subpixels G and R; and the horizontally oriented subpixel IR and the vertically oriented subpixel PS are arranged laterally below the subpixels R, G, and B. In FIG. 29F, the three vertically oriented subpixels R, G, and B are arranged laterally, and the horizontally oriented subpixel IR and the vertically oriented subpixel PS are arranged laterally below the subpixels R, G, and B. In FIG. 29E and FIG. 29F, the area of the subpixel IR is the largest, and the area of the subpixel PS is substantially the same as that of the subpixel B and the like.

Note that the layout of the subpixels is not limited to those illustrated in FIG. 29A to FIG. 29F.

The subpixel R includes a light-emitting device that emits red light. The subpixel G includes a light-emitting device that emits green light. The subpixel B includes a light-emitting device that emits blue light. The subpixel IR includes a light-emitting device that emits infrared light. The subpixel PS includes a light-receiving device. Although there is no particular limitation on the wavelength of light that the subpixel PS senses, the light-receiving device included in the subpixel PS preferably has sensitivity to light emitted from the light-emitting device included in the sub-pixel R, the subpixel G, the subpixel B, or the subpixel IR. The light-receiving device preferably senses one or more of light in blue, violet, bluish violet, green, yellow green, yellow, orange, red, and infrared wavelength ranges, for example.

The light-receiving area of the subpixel PS is smaller than the light-emitting area of each of the other subpixels. A smaller light-receiving area leads to a narrower image-capturing range, prevents a blur in a captured image, and improves the definition. Thus, by using the subpixel PS, high-resolution or high-definition image capturing is possible. For example, image capturing for personal authentication with the use of a fingerprint, a palm print, the iris, the shape of a blood vessel (including the shape of a vein and the shape of an artery), a face, or the like is possible by using the subpixel PS.

Moreover, the subpixel PS can be used in a touch sensor (also referred to as a direct touch sensor), a near touch sensor (also referred to as a hover sensor, a hover touch sensor, a contactless sensor, or a touchless sensor), or the like. For example, the subpixel PS preferably senses infrared light. Thus, touch sensing is possible even in a dark place.

Here, the touch sensor or the near touch sensor can detect an approach or contact of an object (e.g., a finger, a hand, or a pen). The touch sensor can detect an object when the display apparatus and the object come in direct contact with each other. The near touch sensor can detect an object even when the object is not in contact with the display apparatus. For example, the display apparatus can preferably detect an object when the distance between the display apparatus and the object is more than or equal to 0.1 mm and less than or equal to 300 mm, preferably more than or equal to 3 mm and less than or equal to 50 mm. With this structure, the display apparatus can be controlled without an object directly contacting with the display apparatus. In other words, the display apparatus can be controlled in a contactless (touch-less) manner. With the above structure, the display apparatus can be controlled with a reduced risk of making the display apparatus dirty or damaging the display apparatus or without the object directly touching a dirt (e.g., dust, bacteria, or a virus) attached to the display apparatus.

For high-resolution image capturing, the subpixel PS is preferably provided in every pixel included in the display apparatus. Meanwhile, in the case where the subpixel PS is used in a touch sensor, a near touch sensor, or the like, high accuracy is not required as compared to the case of capturing an image of a fingerprint or the like; accordingly, the subpixel PS is provided in some of the pixels in the display apparatus. When the number of subpixels PS included in the display apparatus is smaller than the number of subpixels R or the like, higher detection speed can be achieved.

Figure 29G:
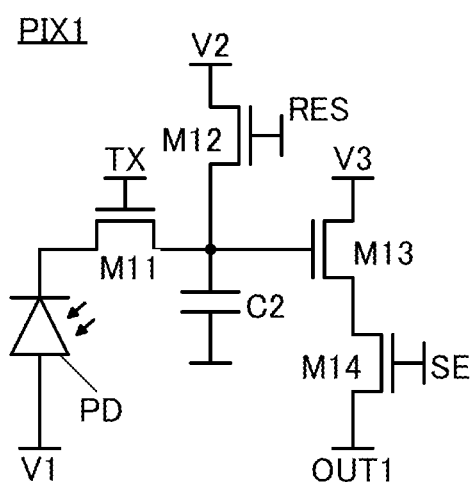
FIG. 29G and FIG. 29H are diagrams illustrating examples of a circuit diagram of a pixel.
Figure 29H:
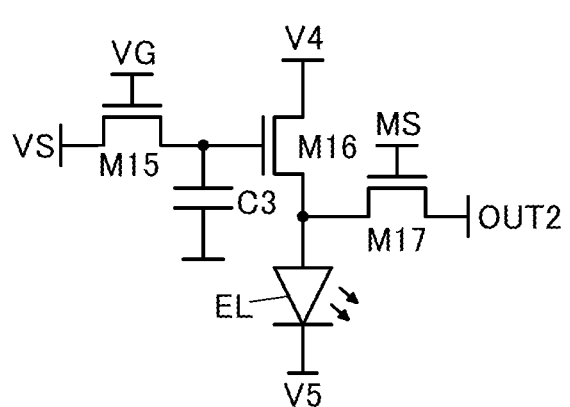

FIG. 29G illustrates an example of a pixel circuit for a subpixel including a light-receiving device. FIG. 29H illustrates an example of a pixel circuit for a subpixel including a light-emitting device.

A pixel circuit PIX1 illustrated in FIG. 29G includes a light-receiving device PD, a transistor M11, a transistor M12, a transistor M13, a transistor M14, and a capacitor C2. Here, a photodiode is used as an example of the light-receiving device PD.

An anode of the light-receiving device PD is electrically connected to a wiring V1, and a cathode of the light-receiving device PD is electrically connected to one of a source and a drain of the transistor M11. A gate of the transistor M11 is electrically connected to a wiring TX, and the other of the source and the drain of the transistor M1 is electrically connected to one electrode of the capacitor C2, one of a source and a drain of the transistor M12, and a gate of the transistor M13. A gate of the transistor M12 is electrically connected to a wiring RES, and the other of the source and the drain of the transistor M12 is electrically connected to a wiring V2. One of a source and a drain of the transistor M13 is electrically connected to a wiring V3, and the other of the source and the drain of the transistor M13 is electrically connected to one of a source and a drain of the transistor M14. A gate of the transistor M14 is electrically connected to a wiring SE, and the other of the source and the drain of the transistor M14 is electrically connected to a wiring OUT1.

A constant potential is supplied to the wiring V1, the wiring V2, and the wiring V3. When the light-receiving device PD is driven with a reverse bias, the wiring V2 is supplied with a potential higher than the potential of the wiring V1. The transistor M12 is controlled by a signal supplied to the wiring RES and has a function of resetting the potential of a node connected to the gate of the transistor M13 to a potential supplied to the wiring V2. The transistor M11 is controlled by a signal supplied to the wiring TX and has a function of controlling the timing at which the potential of the node changes, in accordance with a current flowing through the light-receiving device PD. The transistor M13 functions as an amplifier transistor for outputting a signal corresponding to the potential of the node. The transistor M14 is controlled by a signal supplied to the wiring SE and functions as a selection transistor for reading an output corresponding to the potential of the node by an external circuit connected to the wiring OUT1.

A pixel circuit PIX2 illustrated in FIG. 29H includes a light-emitting device EL, a transistor M15, a transistor M16, a transistor M17, and a capacitor C3. Here, a light-emitting diode is used as an example of the light-emitting device EL. In particular, an organic EL element is preferably used as the light-emitting device EL.

A gate of the transistor M15 is electrically connected to a wiring VG, one of a source and a drain of the transistor M15 is electrically connected to a wiring VS, and the other of the source and the drain of the transistor M15 is electrically connected to one electrode of the capacitor C3 and a gate of the transistor M16. One of a source and a drain of the transistor M16 is electrically connected to a wiring V4, and the other of the source and the drain of the transistor M16 is electrically connected to an anode of the light-emitting device EL and one of a source and a drain of the transistor M17. A gate of the transistor M17 is electrically connected to a wiring MS, and the other of the source and the drain of the transistor M17 is electrically connected to a wiring OUT2. A cathode of the light-emitting device EL is electrically connected to a wiring V5.

A constant potential is supplied to the wiring V4 and the wiring V5. The anode of the light-emitting device EL can be set to a high potential, and the cathode can be set to a lower potential than the anode. The transistor M15 is controlled by a signal supplied to the wiring VG and functions as a selection transistor for controlling a selection state of the pixel circuit PIX2. The transistor M16 functions as a driving transistor that controls a current flowing through the light-emitting device EL in accordance with a potential supplied to the gate of the transistor M16. When the transistor M15 is on, a potential supplied to the wiring VS is supplied to the gate of the transistor M16, and the luminance of the light-emitting device EL can be controlled in accordance with the potential. The transistor M17 is controlled by a signal supplied to the wiring MS and has a function of outputting a potential between the transistor M16 and the light-emitting device EL to the outside through the wiring OUT2.

Here, transistors in which a metal oxide (an oxide semiconductor) is used in a semiconductor layer where a channel is formed are preferably used as the transistor M11, the transistor M12, the transistor M13, and the transistor M14 included in the pixel circuit PIX1 and the transistor M15, the transistor M16, and the transistor M17 included in the pixel circuit PIX2.

A transistor using a metal oxide having a wider band gap and a lower carrier density than silicon achieves an extremely low off-state current. Therefore, owing to the low off-state current, charge accumulated in a capacitor that is connected in series to the transistor can be retained for a long time. Hence, it is particularly preferable to use transistors containing an oxide semiconductor as the transistor M11, the transistor M12, and the transistor M15 each of which is connected in series with the capacitor C2 or the capacitor C3. When the other transistors also include an oxide semiconductor, the manufacturing cost can be reduced.

Alternatively, transistors using silicon as a semiconductor in which a channel is formed can be used as the transistors M11 to M17. It is particularly preferable to use silicon with high crystallinity, such as single crystal silicon or polycrystalline silicon, because high field-effect mobility can be achieved and higher-speed operation can be performed.

Alternatively, a transistor containing an oxide semiconductor may be used as at least one of the transistors M11 to M17, and transistors containing silicon may be used as the other transistors.

Although n-channel transistors are shown in FIG. 29G and FIG. 29H, p-channel transistors can alternatively be used.

The transistors included in the pixel circuit PIX1 and the transistors included in the pixel circuit PIX2 are preferably formed side by side over the same substrate. It is particularly preferable that the transistors included in the pixel circuit PIX1 and the transistors included in the pixel circuit PIX2 be periodically arranged in one region.

One or more layers including the transistor and/or the capacitor are preferably provided to overlap the light-receiving device PD or the light-emitting device EL. Thus, the effective area of each pixel circuit can be reduced, and a high-definition light-receiving portion or display portion can be achieved.

At least part of this embodiment can be implemented in combination with the other embodiments described in this specification as appropriate.

Embodiment 8

In this embodiment, a metal oxide (also referred to as an oxide semiconductor) that can be used in the OS transistor described in the above embodiment is described.

The metal oxide used in the OS transistor preferably contains at least indium or zinc, and further preferably contains indium and zinc. The metal oxide preferably contains indium, M (M is one or more kinds selected from gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example. Specifically, M is preferably one or more kinds selected from gallium, aluminum, yttrium, and tin, and further preferably M is gallium.

The metal oxide can be formed by a sputtering method, a chemical vapor deposition (CVD) method such as a metal organic chemical vapor deposition (MOCVD) method, an atomic layer deposition (ALD) method, or the like.

Hereinafter, an oxide containing indium (In), gallium (Ga), and zinc (Zn) is described as an example of the metal oxide. Note that an oxide containing indium (In), gallium (Ga), and zinc (Zn) may be referred to as an In—Ga—Zn oxide.

<Classification of Crystal Structure>

Amorphous (including a completely amorphous structure), CAAC (c-axis-aligned crystalline), nc (nanocrystalline), CAC (cloud-aligned composite), single-crystal, and polycrystalline (poly crystal) structures can be given as examples of a crystal structure of an oxide semiconductor.

Note that a crystal structure of a film or a substrate can be evaluated with an X-ray diffraction (XRD) spectrum. For example, evaluation is possible using an XRD spectrum which is obtained by GIXD (Grazing-Incidence XRD) measurement. Note that a GIXD method is also referred to as a thin film method or a Seemann-Bohlin method. The XRD spectrum obtained by GIXD measurement may be hereinafter simply referred to as an XRD spectrum.

For example, the XRD spectrum of the quartz glass substrate shows a peak with a substantially bilaterally symmetrical shape. On the other hand, the peak of the XRD spectrum of the In—Ga—Zn oxide film having a crystal structure has a bilaterally asymmetrical shape. The bilaterally asymmetrical peak of the XRD spectrum clearly shows the existence of crystals in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction (NBED) method (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the In—Ga—Zn oxide film deposited at room temperature. Thus, it is suggested that the In—Ga—Zn oxide film deposited at room temperature is in an intermediate state, which is neither a single crystal nor polycrystal nor an amorphous state, and it cannot be concluded that In—Ga—Zn oxide film is in an amorphous state.

<<Structure of Oxide Semiconductor>>

Note that oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductors include the above-described CAAC-OS and nc-OS. Other examples of the non-single-crystal oxide semiconductors include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor having a plurality of crystal regions each of which has c-axis alignment in a particular direction. Note that the particular direction refers to the thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the size of the crystal region may be approximately several tens of nanometers.

In the case of an In—Ga—Zn oxide, the CAAC-OS tends to have a layered crystal structure (also referred to as a layered structure) in which a layer containing indium (In) and oxygen (hereinafter, an In layer) and a layer containing gallium (Ga), zinc (Zn), and oxygen (hereinafter, a (Ga,Zn) layer) are stacked. Indium and gallium can be replaced with each other. Therefore, indium may be contained in the (Ga,Zn) layer. In addition, gallium may be contained in the In layer. Note that zinc may be contained in the In layer. Such a layered structure is observed as a lattice image in a high-resolution TEM (Transmission Electron Microscope) image, for example.

When the CAAC-OS film is subjected to structural analysis by out-of-plane XRD measurement with an XRD apparatus using $\theta/2\theta$ scanning, for example, a peak indicating c-axis alignment is detected at $2\theta$ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear crystal grain boundary (also referred to as grain boundary) cannot be observed even in the vicinity of the distortion in the CAAC-OS. That is, formation of a crystal grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, and the like.

Note that a crystal structure in which a clear crystal grain boundary is observed is what is called polycrystal. It is highly probable that the crystal grain boundary becomes a recombination center and traps carriers and thus decreases the on-state current and field-effect mobility of a transistor, for example. Thus, the CAAC-OS in which no clear crystal grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a crystal grain boundary as compared with an In oxide.

The CAAC-OS is an oxide semiconductor with high crystallinity in which no clear crystal grain boundary is observed. Thus, in the CAAC-OS, a reduction in electron mobility due to the crystal grain boundary is unlikely to occur. Moreover, since the crystallinity of an oxide semiconductor might be decreased by entry of impurities, formation of defects, or the like, the CAAC-OS can be regarded as an oxide semiconductor having small amounts of impurities and defects (e.g., oxygen vacancies). Thus, an oxide semiconductor including the CAAC-OS is physically stable. Therefore, the oxide semiconductor including the CAAC-OS is resistant to heat and has high reliability. In addition, the CAAC-OS is stable with respect to high temperatures in the manufacturing process (what is called thermal budget). Accordingly, the use of the CAAC-OS for the OS transistor can extend the degree of flexibility of the manufacturing process.

[nc-OS]

In the nc-OS, a microscopic region (e.g., a region with a size greater than or equal to 1 nm and less than or equal to 10 nm, specifically, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods. For example, when an nc-OS film is subjected to structural analysis by out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[a-like OS]

The a-like OS is an oxide semiconductor having a structure between those of the nc-OS and the amorphous oxide semiconductor. The a-like OS has a void or a low-density region. That is, the a-like OS has low crystallinity as compared with the nc-OS and the CAAC-OS. Moreover, the a-like OS has a higher hydrogen concentration in the film than the nc-OS and the CAAC-OS.

<Structure of Oxide Semiconductor>

Next, the above-described CAC-OS will be described in detail. Note that the CAC-OS relates to the material composition.

[CAC-OS]

The CAC-OS refers to one composition of a material in which elements included in a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region includes indium oxide, indium zinc oxide, or the like as its main component. The second region includes gallium oxide, gallium zinc oxide, or the like as its main component. That is, the first region can be rephrased as a region containing In as its main component. The second region can be rephrased as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof and these regions are randomly present to form a mosaic pattern. Thus, it is suggested that the CAC-OS has a structure in which metal elements are unevenly distributed.

The CAC-OS can be formed by a sputtering method under a condition where a substrate is not heated intentionally, for example. Moreover, in the case of forming the CAC-OS by a sputtering method, any one or more selected from an inert gas (typically, argon), an oxygen gas, and a nitrogen gas are used for a deposition gas. The proportion of the flow rate of an oxygen gas in the total flow rate of the deposition gas during deposition is preferably as low as possible. For example, the proportion of the flow rate of an oxygen gas in the total flow rate of the deposition gas is higher than or equal to 0% and lower than 30%, preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

Here, the first region has a higher conductivity than the second region. In other words, when carriers flow through the first region, the conductivity of a metal oxide is exhibited. Accordingly, when the first regions are distributed in a metal oxide like a cloud, high field-effect mobility ($\mu$) can be achieved.

On the other hand, the second region has a higher insulating property than the first region. In other words, when the second regions are distributed in a metal oxide, leakage current can be inhibited.

Thus, in the case where a CAC-OS is used for a transistor, by the complementary action of the conductivity due to the first region and the insulating property due to the second region, the CAC-OS can have a switching function (On/Off function). That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility ( ), and excellent switching operation can be achieved.

A transistor using the CAC-OS has high reliability. Thus, the CAC-OS is the most suitable for a variety of semiconductor devices such as display devices.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.
<Transistor Including Oxide Semiconductor>

Next, the case where the above oxide semiconductor is used for a transistor will be described.

When the above oxide semiconductor is used for a transistor, a transistor with high field-effect mobility can be achieved. In addition, a transistor having high reliability can be achieved.

An oxide semiconductor having a low carrier concentration is preferably used in a transistor. For example, the carrier concentration of an oxide semiconductor is lower than or equal to $1\times10^{17}$ cm$^{-3}$, preferably lower than or equal to $1\times10^{15}$ cm$^{-3}$, further preferably lower than or equal to $1\times10^{13}$ cm$^{-3}$, still further preferably lower than or equal to $1\times10^{11}$ cm$^{-3}$, yet further preferably lower than $1\times10^{10}$ cm$^{-3}$, and higher than or equal to $1\times10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and thus has a low density of trap states in some cases.

Charge trapped by the trap states in the oxide semiconductor takes a long time to disappear and might behave like fixed charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon. Note that impurities in an oxide semiconductor refer to, for example, elements other than the main components of an oxide semiconductor. For example, an element with a concentration lower than 0.1 atomic % can be regarded as an impurity.
<Impurities>

Here, the influence of each impurity in the oxide semiconductor will be described.

When silicon or carbon, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration obtained by secondary ion mass spectrometry (SIMS)) are each set lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Accordingly, a transistor including an oxide semiconductor that contains alkali metal or alkaline earth metal tends to have normally-on characteristics. Thus, the concentration of alkali metal or alkaline earth metal in the oxide semiconductor, which is obtained by SIMS, is lower than or equal to $1\times10^{18}$ atoms/cm$^3$, preferably lower than or equal to $2\times10^{16}$ atoms/cm$^3$.

Furthermore, when the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is set lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, and still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is set lower than $1\times10^{20}$ atoms/cm$^3$, preferably lower than $1\times10^{19}$ atoms/cm$^3$, further preferably lower than $5\times10^{18}$ atoms/cm$^3$, and still further preferably lower than $1\times10^{18}$ atoms/cm$^3$.

When an oxide semiconductor with sufficiently reduced impurities is used for the channel formation region of the transistor, stable electrical characteristics can be given.

At least part of this embodiment can be implemented in combination with the other embodiments described in this specification as appropriate.

REFERENCE NUMERALS

10: vehicle control device, 20a to 20d: light-emitting and light-receiving portion, 20: light-emitting and light-receiving portion, 21B: light-emitting element, 21G: light-emitting element, 21IR: light-emitting element, 21R: light-emitting element, 21: light-emitting element, 22: light-receiving element, 23: driver circuit, 24: reading circuit, 25r: reflected light, 25: light, 30: control portion, 31: data generation portion, 32: determination portion, 33: processing portion, 35L: left hand, 35R: right hand, 35: hand, 40: operation portion, 41: steering wheel, 42a: member, 42b: member, 42: rim, 43: hub, 44: spoke, 45: shaft, 50: vehicle, 51: display portion, 52: dashboard, 54: windshield, 55: camera, 56: wind outlet, 58a: door, 58b: door, 59a: display portion, 59b: display portion, 60a to 60h: display panels, 61A to 61C: display portions, 61: display portion, 62B: display panel, 62C: display panel, 62: display panel, 63: display region, 64: non-display region,

The invention claimed is:

1. A vehicle control device comprising:
   an operation portion comprising a steering wheel, the steering wheel comprising a hub, a spoke, and a rim connected to the hub through the spoke;
   a first light-emitting and light-receiving portion comprising a first light-emitting element and a first light-receiving element; and
   a control portion,
   wherein the first light-emitting and light-receiving portion is along a surface of the hub,
   wherein the first light-emitting element is configured to emit light in a first wavelength range,
   wherein the first light-receiving element is configured to receive the light in the first wavelength range and convert the light in the first wavelength range into a first electric signal,
   wherein the first light-emitting element and the first light-receiving element are on the same plane,
   wherein the first light-emitting and light-receiving portion is configured to output first received-light data to the control portion,
   wherein the control portion is configured to obtain first biological information of a driver from the first received-light data and execute first processing in accordance with the first biological information,
   wherein the first light-emitting element comprises a first organic layer,
   wherein the first light-receiving element comprises a second organic layer,
   wherein the first organic layer comprises a light-emitting layer,
   wherein the second organic layer comprises a photoelectric conversion layer, and
   wherein the light-emitting layer and the photoelectric conversion layer comprise different organic compounds from each other.

2. The vehicle control device according to claim 1, wherein the first biological information is information on a fingerprint, a vein, or a palm print, and
   wherein the first processing is authentication processing for the driver.

3. The vehicle control device according to claim 1, wherein the first light-emitting and light-receiving portion is configured to display an image and sense a touch.

4. The vehicle control device according to claim 1, further comprising:
   a second light-emitting and light-receiving portion,
   wherein the second light-emitting and light-receiving portion is along a surface of the rim,
   wherein the second light-emitting and light-receiving portion comprises a second light-emitting element and a second light-receiving element,
   wherein the second light-emitting element is configured to emit light in a second wavelength range, and
   wherein the second light-receiving element is configured to receive the light in the second wavelength range and convert the light in the second wavelength range into a second electric signal.

5. The vehicle control device according to claim 4, wherein the second light-emitting and light-receiving portion is configured to output second received-light data to the control portion, and
   wherein the control portion is configured to obtain second biological information of the driver from the second received-light data and execute second processing in accordance with the second biological information.

6. The vehicle control device according to claim 5, wherein the second biological information is one or more of a pulse wave, a heart rate, a pulse, and artery blood oxygen saturation, and
   wherein the second processing is warning processing to the driver.

7. The vehicle control device according to claim 4, wherein the light in the second wavelength range comprises infrared light.

8. The vehicle control device according to claim 1,
wherein the light in the first wavelength range comprises visible light or infrared light.

9. The vehicle control device according to claim 1,
wherein the first light-emitting element comprises a first electrode and a common electrode,
wherein the first light-receiving element comprises a second electrode and the common electrode,
wherein the first electrode and the second electrode are apart from each other on the same plane, and
wherein the common electrode covers the first organic layer and the second organic layer.

10. The vehicle control device according to claim 9,
wherein an angle formed between a bottom surface and a side surface of each of the first organic layer and the second organic layer is greater than or equal to 60 degrees and less than or equal to 120 degrees, and
wherein the side surface of the first organic layer and the side surface of the second organic layer face each other.

11. A vehicle comprising:
the vehicle control device according to claim 1; and
a display apparatus,
wherein the display apparatus comprises a display portion having a curved surface, and
wherein the display portion is along a dashboard or a pillar.

12. A vehicle control device comprising:
an operation portion comprising a steering wheel;
a first light-emitting and light-receiving portion comprising a first light-emitting element and a first light-receiving element; and
a control portion,
wherein the first light-emitting and light-receiving portion is along a first surface of the steering wheel,
wherein the first light-emitting element is configured to emit light in a first wavelength range,
wherein the first light-receiving element is configured to receive the light in the first wavelength range and convert the light in the first wavelength range into a first electric signal,
wherein the first light-emitting element and the first light-receiving element are on the same plane,
wherein the first light-emitting and light-receiving portion is configured to output first received-light data to the control portion,
wherein the control portion is configured to obtain first biological information of a driver from the first received-light data and execute first processing in accordance with the first biological information,
wherein the first light-emitting element comprises a first organic layer,
wherein the first light-receiving element comprises a second organic layer,
wherein the first organic layer comprises a light-emitting layer,
wherein the second organic layer comprises a photoelectric conversion layer, and
wherein the light-emitting layer and the photoelectric conversion layer comprise different organic compounds from each other.

13. The vehicle control device according to claim 12,
wherein the first biological information is information on a fingerprint, a vein, or a palm print, and
wherein the first processing is authentication processing for the driver.

14. The vehicle control device according to claim 12,
wherein the first light-emitting and light-receiving portion is configured to display an image and sense a touch.

15. The vehicle control device according to claim 12, further comprising:
a second light-emitting and light-receiving portion,
wherein the second light-emitting and light-receiving portion is along a second surface of the steering wheel,
wherein the second light-emitting and light-receiving portion comprises a second light-emitting element and a second light-receiving element,
wherein the second light-emitting element is configured to emit light in a second wavelength range, and
wherein the second light-receiving element is configured to receive the light in the second wavelength range and convert the light in the second wavelength range into a second electric signal.

16. The vehicle control device according to claim 15,
wherein the second light-emitting and light-receiving portion is configured to output second received-light data to the control portion, and
wherein the control portion is configured to obtain second biological information of the driver from the second received-light data and execute second processing in accordance with the second biological information.

17. The vehicle control device according to claim 16,
wherein the second biological information is one or more of a pulse wave, a heart rate, a pulse, and artery blood oxygen saturation, and
wherein the second processing is warning processing to the driver.

18. The vehicle control device according to claim 15,
wherein the light in the second wavelength range comprises infrared light.

19. The vehicle control device according to claim 12,
wherein the light in the first wavelength range comprises visible light or infrared light.

20. The vehicle control device according to claim 12,
wherein the first light-emitting element comprises a first electrode and a common electrode,
wherein the first light-receiving element comprises a second electrode and the common electrode,
wherein the first electrode and the second electrode are apart from each other on the same plane, and
wherein the common electrode covers the first organic layer and the second organic layer.

21. The vehicle control device according to claim 20,
wherein an angle formed between a bottom surface and a side surface of each of the first organic layer and the second organic layer is greater than or equal to 60 degrees and less than or equal to 120 degrees, and
wherein the side surface of the first organic layer and the side surface of the second organic layer face each other.

22. A vehicle comprising:
a vehicle control device comprising:
an operation portion comprising a steering wheel;
a first light-emitting and light-receiving portion comprising a first light-emitting element and a first light-receiving element; and
a display apparatus,
wherein the display apparatus comprises a display portion having a curved surface,
wherein the display portion is along a dashboard or a pillar,
wherein the first light-emitting and light-receiving portion is along a first surface of the steering wheel,
wherein the first light-emitting element and the first light-receiving element are on the same plane, wherein the first light-emitting element comprises a first organic layer,
wherein the first light-receiving element comprises a second organic layer,
wherein the first organic layer comprises a light-emitting layer,
wherein the second organic layer comprises a photoelectric conversion layer, and
wherein the light-emitting layer and the photoelectric conversion layer comprise different organic compounds from each other.

* * * * *